United States Patent
Toji et al.

(10) Patent No.: US 7,158,148 B2
(45) Date of Patent: Jan. 2, 2007

(54) DISPLAY EQUIPMENT, DISPLAY METHOD, AND RECORDING MEDIUM FOR RECORDING DISPLAY CONTROL PROGRAM

(75) Inventors: Bunpei Toji, Iizuka (JP); Tadanori Tezuka, Kaho-Gun (JP); Hiroyuki Yoshida, Kasuya-Gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 450 days.

(21) Appl. No.: 10/202,392

(22) Filed: Jul. 23, 2002

(65) Prior Publication Data

US 2003/0020729 A1 Jan. 30, 2003

(30) Foreign Application Priority Data

Jul. 25, 2001 (JP) ............................. 2001-223971

(51) Int. Cl.
*G09G 5/00* (2006.01)
*G06K 9/40* (2006.01)

(52) U.S. Cl. ...................... 345/613; 345/669; 382/266; 382/269; 382/275

(58) Field of Classification Search ................ 345/467, 345/469, 472, 613–616, 669–671, 694, 698; 382/260, 266, 269, 275
See application file for complete search history.

(56) References Cited

U.S. PATENT DOCUMENTS

| | | | |
|---|---|---|---|
| 4,720,745 A | 1/1988 | DeForest et al. | |
| 4,725,828 A | 2/1988 | Cowlishaw | |
| 5,164,825 A | 11/1992 | Kobayashi et al. | |
| 5,334,996 A * | 8/1994 | Tanigaki et al. | ............ 345/694 |
| 5,404,447 A | 4/1995 | Drako et al. | |
| 5,432,890 A | 7/1995 | Watanabe | |
| 5,450,208 A | 9/1995 | Murata | |
| 5,543,819 A | 8/1996 | Farwell et al. | |
| 5,623,593 A | 4/1997 | Spells, III | |
| 5,633,654 A * | 5/1997 | Kennedy et al. | ............ 345/634 |
| 5,748,178 A | 5/1998 | Drewry | |
| 5,768,490 A | 6/1998 | Hersch et al. | |
| 5,821,913 A | 10/1998 | Mamiya | |
| 5,852,443 A | 12/1998 | Kenworthy | |
| 5,852,673 A | 12/1998 | Young | |

(Continued)

FOREIGN PATENT DOCUMENTS

EP       0 313 332 A2      4/1989

(Continued)

OTHER PUBLICATIONS

Markoff, John, "Microsoft's Cleartype Sets Off Debate on Originality", New York Times Online, Dec. 7, 1998, pp. 1–4.

(Continued)

*Primary Examiner*—Henry N. Tran
(74) *Attorney, Agent, or Firm*—Darby & Darby

(57) ABSTRACT

A three-times magnified pattern of a central target pixel and horizontally contiguously adjacent sub-pixel patterns next thereto are determined on the basis of a reference pattern that has a rectangular profile and further that consist of eight-neighboring pixel about the target pixel. The determined three-times magnified pattern is allocated to three sub-pixels that form the target pixel. The determined sub-pixel patterns are allocated to horizontally adjacent sub-pixels next to the target pixel. As a result, a black area defined by the target pixel is displaced rightward by an amount of a sub-pixel without any change in black area size that corresponds to three sub-pixels. This feature inhibits a variation in output image density, which otherwise would conspicuously occurs as a result of a varied object line width.

39 Claims, 38 Drawing Sheets

U.S. PATENT DOCUMENTS

| | | | |
|---|---|---|---|
| 5,910,805 A * | 6/1999 | Hickey et al. | 345/467 |
| 6,008,820 A | 12/1999 | Chauvin et al. | |
| 6,181,353 B1 | 1/2001 | Kurisu | |
| 6,188,385 B1 | 2/2001 | Hill et al. | |
| 6,219,011 B1 | 4/2001 | Aloni et al. | |
| 6,219,025 B1 | 4/2001 | Hill et al. | |
| 6,225,973 B1 | 5/2001 | Hill et al. | |
| 6,236,390 B1 | 5/2001 | Hitchcock | |
| 6,239,783 B1 | 5/2001 | Hill et al. | |
| 6,239,789 B1 | 5/2001 | Sekizawa et al. | |
| 6,243,055 B1 | 6/2001 | Fergason | |
| 6,243,070 B1 | 6/2001 | Hill et al. | |
| 6,278,434 B1 | 8/2001 | Hill et al. | |
| 6,288,703 B1 | 9/2001 | Berman et al. | |
| 6,299,930 B1 | 10/2001 | Marotta et al. | |
| 6,342,896 B1 | 1/2002 | Shetter et al. | |
| 6,356,278 B1 * | 3/2002 | Stamm et al. | 345/611 |
| 6,360,023 B1 | 3/2002 | Betrisey et al. | |
| 6,377,273 B1 | 4/2002 | Lee et al. | |
| 6,384,839 B1 * | 5/2002 | Paul | 345/613 |
| 6,396,505 B1 | 5/2002 | Lui et al. | |
| 6,509,904 B1 | 1/2003 | Lam | |
| 6,532,041 B1 | 3/2003 | Monta et al. | |
| 6,542,161 B1 * | 4/2003 | Koyama et al. | 345/589 |
| 6,563,502 B1 * | 5/2003 | Dowling et al. | 345/469.1 |
| 6,608,632 B1 | 8/2003 | Daly et al. | |
| 6,681,053 B1 | 1/2004 | Zhu et al. | |
| 6,750,875 B1 * | 6/2004 | Keely et al. | 345/613 |
| 6,756,992 B1 | 6/2004 | Toji et al. | |
| 7,012,619 B1 * | 3/2006 | Iwata et al. | 345/613 |

FOREIGN PATENT DOCUMENTS

| | | |
|---|---|---|
| EP | 0 710 925 A2 | 5/1996 |
| EP | 1 026 659 A2 | 8/2000 |
| EP | 1 158 485 A2 | 12/2001 |
| JP | 08-166778 A1 | 6/1996 |
| JP | 2002-099239 A1 | 4/2002 |
| WO | WO-00/21066 A1 | 4/2000 |
| WO | WO-00/21067 A1 | 4/2000 |
| WO | WO-00/21068 A1 | 4/2000 |
| WO | WO-00/21070 A1 | 4/2000 |
| WO | WO-00/42564 A1 | 7/2000 |
| WO | WO-00/57305 A1 | 9/2000 |
| WO | WO-01/09824 A1 | 2/2001 |
| WO | WO-01/09873 A1 | 2/2001 |

OTHER PUBLICATIONS

Claude Betrisey, et al., 20.4: Displaced Filtering for Patterned Displays, Society for Information Display, vol. XXXI, 1999, pp. 296-299.

Gibson Research Corporation, Sub-Pixel Font Rendering Technology, http://grc.com/cleartype.htm.

* cited by examiner three-times magnified pattern
and adjacent sub-pixel patterns original image three-times magnified pattern disconnection leftward by a sub-pixel stand still rightward by a sub-pixel leftward by a sub-pixel stand still rightward by a sub-pixel rightward by two sub-pixels collapse normal

$\alpha$ $\beta$

Fig. 21 (a)

| (-1,-1) | (0,-1) | (1,-1) |
|---|---|---|
| (-1,0) | (0,0) | (1,0) |
| (-1,1) | (0,1) | (1,1) |

* don't care

Fig. 21 (b)

if ( x(-1,0)=1 and x(1,0)=1 ) then
    result := '11111';

Fig. 21 (c)

if ( x(-1,-1)=0 and x(0,-1)=0 and x(1,-1)=1
    and x(-1,0)=0 and x(0,1)=1 ) then
    result := '00111';

Fig. 21 (d)

if ( x(-1,-1)=1 and x(0,-1)=0 and x(1,-1)=0
    and x(1,0)=0 and x(0,1)=1 ) then
    result := '11100';

Fig. 21 (e)

if ( x(0,-1)=1 and x(-1,0)=0 and x(1,0)=0
    and x(0,1)=1 ) then
    result := '01110';

$(2n+1) \times (2m+1)$

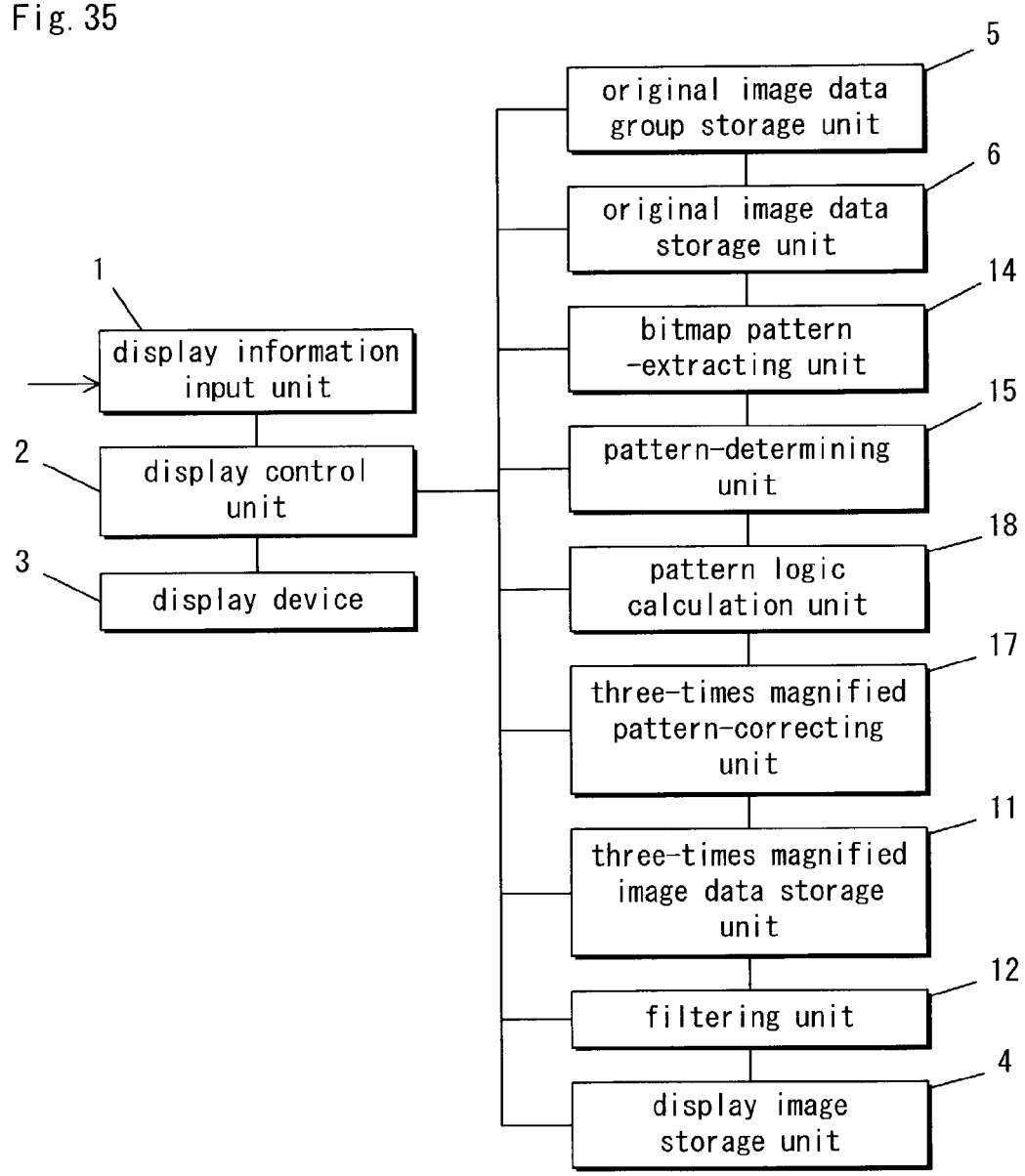

Fig. 36(a)

| (-1,-1) | (0,-1) | (1,-1) |
|---|---|---|
| (-1,0) | (0,0) | (1,0) |
| (-1,1) | (0,1) | (1,1) |

| * | don't care |

Fig. 36(b)

if (x(-1,0)=1 and x(1,0)=1 and x(0,0)=1) then
    result := '11111';

Fig. 36(c)

if (x(-1,0)=0 and x(1,0)=0 and x(0,0)=0) then
    result := '00000';

Fig. 36(d)

if (x(-1,-1)=0 and x(0,-1)=0 and x(1,-1)=1
  and x(-1,0)=0 and x(0,0)=1
  and x(0,1)=1) then
    result := '00111';

Fig. 36(e)

if (x(-1,-1)=1 and x(0,-1)=1 and x(1,-1)=0
  and x(-1,0)=1 and x(0,0)=0
  and x(0,1)=0) then
    result := '11000';

Fig. 36(f)

if (x(0,-1)=1 and x(-1,0)=0 and x(0,0)=1
  and x(1,0)=0 and x(0,1)=1) then
    result := '01110';

Fig. 36(g)

if (x(0,-1)=0 and x(-1,0)=1 and x(0,0)=0
  and x(1,0)=1 and x(0,1)=0 ) then
    result := '10001';

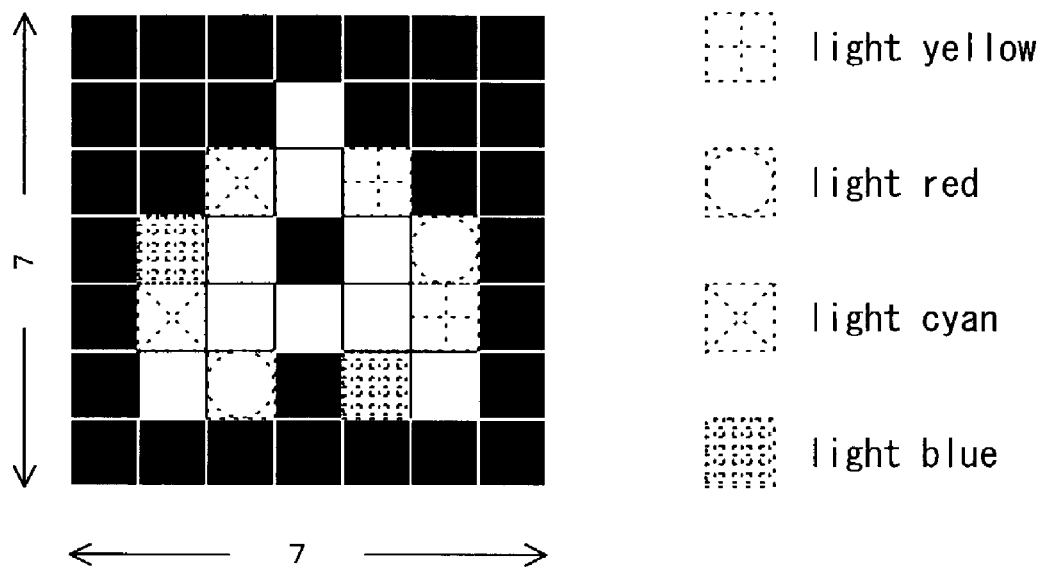

DISPLAY EQUIPMENT, DISPLAY METHOD, AND RECORDING MEDIUM FOR RECORDING DISPLAY CONTROL PROGRAM

BACKGROUND OF THE INVENTION

1. Field of the Invention

The present invention relates to display equipment and an art related thereto.

2. Description of the Related Art

Display equipment that employs various types of display devices have been in customary use. One known type of display equipment heretofore includes a display device such as a color LCD and a color plasma display, in which three light-emitting elements for illuminating three primary colors (RGB) are aligned in certain sequence to form a pixel. A plurality of the pixels are aligned in series in a first direction, thereby forming a line. A plurality of the lines are aligned in a second direction perpendicular to the first direction, thereby forming a display screen on the display device.

A large number of display devices having display screens reduced in size to a degree that they fail to provide a sufficiently fine display. This problem is commonly seen in the display devices disposed in, e.g., a cellular phone and a mobile computer. In such display devices, small characters and photographs, or complicated pictures, are often smeared and rendered obscure in sharpness.

In order to provide improved display sharpness in such a small display screen, a reference entitled "Sub-Pixel Font-Rendering Technology" is open to the public on the Internet. The reference discusses a per sub-pixel display based on a pixel formed by three light-emitting elements (RGB). The present Inventors downloaded the reference on Jun. 19, 2000 from a web site on the world wide web posted by Gibson Research Corporation.

The above technology is now described with reference to FIGS. 38 to 42. In the following description, an alphabetic character "A" is used as an example of a displayed image.

FIG. 38 is a simulated illustration, showing a line that includes a chain of pixels, each of which consists of the three light-emitting elements. In FIG. 38, a horizontal direction, or a direction in which the light-emitting elements are aligned with each other, is called a first direction, while a vertical direction perpendicular to the first direction is referred to as a second direction.

In the prior art as well as the present invention, the light-emitting elements are not limited to alignment in the order of R. G, and B, but may be arranged serially in any other alphabetical sequence.

A plurality of the pixels, each of which is formed by the three light-emitting elements, is arranged in a row in the first direction in order to provide a line. A plurality of the lines are aligned with each other in the second direction, thereby providing a display screen on the display device.

The sub-pixel technology as discussed above addresses an original image as illustrated in, e.g., FIG. 39. In this example, the character "A" is displayed over a display screen area that consists of seven pixels-by-seven pixels in the horizontal and vertical (first and second) directions, respectively. Meanwhile, a font having a resolution horizontally magnified as three times as large as that of the previous character is provided as illustrated in FIG. 40 in order to provide a per sub-pixel display. In FIG. 40, assuming that each of the light-emitting elements (RGB) is viewed as a single pixel, the character "A" is displayed over a display screen area that consists of twenty-one pixels (=7*3 pixels) horizontally by seven pixels vertically.

As illustrated in FIG. 41, a color is determined for each of the pixels of FIG. 39, not the pixels in FIG. 40. However, color irregularities occur when the determined colors are displayed without being processed. The determined colors must be filtered using factors as shown in FIG. 42($a$) in order to avoid the color irregularities. As illustrated in FIG. 42($a$), the factors are correlated with luminance. For example, a central target sub-pixel is multiplied by a factor of $3/5$. Contiguously adjacent sub-pixels next to the central sub-pixel are multiplied by a factor of $2/5$. Sub-pixels next to the contiguously adjacent sub-pixels are multiplied by a factor of $1/5$. This is the manner in which the luminance of each of the sub-pixels is adjusted.

Filtering the colored pixels as illustrated in FIG. 41 results in pixels as shown in FIG. 42($b$). In FIG. 42($b$), colors are adjusted in such a manner that yellow, red, cyan, and blue are changed to light yellow, light red, light cyan, and light blue, respectively.

The luminance of the sub-pixels of the filtered image is allocated to the light-emitting elements of FIG. 40, thereby displaying the image on a per sub-pixel basis.

OBJECTS AND SUMMARY OF THE INVENTION

According to the above art, an image (see FIG. 40) having a resolution magnified in the first direction three times as large as that of an original image (see FIG. 39) must be retained statically.

In general, in order to collectively manage a large number of images such as fonts, huge system resources are required for an increased number of types of fonts. In particular, for equipment such as a cellular phone and a mobile computer, which have many constraints on system resources, the art that involves such large system resources is difficult to employ.

The above art presupposes that the the-times magnified image is statically used. Therefore, any original image such as a photographic portrait image downloaded from a server cannot be displayed using a three-times magnified resolution.

As evidenced by the above, the prior art has a problem that heavy loads are imposed on the system resources although an image can be displayed on a per sub-pixel basis. A further problem with the prior art is that the image on a per sub-pixel basis is provided only within limited applications.

In view of the above, an object of the present invention is to provide display equipment and an art related thereto, designed to provide reduced loads on system resources, to provide a per sub-pixel display, even when a three-times magnified image is unknown, and to provide a high-quality display on a per sub-pixel basis as a result of a suppressed variation in output image density.

A first aspect of the present invention provides display equipment comprising: a unit for displaying an image on a per sub-pixel basis, wherein a sub-pixel of a pixel next to a target pixel is controlled when the target pixel is controlled on the per sub-pixel basis.

This structure allows a smoother image to be displayed on a per sub-pixel basis than when an object in an original image has a line width simply increased or decreased.

A second aspect of the present invention provides display equipment as defined in the first aspect thereof, wherein a target pixel and a pixel next to the target pixel are controlled on a per sub-pixel basis without any change in line width of an object.

This structure provides a suppressed variation in output image density when an image is displayed on a per sub-pixel basis. Such a density variation otherwise would conspicuously occurs as a result of a variation in line width that represents an object. This feature realizes a high-quality display on a per sub-pixel basis.

A third aspect of the present invention provides display equipment as defined in the first aspect thereof, wherein when a mismatch in sub-pixel data occurs as a result of control over a sub-pixel of a pixel next to a target pixel, then correction is performed in order to eliminate the mismatch.

This structure eliminates a mismatch between sub-pixels, and there is no need for a particular target pixel to be selected and processed. All target pixels are mechanically subjected to the same processing, thereby determining a three-times magnified pattern and sub-pixel patterns next thereto.

A fourth aspect of the present invention provides display equipment comprising: a unit for displaying an object on a per sub-pixel basis, in which a raster image representative of the object is taken as an original image, wherein assuming that a line of the object displayed on the per sub-pixel basis has a width corresponding to a "j" (is a natural number) number of sub-pixels, the j-number of sub-pixels that show the line of the object are displaced by an amount of a "k" k is a natural number) number of sub-pixels without any change in total value of the j-number of sub-pixels, thereby displaying an object on the per sub-pixel basis.

This structure allows a smoother image to be displayed on a per sub-pixel basis than when an object in an original image has a line width simply increased or decreased.

A fifth aspect of the present invention provides display equipment comprising: a display device; the display device including three light-emitting elements aligned with each other in certain sequence to form a pixel, the three light-emitting elements illuminating three primary colors RGB; a plurality of the pixels aligned with each other in a first direction to form a line; a plurality of the lines aligned with each other in a second direction perpendicular to the first direction, thereby forming a display screen on the display device; pattern-determining unit for determining a three-times magnified pattern of a target pixel by magnifying the target pixel three times in the first direction in accordance with a raster image to be displayed; the pattern-determining unit for determining, in accordance with the raster image to be displayed, a "x" (x is an integral number) number of sub-pixel patterns positioned next to the target pixel on one side of the target pixel and a eye (y is a natural number) number of sub-pixel patterns positioned next to the target pixel on the other side of the target pixel; and display control unit for allocating the three-times magnified pattern, the x-number of sub-pixel patterns, and the y-number of sub-pixel patterns to the light-emitting elements of the display device, thereby displaying an image on the display device.

This structure allows a pixel to be displaced by amounts of some sub-pixels in the first direction according to respective values of "x" and "y" without any change in pixel value.

Such a construction provides a suppressed variation in output image density when an image is displayed on a per sub-pixel basis. Such a density variation otherwise would conspicuously occurs as a result of a variation in line width that represents an object. This feature realizes a high-quality display on a per sub-pixel basis.

The pattern-determining unit dynamically determines a three-times magnified pattern and sub-pixel patterns next thereto on the basis of a raster image. This means that the three-times magnified pattern and the sub-pixel patterns need not be retained statically. This feature provides less system loads than when the three-times magnified pattern and the sub-pixel patterns are statically contained. This beneficial effect in combination with the above-described beneficial effects allows the display equipment according to the present invention to be incorporated with more ease into equipment having many constraints on system resources.

Furthermore, the raster image as well as the three-times magnified pattern with the sub-pixel patterns, which are derived from the raster image, need not be known. As a result, a wide range of images such as a photographic portrait image downloaded from a server can be displayed on a per sub-pixel basis with a substantially improved resolution, and are therefore legibly displayed.

A sixth aspect of the invention provides display equipment as defined in the fifth aspect thereof, wherein the pattern-determining unit determines the three-times magnified pattern, the x-number of sub-pixel patterns, and the y-number of sub-pixel patterns only when the target pixel has a predetermined pixel value.

This structure determines a three-times magnified pattern and sub-pixel patterns next thereto only when a target pixel has a predetermined pixel value. This feature provides less entire processing than when the three-times magnified pattern and the sub-pixel patterns are determined with respect to all target pixels. As a result, further reduced system loads are attainable, and the display equipment according to the present invention can be incorporated with more ease into equipment such as a cellular phone and a mobile computer, which have many constraints on system resources.

A seventh aspect of the present invention provides display equipment as defined in the sixth aspect thereof, wherein the pattern-determining unit determines the three-times magnified pattern, the x-number of sub-pixel patterns, and the y-number of sub-pixel patterns on the basis of a reference pattern that has a rectangular profile and further that consists of a total of a $((2n+1)*(2m+1)-1))$(n, m are natural numbers) number of surrounding pixels about the target pixel.

This structure allows a position of each referenced pixel to be located with ease because of the rectangular reference pattern, and therefore realizes less processing.

A eighth aspect of the invention provides display equipment as defined in the sixth aspect thereof, wherein the pattern-determining unit determines the three-times magnified pattern, the x-number of sub-pixel patterns, and the y-number of sub-pixel patterns on the basis of a reference pattern that has a non-rectangular profile and further that consists of a plurality of surrounding pixels about the target pixel.

This structure permits only pixels at specific positions with respect to a target pixel to be referenced in order to determine a three-times magnified pattern and sub-pixel patterns next thereto. This feature provides fewer referenced pixels, when compared with any reference pattern having a rectangular profile. As a result, the total processing time and a required storage capacity can be reduced. In addition, the pixels can be referenced at a wider range, and a smooth display is realized.

A ninth aspect of the invention provides display equipment as defined in the fifth aspect thereof, further comprising: a three-times magnified pattern-correcting unit for correcting the three-times magnified pattern that is determined by the pattern-determining unit, wherein when a mismatch occurs between the three-times magnified pattern of the target pixel and a sub-pixel pattern positioned next to another target pixel in the first direction, then the three-times magnified pattern-correcting unit corrects the three-times magnified pattern of the target pixel in order to eliminate the mismatch therebetween, and wherein the display control unit allocates the corrected three-times magnified pattern to the light-emitting elements of the display device, thereby displaying an image on the display device.

This structure eliminates a mismatch from a three-times magnified pattern, and obviates the need for a particular target pixel to be selected and processed. This means that all target pixels can mechanically be processed in the same manner in order to determine a three-times magnified pattern and sub-pixel patterns next thereto.

A tenth aspect of the invention provides display equipment as defined in the ninth aspect thereof, wherein the pattern-determining unit determines the three-times magnified pattern, the x-number of sub-pixel patterns, and the y-number of sub-pixel patterns on the basis of a reference pattern that has a rectangular profile and farther that consists of a total of a (2n+1)*(2m+1) (n, m are natural numbers) number of pixels, the pixels consisting of a target pixel and neighboring pixels about the target pixel.

This structure allows a position of each referenced pixel to be located with ease because of the rectangular reference pattern, and therefore realizes less processing.

An eleventh aspect of the present invention provides display equipment as defined in the ninth aspect thereof, wherein the pattern-determining unit determines the three-times magnified patter the x-number of sub-pixel patterns, and the y-number of sub-pixel patterns on the basis of a reference pattern that has a non-rectangular profile and further that consists of a target pixel and a plurality of neighboring pixels about the target pixel.

This structure permits only pixels at specific positions with respect to a target pixel to be referenced in order to determine a three-times magnified pattern and sub-pixel patterns next thereto. This feature provides fewer referenced pixels, when compared with any reference pattern having a rectangular profile. As a result, the total processing time and a required storage capacity can be reduced. In addition, the pixels can be referenced at a wider range, and a smooth display is realized.

A twelfth aspect of the invention provides display equipment as defined in the fifth aspect thereof, wherein the numbers x, y are both equal to 1.

This structure displaces a pixel by a smaller amount than when the number x is defined as $x \geq 2$. This feature inhibits smearing of an object, e.g., a character, displayed on the display device.

In respective three-times magnified patterns of two neighboring target pixels, there occur one mismatch at a leftward pattern of one of the three-times magnified patterns and another mismatch at a rightward pattern of the other. This feature eliminates the mismatches using simpler processing than when the number x is defined as $x \geq 2$.

A thirteenth aspect of the invention provides display equipment as defined in the fifth aspect thereof, wherein the numbers x, y are both equal to 2.

This structure allows bold character processing as well as shifting to be practiced while inhibiting a processing time and a required storage capacity.

A fourteenth aspect of the invention provides display equipment as defined in the seventh aspect thereof, wherein the numbers n, m are both equal to 1.

This structure provides a rectangular reference pattern that excludes a target pixel from three pixels-by-three-pixels. The reference pattern includes two hundred and fifty six different combinations. As a result, an image is displayed on a per sub-pixel basis while a processing time and a required storage capacity are inhibited.

A fifteenth aspect of the invention provides display equipment as defined in the tenth aspect thereof, wherein the numbers n, m are both equal to 1.

This structure provides a rectangular reference pattern that consists of three pixels-by-three-pixels. The reference pattern includes five hundred and twelve different combinations. As a result, an image is displayed on a per sub-pixel basis while a processing time and a required storage capacity are inhibited.

A sixteenth aspect of the invention provides display equipment as defined in the fifth aspect thereof, wherein the raster image is one of a bitmap font, a bitmap image based on a vector font, and a non-font raster image.

This structure allows a variety of images to be displayed on per sub-pixel basis.

A seventeenth aspect of the invention provides display equipment as defined in the fifth aspect thereof, wherein the pattern-determining unit determines the three-times magnified pattern, the x-number of sub-pixel patterns, and the y-number of sub-pixel patterns by referencing a reference pattern storage unit that stores a pattern-determining rule for use in determining the three-times magnified pattern, the x-number of sub-pixel patterns, and the y-number of sub-pixel patterns.

This structure determines a three-times magnified pattern and sub-pixel patterns next thereto by referencing the reference pattern storage unit. As a result, the three-times magnified pattern and the sub-pixel patterns can be determined quickly, thereby retaining a good display response.

An eighteenth aspect of the invention provides display equipment as defined in the seventeenth aspect thereof, wherein the reference pattern storage unit contains information on reference pattern-related pattern matching.

This structure allows a three-times magnified pattern and sub-pixel patterns next thereto to be determined using pattern matching.

A nineteenth aspect of the invention provides display equipment as defined in the seventeenth aspect thereof, wherein the reference pattern storage unit contains a bit string that expresses a reference pattern by bits, and information on the three-times magnified pattern, the x-number of sub-pixel patterns, and the y-number of sub-pixel patterns, all of the patterns being related to the bit string, and the bit string and the information are correlated with one another.

This structure allows a three-times magnified pattern and sub-pixel patterns next thereto to be retrieved quickly and easily using a bit string.

A twentieth aspect of the invention provides display equipment as defined in the fifth a aspect thereof, wherein the pattern-determining unit determines the three-times magnified patter, the x-number of sub-pixel patterns, and the y-number of sub-pixel patterns by referencing calculation results from pattern logic operation unit that practices reference pattern-based logic operation.

This structure allows a three-times magnified pattern and sub-pixel patterns next thereto to be determined only using logic operation without storing a corresponding reference pattern. This feature provides a saving in storage area.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 12 is an illustration, showing a relationship between each bit string and a corresponding three-times magnified pattern with horizontally contiguously adjacent sub-pixel patterns next thereto;

FIG. 19(*b*) is a descriptive illustration, showing an objectionable effect;

FIG. 21(*a*) is an illustration, defining a reference pattern;

FIG. 21(*b*) is an illustration, showing a relationship between a reference pattern and a three-times magnified pattern with horizontally contiguously adjacent sub-pixel patterns next thereto;

FIG. 21(*c*) is an illustration, showing another relationship between a reference pattern and a three-times magnified pattern with horizontally contiguously adjacent sub-pixel patterns next thereto;

FIG. 21(*d*) is an illustration, showing a further relationship between a reference pattern and a three-times magnified pattern with horizontally contiguously adjacent sub-pixel patterns next thereto;

FIG. 21(*e*) is an illustration, showing a yet further relationship between a reference pattern and a three-times magnified pattern with horizontally contiguously adjacent sub-pixel patterns next thereto;

FIG. 25(*b*) is an illustration, showing an example of a three-times magnified pattern with horizontally contiguously adjacent sub-pixel patterns next thereto;

FIG. 25(*c*) is an illustration, showing another example of a reference pattern;

FIG. 25(*d*) is an illustration, showing another example of a three-times magnified pattern with horizontally contiguously adjacent sub-pixel patterns next thereto;

FIG. 25(*e*) is an illustration, showing a further example of a reference pattern;

FIG. 25(*f*) is an illustration, showing a further example of a three-times magnified pattern with horizontally contiguously adjacent sub-pixel patterns next thereto;

FIG. 30(*b*) is an illustration, showing respective examples of bitmap patterns that are extracted from the original image;

FIG. 30(*c*) is an illustration, showing respective examples of determined three-times magnified patterns with horizontally contiguously adjacent sub-pixel patterns next thereto;

FIG. 30(*d*) is an illustration, showing an example of a corrected three-times magnified pattern.

FIG. 31(*b*) is an illustration, showing respective examples of bitmap patterns that are extracted from the original image;

FIG. 31(*c*) is an illustration, showing respective examples of determined three-times magnified patterns with horizontally contiguously adjacent sub-pixel patterns next thereto;

FIG. 31(*d*) is an illustration, showing a corrected three-times magnified pattern;

FIG. 32 is an illustration, showing a relationship between each bit string and a corresponding three-times magnified pattern with horizontally contiguously adjacent sub-pixel patterns next thereto;

FIG. 35 is a block diagram, illustrating display equipment according to a fourth embodiment;

FIG. 36(*a*) is an illustration, defining a reference pattern;

FIG. 36(*b*) is an illustration, showing a relationship between a reference pattern and a three-times magnified pattern with horizontally contiguously adjacent sub-pixel patterns next thereto;

FIG. 36(*c*) is an illustration, showing another relationship between a reference pattern and a three-times magnified pattern with horizontally contiguously adjacent sub-pixel patterns next thereto;

FIG. 36(*d*) is an illustration, showing a further relationship between a reference pattern and a three-times magnified pattern with horizontally contiguously adjacent sub-pixel patterns next thereto;

FIG. 36(*e*) is an illustration, showing a yet further relationship between a reference pattern and a three-times magnified pattern with horizontally contiguously adjacent sub-pixel patterns next thereto;

FIG. 36(*f*) is an illustration, showing a still further relationship between a reference pattern and a three-times magnified pattern with horizontally contiguously adjacent sub-pixel patterns next thereto;

FIG. 36(*g*) is an illustration, showing yet another relationship between a reference pattern and a three-times magnified pattern with horizontally contiguously adjacent sub-pixel patterns next thereto;

FIG. 42(*a*) is a descriptive illustration, showing filtering factors as employed in the prior art; and, FIG. 42(*b*) is an illustration, showing an example of prior art filtering results.

DETAILED DESCRIPTION OF THE PREFERRED EMBODIMENTS

Embodiments of the present invention will now be described with reference to the drawings.

(Embodiment 1)

Figure 1:
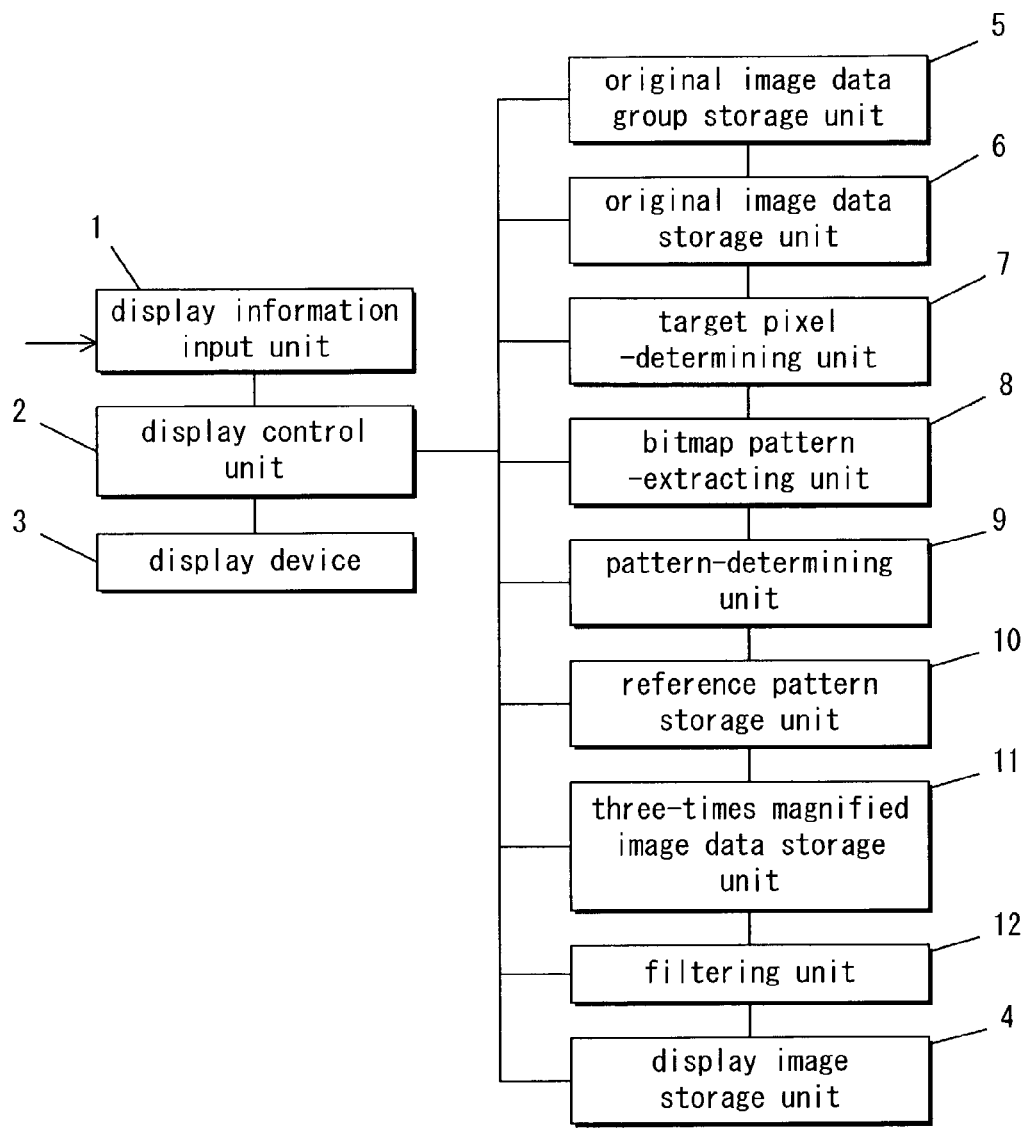
FIG. 1 is a block diagram, illustrating display equipment according to a first embodiment of the present invention.

A first embodiment of the present invention is now described. FIG. 1 is a block diagram, illustrating display equipment according to the first embodiment.

Referring to FIG. 1, the display equipment includes a display information input unit 1, a display control unit 2, a display device 3, a display image storage unit 4, an original image data group storage unit 5, an original image data storage unit 6, a target pixel-determining unit 7, a bitmap pattern-extracting unit 8, a pattern-determining unit 9, a reference pattern storage unit 10, a three-times magnified image data storage unit 11, and a filtering unit 12.

In FIG. 1, the display information input unit 1 enters display information. The display control unit 2 controls all components of FIG. 1 in order to display an image on the display device 3 in accordance with a display image stored in the display image storage unit 4 (VRAM).

The display device 3 has three light-emitting elements aligned with each other in certain sequence, thereby forming a pixel. The three light-emitting elements illuminate three primary colors RGB. A plurality of the pixels is arranged in series in a first direction, thereby forming a line. A plurality of the lines is aligned with each other in a second direction perpendicular to the first direction, thereby forming a display screen on the display device 3. More specifically, the display device 3 be any one of a color LCD (liquid crystal display), a color plasma display, and an organic EL (electroluminescent) display, or any other type of display now existing, or to be invented. The display device 3 includes drivers for driving such light-emitting elements.

A sub-pixel is now discussed in brief. In general, the sub-pixel is a minimum element that forms part of a pixel.

In the present embodiment, the display device 3 has the three light-emitting elements aligned with each other in certain order in order to form a pixel. The sub-pixel is an element obtained by cutting the pixel into three equal parts in the first direction.

Therefore, three sub-pixels representative of RGB correspond with the respective light-emitting elements (RGB).

The original image data group storage unit 5 stores a series of original image data such as font data. The font may be either a raster font or a vector font, or alternatively may be both of them.

The original image data storage unit 6 tentatively stores the original image data. Assume that the original image data group storage unit 5 stores raster font data, and further that the display information input unit 1 instructs the display control unit 2 to display a specific raster font data from the original image data group storage unit 5. In this instance, the display control unit 2 places a current raster font data from the original image data group storage unit 5, by way of original data, into the original image data storage unit 6 without any change in the current raster font data.

Assume that the original image data group storage unit 5 retains vector font data, and further that the display information input unit 1 instructs the display control unit 2 to display a specific vector font data. In this case, the display control unit 2 draws that particular vector font data at a predetermined area, thereby generating a raster image. The display control unit 2 places the resulting raster image as an original image into the original image data storage unit 6.

When an usual raster image that is not stored in the original image data group storage unit 5 is entered via the display information input unit 1, then the display control unit 2 draws the entered raster image at a predetermined area before placing the raster image into the original image data storage unit 6.

The target pixel-determining unit 7 references the original image data stored in the original image data storage unit 6 in order to determine whether or not a target pixel has a predetermined pixel value.

The present embodiment exemplifies characters and symbols displayed in black and the background displayed in white. The "predetermined pixel value" as previously discussed refers to a pixel value representative of black. However, the present embodiment is not limited thereto. For example, when the characters and symbols are displayed in white while the background is displayed in black, then the "predetermined pixel value" is a pixel value representative of white.

As described below, the bitmap pattern-extracting unit 8 and the pattern-determining unit 9 provide respective courses of processing only when the target pixel-determining unit 7 determines that the target pixel is black.

The bitmap pattern-extracting unit 8 extracts a bitmap pattern from the original image data stored in the original image data storage unit 6. The bitmap pattern is equal in shape to a corresponding reference pattern.

Figure 2:
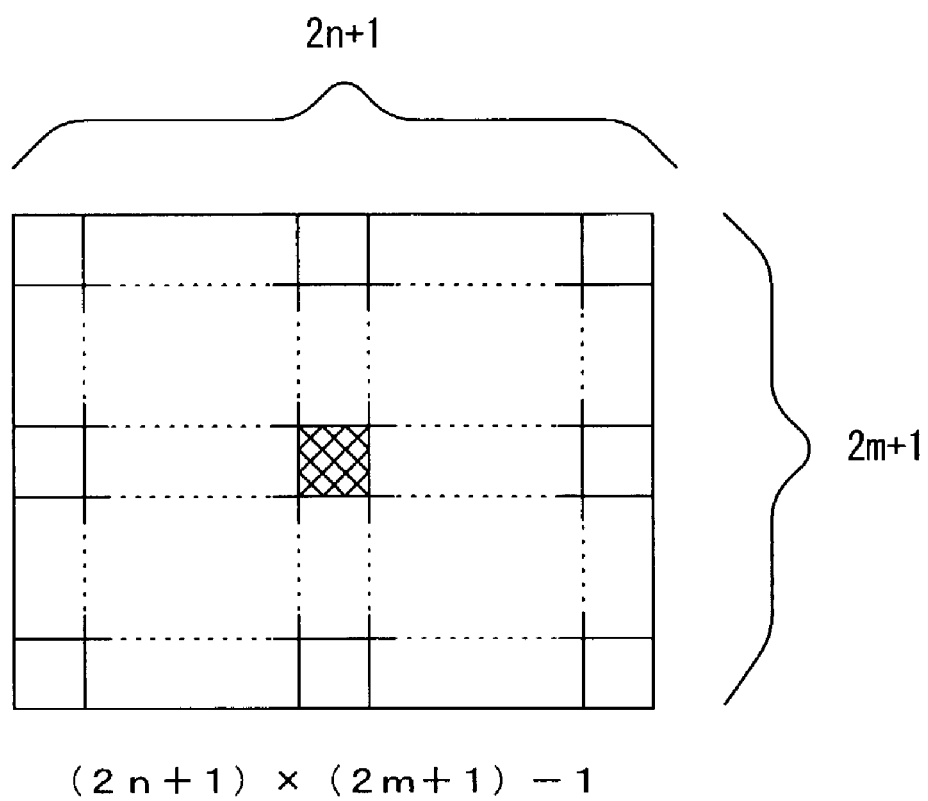
FIG. 2 is an illustration, defining a reference pattern according to the first embodiment.

In general, the pattern is defined as shown in FIG. 2. More specifically, the pattern is formed by a rectangular pattern that consists of surrounding pixels about a target pixel. The rectangular pattern excludes the target pixel. The target pixel is a central pixel defined by hatched lines. The pattern consists of pixels whose total number is ((2n+1) times (2m+1) minus 1) ("n", "m" are natural numerals). The pattern includes different combinations of the ((2n+1)*(2m+1) 1) power of 2.

The use of the rectangular reference pattern allows a position of any referenced pixel to be located with ease, resulting in less processing.

In order to reduce the system load, the numbers "n", "m" are preferably defined as n=m=1. This means that the pattern consists of eight pixels, and therefore includes two hundred and fifty six (256) different combinations.

The pattern-determining unit 9 searches the reference pattern storage unit 10 that stores the above reference pattern, for a proper reference pattern that matches with the bitmap pattern extracted by the bitmap pattern-extracting unit 8. The pattern-determining unit 9 determines a three-times magnified pattern of a target pixel and contiguously adjacent sub-pixel patterns next to the target pixel in the first direction on the basis of the searched reference pattern. The determined sub-pixel patterns include an "x" ("x" is an integer) number of sub-pixel patterns positioned next to the target pixel in the first direction on one side of the target pixel, and a "y" ("y" is a natural number) number of sub-pixel patterns disposed next to the target pixel in the first direction on the other side of the target pixel.

The determined three-times magnified pattern is obtained by magnifying the target pixel three times in the first direction according to the reference pattern as discussed later, not by simply magnifying the target pixel.

The following description is based on the assumption of n=m=1 and x=y=1. The definition n=m=1 means that the reference pattern as well as the extracted bitmap pattern consists of eight pixels. When the first direction is defined as a horizontal direction, then horizontally contiguously adjacent sub-pixel patterns next to a target pixel as well as a three-times magnified pattern are determined on the basis of the definition of x=y=1.

The above example exhibits eight-pixel input, and the pattern-determining unit 9 provides five-bit output. This is demonstrated merely by way of illustration, and other various cases such as twenty-four-pixel input (n=m=2) and seven-bit output (x=y=2) are realized as well.

For the definition x=y=2, boldface processing and the shifting are both practicable while respective increases in a processing time and a required storage capacity are inhibited. However, such an increase problem occurs when the numbers x, y are three or greater, respectively.

The above description is again made below with reference to the drawings.

Figure 3A:
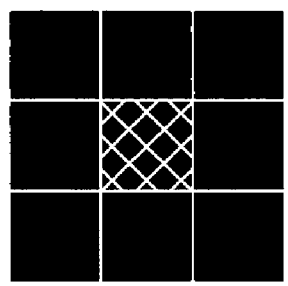
FIG. 3(a) is an illustration, showing an example of a reference pattern.
Figure 3B:
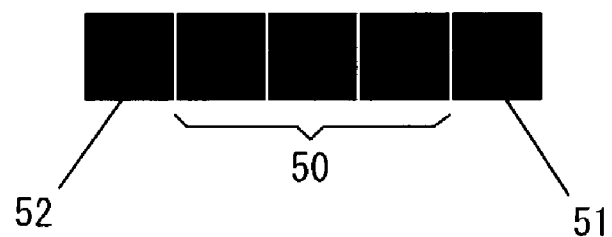
FIG. 3(b) is an illustration, showing an example of a three-times magnified pattern and horizontally contiguously adjacent sub-pixel patterns next thereto.
Figure 3C:
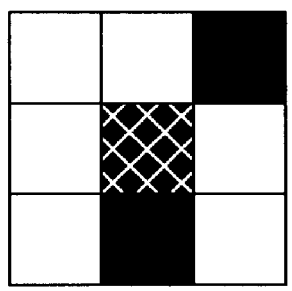
FIG. 3(c) is an illustration, showing another example of a reference pattern.
Figure 3D:
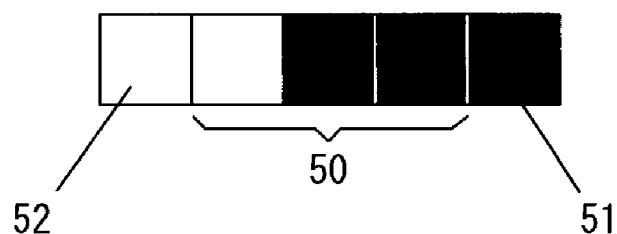
FIG. 3(d) is an illustration, showing another example of a three-times magnified pattern and horizontally contiguously adjacent sub-pixel patterns next thereto.

Referring to FIG. 3(a), when the eight pixel-based reference pattern is entirely black, then, as illustrated in FIG. 3(b), a three-times magnified pattern 50 is set to consist of a central black target pixel and black pixels contiguously adjacent thereto. With further reference to FIG. 3(b), horizontally contiguously adjacent sub-pixel patterns 51, 52 next to the three-times magnified pattern 50 are set to be black as well.

Figure 3E:
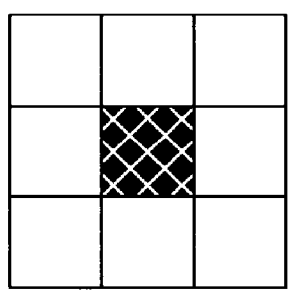
FIG. 3(e) is an illustration, showing a further example of a reference pattern.
Figure 3F:
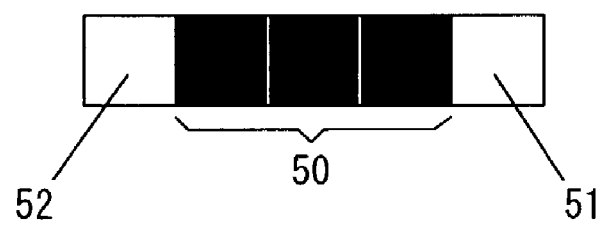
FIG. 3(f) is an illustration, showing a further example of a three-times magnified pattern and horizontally contiguously adjacent sub-pixel patterns next thereto.

Conversely, as illustrated in FIG. 3(e), when the eight pixel-based reference pattern is entirely white, then, as illustrated in FIG. 3(f), the three-times magnified pattern 50 is set to consist of a central black target pixel and black pixels contiguously adjacent thereto. With further reference to FIG. 3(f), the horizontally contiguously adjacent sub-pixel patterns 51, 52 next to the three-times magnified pattern 50 are set to be white.

For a variety of intermediate reference patterns between the above opposite patterns, three-times magnified pattern/horizontally contiguously adjacent sub-pixel pattern-determining rules are established in advance. When the rules are all set up, then the 256-different combinations are defined, as previously discussed. Alternatively, fewer rules may be pre-established in view of symmetry and black-white inversion.

In FIG. 3, the target pixel is marked with hatched lines for convenience of description although the target pixel is actually black. This is done in order to show that the eight pixel-based reference pattern excludes the target pixel.

The above discusses an example in which the three-times magnified pattern and the horizontally contiguously adjacent sub-pixel patterns next thereto are determined according to pattern matching.

The three-times magnified pattern/horizontally contiguously adjacent sub-pixel pattern-determining rules as illustrated in FIG. 3 are prepared in order to display smoother (less jagged) lines than those displayed on a pixel-by-pixel basis. Such a smoother display is achievable using the per-sub-pixel technique in which a resolution magnified three times in the first direction is available.

The determined three-times magnified pattern is allocated to three sub-pixels that form a target pixel. The determined horizontally contiguously adjacent sub-pixel patterns are allocated to horizontally contiguously adjacent sub-pixels next to the target pixel.

As discussed above, the three-times magnified pattern and the horizontally contiguously adjacent sub-pixel patterns next thereto are determined, thereby providing five sub-pixel patterns. The use of the five sub-pixel patterns allows a pixel in an original image to be horizontally displaced by an amount of a sub-pixel without any change in pixel value when an image is displayed on a per sub-pixel basis. Such processing is herein called "shifting".

Figure 4A:
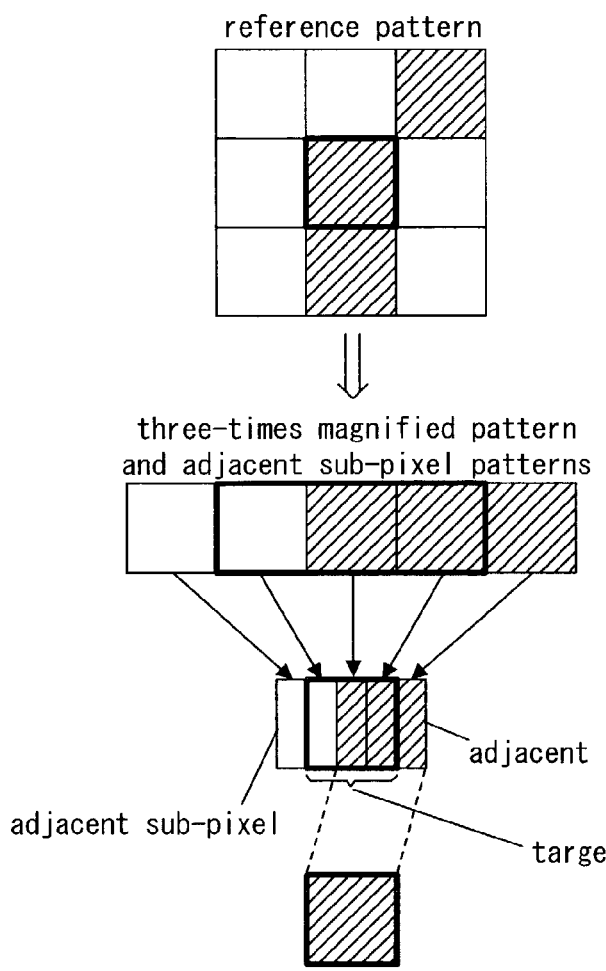
FIG. 4(a) is a descriptive illustration, showing how a pixel experiences the shifting.
Figure 4B:
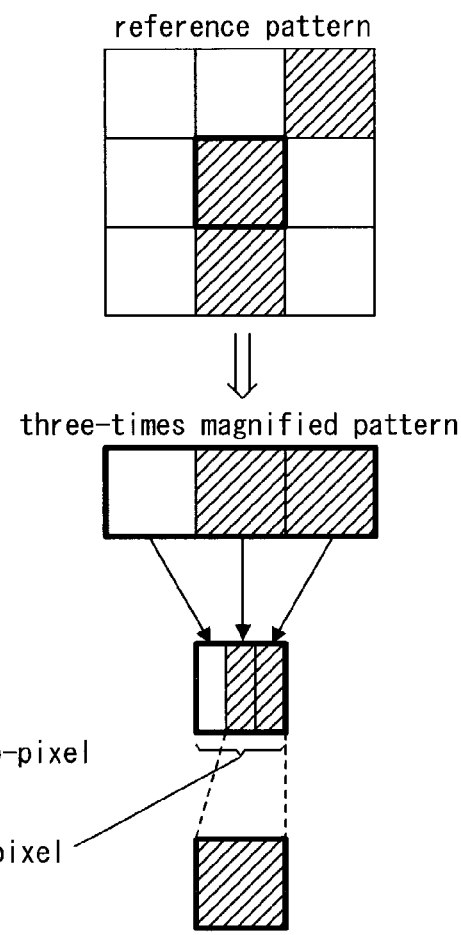
FIG. 4(b) is a descriptive illustration, showing a pixel subject to no shifting.

FIG. 4 is a descriptive illustration, showing how a pixel experiences the shifting. FIG. 4(a) corresponds to FIGS. 3(c) and 3(d), and illustrates the manner in which the shifting is practiced. FIG. 4(b) is a descriptive illustration, showing the case in which no shifting takes place. In FIG. 4, all pixels and sub-pixels defined by hatched lines are black. In FIG. 4, each pixel marked with a bold line denotes a target pixel.

As illustrated by arrows in FIG. 4(a), when a three-times magnified pattern and horizontally contiguously adjacent sub-pixel patterns next thereto are determined on the basis of an eight pixel-based reference pattern, then the determined three-times magnified pattern is allocated to three sub-pixels that form a target pixel, while the determined sub-pixel patterns are allocated to horizontally contiguously adjacent sub-pixels next to the target pixel.

When an image processed as above is displayed on a per sub-pixel basis, then a black area in an original image, defined as a target pixel, is displaced rightward by an amount of a sub-pixel without any change in size of a pixel that corresponds to three sub-pixels.

In other words, although the pixel is technically immovable, it may imaginarily be though that the black pixel in the original image is moved rightward by an amount of a sub-pixel without any change in pixel value when an image is displayed on a per sub-pixel basis. Such behavior refers to the shifting as previously discussed.

Referring now to FIG. 4(b), when only the three-times magnified pattern is determined from the eight pixel-based reference pattern, then the three-times magnified pattern is allocated to the target pixel-forming three sub-pixels, as shown by an arrow.

As a result, as illustrated in FIG. 4(b), a black area in a target pixel is reduced in width. The reduced black area corresponds to two sub-pixels. In this instance, a problem as shown in FIG. 5(c) is likely to occur, as discussed later.

Figure 5B:
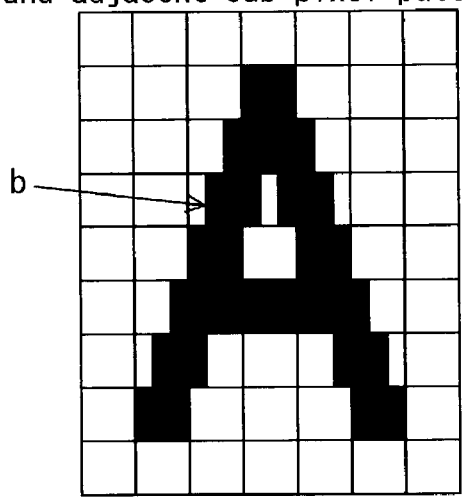
FIG. 5(b) is a descriptive illustration, showing beneficial effects of the present embodiment.
Figure 5A:
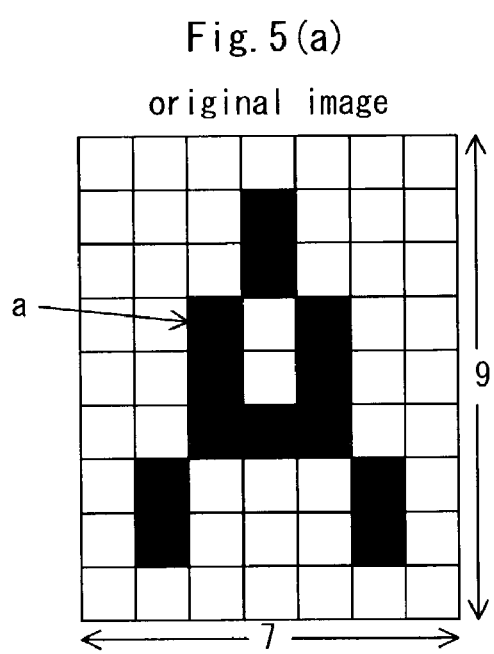
FIG. 5(a) is a descriptive illustration, showing beneficial effects of the present embodiment.
Figure 5C:
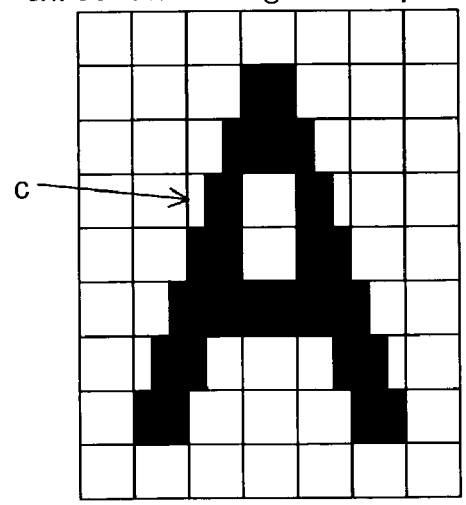
FIG. 5(c) is a descriptive illustration, showing beneficial effects of the present embodiment.

FIG. 5 is a descriptive illustration, showing beneficial effects of the present embodiment. FIG. 5(a) illustrates an original image. FIG. 5(b) illustrates one image displayed on a per sub-pixel basis after a three-times magnified pattern and horizontally contiguously adjacent sub-pixel patterns next thereto are determined. FIG. 5(c) illustrates another image displayed on a per sub-pixel basis after only the three-times magnified pattern is determined. Note that FIG. 5 displays the alphabetical character "A" over a display screen area that consists of nine pixels-by-seven pixels.

A comparison is now made between one pixel designated by arrow "a" of FIG. 5(a) and another indexed by arrow "c" of FIG. 5(c). In the image of FIG. 5(c), which is displayed on a per sub-pixel basis after only the three-times magnified pattern is determined, a black pixel is rendered smaller by an amount of a sub-pixel in a manner similar to FIG. 4(b).

As a result, the entire image as seen in FIG. 5(C) is mixed with three black sub-pixels and only two black sub-pixels. As shown by arrow C, this structure partially reduces the size of a black line that forms the character "A". This means that the image suffers from a varied density.

Another comparison is now made between one pixel designated by arrow "a" of FIG. 5(a) and another indexed by arrow "b" of FIG. 5(b). In the image of FIG. 5(b), which is displayed on a per sub-pixel basis after the three-times magnified pattern and the horizontally contiguously adjacent sub-pixel patterns next thereto are determined, a black pixel is displaced rightward by an amount of a sub-pixel in a manner similar to the shifting of FIG. 4(a) without any change in pixel value.

As a result, as illustrated in FIG. 5(b), the black line that forms the character "A" remains unchanged in size when the shifting is practiced after the three-times magnified pattern and the horizontally contiguously adjacent sub-pixel patterns next thereto are determined. Therefore, no variation in density of the image occurs.

In conclusion, as shown in FIG. 5(b), when an image is displayed on a per sub-pixel basis after the three-times magnified pattern and the horizontally contiguously adjacent sub-pixel patterns next thereto are determined, then the character "A" provides a more definite and smoother display than when the image is displayed on a per sub-pixel basis after only the three-times magnified pattern is determined, as shown in FIG. 5(c).

As previously discussed, the three-times magnified pattern/horizontally contiguously adjacent sub-pixel pattern-determining rules are established in order to display smoother lines when an image is displayed on a per sub-pixel basis than an original image object displayed on pixel-by-pixel basis.

The three-times magnified pattern/horizontally contiguously adjacent sub-pixel pattern-determining rules are not established to practice the shifting for every bitmap pattern extracted by the bitmap pattern-extracting unit 8. In other words, the rules such as to allow the shifting to be carried out are not established when the shifting is likely to adversely affect the smoothness of the image lines.

The following discusses an illustrative example in which the three-times magnified pattern/horizontally contiguously adjacent sub-pixel pattern-determining rules to permit the shifting to be practiced are not established, in order to display smoother lines than an original image object displayed on a pixel-by-pixel basis.

Figure 6A:
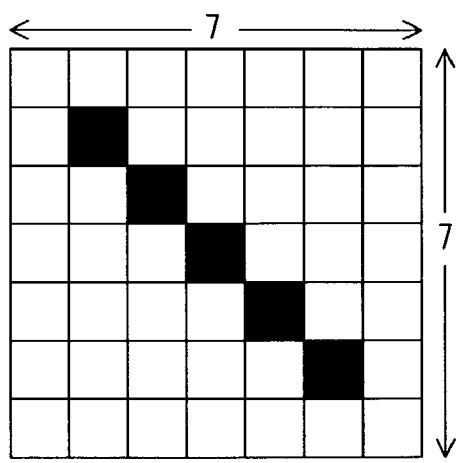
FIG. 6(a) is an illustration, showing an example of an original image in which no shifting is carried out.
Figure 6B:
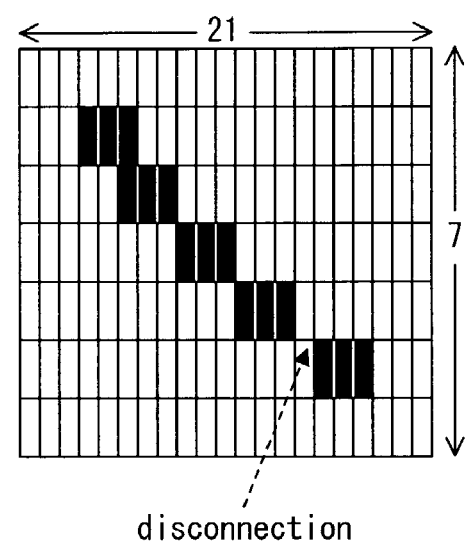
FIG. 6(b) is a descriptive illustration, showing an inconvenience that may occur when it is assumed that the shifting is practiced.

FIG. 6 is a descriptive illustration, showing an example in which no shifting is practiced. FIG. 6(a) illustrates an original image when no shifting is executed. FIG. 6(b) illustrates an image displayed on a per sub-pixel basis when it is assumed that the shifting is executed.

Assume that the three-times magnified pattern/horizontally contiguously adjacent sub-pixel pattern-determining rules are established in order to practice the shifting in the original image as shown in FIG. 6(a).

As illustrated in FIG. 6(b), when the image is displayed on a per sub-pixel basis in accordance with the above rules, then a disconnection is found between black pixels because a white sub-pixel occurs therebetween. In order to inhibit the occurrence of the disconnection, and thus to realize a smooth display, three-times magnified pattern/horizontally contiguously adjacent sub-pixel pattern-determining rules as given below are established.

FIG. 7 is an illustration, showing, by way of illustration, three-times magnified pattern/horizontally contiguously adjacent sub-pixel pattern-determining rules in which no shifting is involved.

Figure 7A:
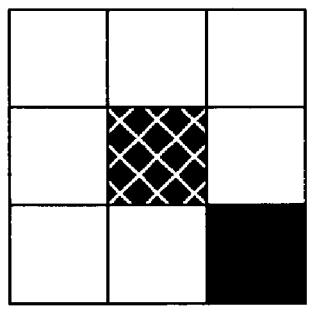
FIG. 7(a) is an illustration, showing an example of a reference pattern.
Figure 7B:
FIG. 7(b) is an illustration, showing an example of a three-times magnified pattern with horizontally contiguously adjacent sub-pixel patterns next thereto.
Figure 7C:
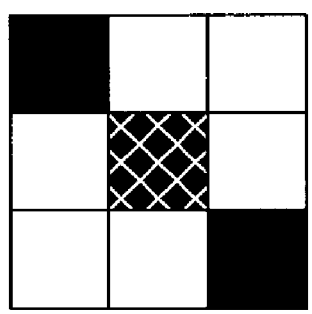
FIG. 7(c) is an illustration, showing another example of a reference pattern.
Figure 7D:
FIG. 7(d) is an illustration, showing another example of a three-times magnified pattern with horizontally contiguously adjacent sub-pixel patterns next thereto.
Figure 7E:
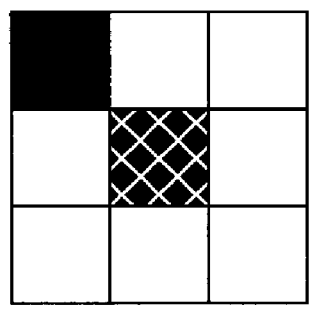
FIG. 7(e) is an illustration, showing a further example of a reference pattern.
Figure 7F:
FIG. 7(f) is an illustration, showing a further example of a three-times magnified pattern with horizontally contiguously adjacent sub-pixel patterns next thereto.

When an eight pixel-based reference pattern is provided as illustrated in FIG. 7(a), then a three-times magnified pattern and horizontally contiguously adjacent sub-pixel patterns next thereto are defined as shown in FIG. 7(b). When another eight pixel-based reference pattern is provided as illustrated in FIG. 7(c), then a corresponding three-times magnified pattern and horizontally contiguously adjacent sub-pixel patterns next thereto are defined as shown in FIG. 7(d). When a further eight pixel-based reference pattern is provided as illustrated in FIG. 7(e), then a corresponding three-times magnified pattern and horizontally contiguously adjacent sub-pixel patterns next thereto are defined as shown in FIG. 7(f).

Figure 8:
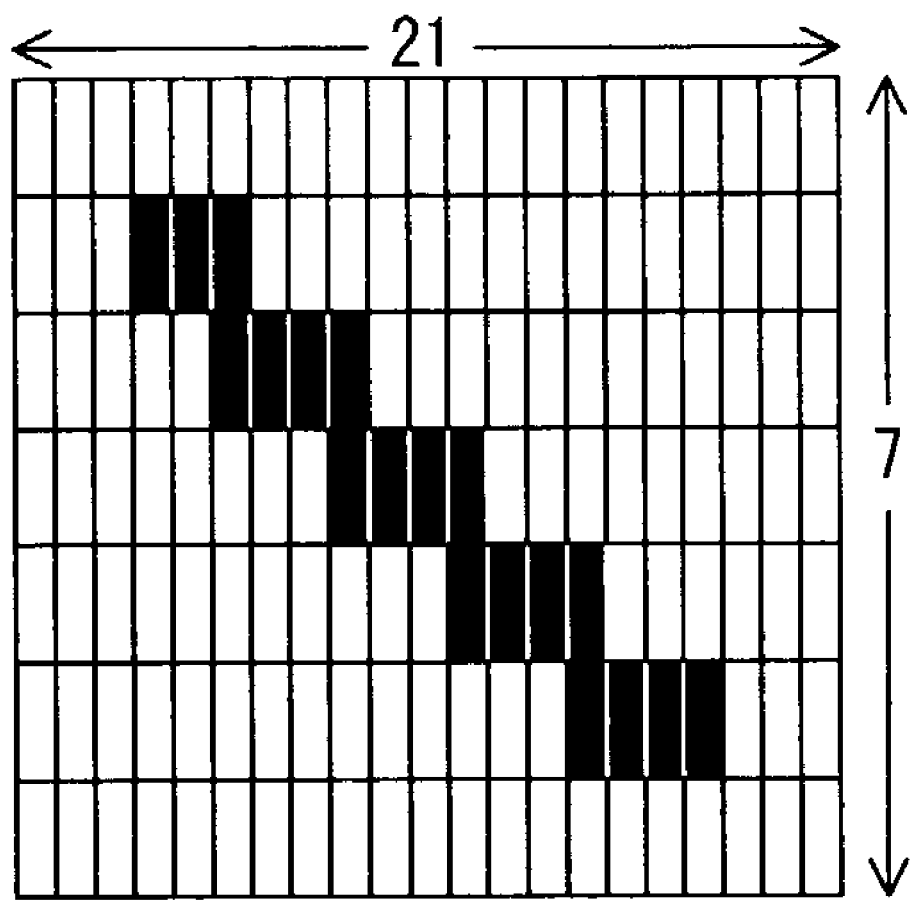
FIG. 8 is an illustration, showing an example of an image displayed on a per sub-pixel basis in accordance with rules of FIG. 7, in which the displayed image is derived from the image of FIG. 6(a) as an original image.

FIG. 8 illustrates an image displayed on a per sub-pixel basis on the basis of the original image of FIG. 6(a) according to the rules of FIG. 7.

The image in FIG. 8 is varied in line width, when compared with the original image, but includes no disconnection as shown in FIG. 6(b). As a result the image in FIG. 8 provides a smoother display than that of FIG. 6(b).

When a slanted line is displayed as shown in the original image of FIG. 6(a), then a line width variation with a per sub-pixel display as shown in FIG. 8 is rendered less conspicuous. Moreover, each overlap between the pixels by an amount of a sub-pixel provides a visibly smoother image, resulting in successful effects.

Similar to FIG. 7, FIGS. 3(a), (b), (e), (f) illustrate the rules in which no shifting is carried out.

As previously discussed, the bitmap pattern-extracting unit 8 and the pattern-determining unit 9 perform the above-described courses of processing only with regard to the black target pixel. It is now discussed with reference to FIG. 5(a) how the bitmap pattern-extracting unit 8 and the patter-determining unit 9 provide beneficial effects under such a condition.

The original image in FIG. 5(a) includes thirteen black pixels among a total of sixty-three pixels. Pursuant to the present embodiment, the thirteen black pixels are subjected to the above processing. Therefore, an amount of processing can be reduced to 21%, when compared with the case in which all of the pixels experience the same processing.

The above processing determines a three-times magnified pattern and horizontally contiguously adjacent sub-pixel patterns next thereto. In this case, a pixel is leftward and rightward displaced by an amount of a sub-pixel. The following discusses such two-way pixel displacement with reference to the drawings.

FIG. 9 is a descriptive illustration, showing modes of the shifting when a three-times magnified pattern and horizontally contiguously adjacent sub-pixel patterns next thereto are determined. In FIG. 9, each rectangle outlined by a bold line denotes a target pixel.

Figure 9A:
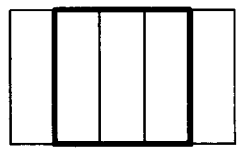
FIG. 9(a) is a descriptive illustration, showing five sub-pixels, to which a three-times magnified pattern and horizontally contiguously adjacent sub-pixel patterns next thereto are allocated.
Figure 9B:
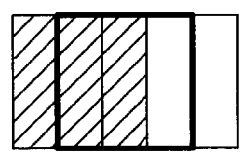
FIG. 9(b) is a descriptive illustration, showing leftward shifting in which a pixel is displaced leftward by an amount of a sub-pixel.
Figure 9C:
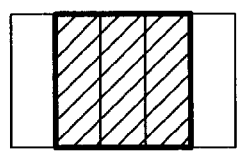
FIG. 9(C) is a descriptive illustration, showing the pixel subjected to no shifting.
Figure 9D:
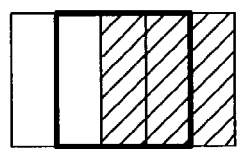
FIG. 9(d) is a descriptive illustration, showing rightward shifting in which the pixel is displaced rightward by an amount of a sub-pixel.

FIG. 9(a) illustrates five pixels, to which the three-times magnified pattern and the horizontally contiguously adjacent sub-pixel patterns next thereto are allocated. FIG. 9(b) illustrates a black pixel displaced leftward by an amount of a sub-pixel. FIG. 9(c) illustrates the black pixel at a standstill. FIG. 9(d) illustrates the black pixel displaced rightward by an amount of a sub-pixel.

As seen from the above description, the black pixel can be displaced horizontally by an amount of a sub-pixel without any change in pixel value when the three-times magnified pattern and the horizontally contiguously adjacent sub-pixel patterns next thereto are determined.

This is demonstrated merely by way of illustration. The present embodiment is not limited to the above determination of the three-times magnified pattern and the horizontally contiguously adjacent sub-pixel patterns next thereto. For example, a three-times magnified pattern of a target pixel, a "x" ("x" is an integer) number of sub-pixel patterns aligned with the target pixel in the first direction on one side of the target pixel, and a "y" ("y" is a natural number) number of sub-pixel patterns aligned with the target pixel in the first direction on the other side of the target pixel can be determined in order to display an image on per sub-pixel basis.

Different from the shifting as illustrated in FIG. 9, in this instance, there are other different modes of the shifting. A more detailed description is now made under the assumption of x=1 and y=2.

FIG. 10 is a descriptive illustration, showing modes of the shifting when the following is determined: a three-times magnified pattern of a target pixel; a sub-pixel pattern aligned with the target pixel in the first direction on the left side of the target pixel; and two sub-pixel patterns aligned with the target pixel in the first direction on the right side of the target pixel. Note that each rectangle outlined by a bold line in FIG. 10 denotes the target pixel.

Figure 10A:
FIG. 10(a) is a descriptive illustration, showing six sub-pixels, to which a three-times magnified pattern and horizontally contiguously adjacent sub-pixel patterns next thereto are allocated.

FIG. 10(a) illustrates six sub-pixels, to which the three-times magnified pattern and the sub-pixel patterns next thereto are allocated.

More specifically, the three-times magnified pattern is allocated to target pixel-forming three sub-pixels; the sub-pixel pattern aligned with the target pixel in the first direction on the left side of the target pixel is allocated to a leftward sub-pixel next to the target pixel; and the two sub-pixel patterns aligned with the target pixel in the first direction on the right side of the target pixel is allocated to two rightward sub-pixels next to the target pixel.

Figure 10B:
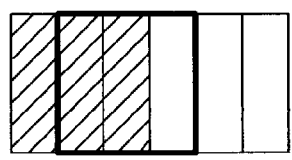
FIG. 10(b) is a descriptive illustration, showing leftward shifting in which a pixel is displaced leftward by an amount of a sub-pixel.
Figure 10C:
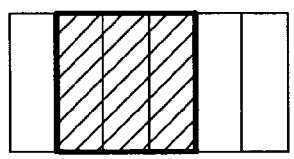
FIG. 10(C) is a descriptive illustration, showing the pixel experiencing no shifting.
Figure 10D:
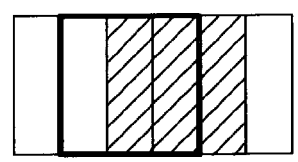
FIG. 10(d) is a descriptive illustration, showing rightward shifting in which the pixel is displaced rightward by an amount of a sub-pixel.
Figure 10E:
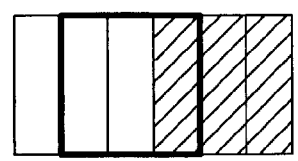
FIG. 10(e) is a descriptive illustration, showing rightward shifting in which the pixel is displaced rightward by amounts of two sub-pixels.

The shifting in this example includes three modes in which: a black pixel is displaced leftward by an amount of a sub-pixel (see FIG. 10(b)); the black pixel is displaced rightward by an amount of a sub-pixel (see FIG. 10(d)); and, the black pixel is displaced rightward by amounts of two sub-pixels (see FIG. 10(e)). FIG. 10(c) illustrates the black pixel at a standstill.

As seen from the above, even when the numbers "x" and "y" differ from one another as discussed above, the shifting is possible to perform. As a result, beneficial effects similar to those of FIG. 5 are provided.

Similarly, other various modes of the shifting are realized using several different combinations of "x" and "y", with the result that they also provide beneficial effects similar to those of FIG. 5.

In addition to the mode in which a pixel is horizontally moved by an amount of a sub-pixel, the "shifting" according to the present embodiment includes another mode in which the pixel is horizontally displaced by amounts of a "k" ("k" is a natural number) number of sub-pixels according to predetermined values of "x" and "y".

Even when either "x" or "y" is zero, the shifting is achievable although it is unilateral shifting, or rather only either rightward or leftward shifting. As a result, such unilateral shifting also provides beneficial effects similar to those of FIG. 5.

Note that the rules for determining a three-times magnified pattern of a target pixel and x, y numbers of sub-pixel patterns aligned with the target pixel in the first direction are not established to provide the shifting for every bitmap pattern extracted by the bitmap pattern-extracting unit 8.

As previously described, the rules are established in order to display smoother lines when an image is displayed on a per sub-pixel basis than an original image object displayed on a pixel-by-pixel basis.

The above discusses the shifting in which a black "pixel" in an original image is horizontally displaced by amounts of the "k" ("k" is a natural number) number of sub-pixels without any change in pixel value in order to display an image on a per sub-pixel basis.

The above-described shifting is carried out in order to make no difference in line width of every object (characters, symbols, figures, or a combination thereof) between an original image and an image displayed on a per sub-pixel basis. In brief, the object has a line width corresponding to an amount of a black pixel.

However, the shifting is not limited to the above. For an original image in which an object has a line width corresponding to an amount of a black pixel, the object line width can freely be set when the object is displayed on a per sub-pixel basis. Further details thereon are made below with reference to an illustrative example.

Assume that an original image includes a character whose line width corresponds to an amount of a black pixel. Further assume that the character line width is magnified to an extent that corresponds to five black sub-pixels when an image is displayed on a per sub-pixel basis.

In this instance, the line width of the original image displayed by an amount of the single black pixel is regarded as a black area that consists of the five sub-pixels. Then, the shifting is practiced, in which the five sub-pixel-based black area is displaced horizontally by amounts of a "k" ("k" is a natural number) number of sub-pixels without any change in size of the black area.

In short, the "shifting" according to the present embodiment may be considered in that, when an original image representative of an object is displayed on a per sub-pixel basis, then an object line that consists of a "j" ("j" is a natural number) number of sub-pixels is horizontally displaced by amounts of a "k" ("k" is a natural number) number of sub-pixels without any change in size of the object line that corresponds to the "j" number of sub-pixels. The object line is equal in width to the "j" number of sub-pixels.

In other words, although the sub-pixels are technically immovable, the "shifting" according to the present embodiment may imaginarily be though that, when an original image representative of an object is displayed on a per sub-pixel basis, then the "j" ("j" is a natural number) number of sub-pixels, which form the object line, is horizontally displaced by amounts of the "k" ("k" is a natural number) number of sub-pixels without any change in total amount of the "j" number of sub-pixels. The object line is equal in width to the "j" number of sub-pixels.

When an object subject to the shifting as previously described is displayed on a per sub-pixel basis, then a smoother display is provided than when an original image object has a line width simply increased or decreased in size.

The following discusses an example in which an object in an original image has a simply increased line width. Assume that an original image contains a character whose line width is equal in size to a black pixel. Further assume that the character has the line width formed by five black sub-pixels when the object is displayed on a per sub-pixel basis.

In this instance, three sub-pixels corresponding to the black pixel of the original image as well as horizontally contiguously adjacent sub-pixels next to the three sub-pixels are rendered black.

The following discusses another example in which an object in an original image has a simply decreased line width. Assume that an original image contains a character whose line width is equal in size to a black pixel. Further assume that the character has the line width defined by two black sub-pixels when the object is displayed on a per sub-pixel basis.

In this instance, central and leftward sub-pixels are rendered black among the three sub-pixels that correspond to the black pixel of the original image.

Note that, even when there is a difference in object line width between an original image and an image displayed on a per sub-pixel basis, the rules for determining a three-times magnified pattern of a target pixel and "x", "y" numbers of respective sub-pixel patterns aligned with the target pixel in the first direction are not established to provide the shifting for every bitmap pattern extracted by the bitmap pattern-extracting unit 8.

As previously described, the rules are set up in order to provide smoother lines when an image is displayed on a per sub-pixel basis than an original image object displayed on a pixel-by-pixel basis. In view of the above, the three-times magnified pattern/horizontally contiguously adjacent sub-pixel pattern-determining rules such as to allow the shifting to be practiced are not established when the shifting adversely affects the line smoothness.

The following describes with reference to the drawings the line smoothness that is obtained when a three-times magnified pattern and horizontally contiguously adjacent sub-pixels patterns next thereto are determined according to the definition of x=y=1, and further when the pattern-determining unit 9 provides five-bit output.

Figure 11A:
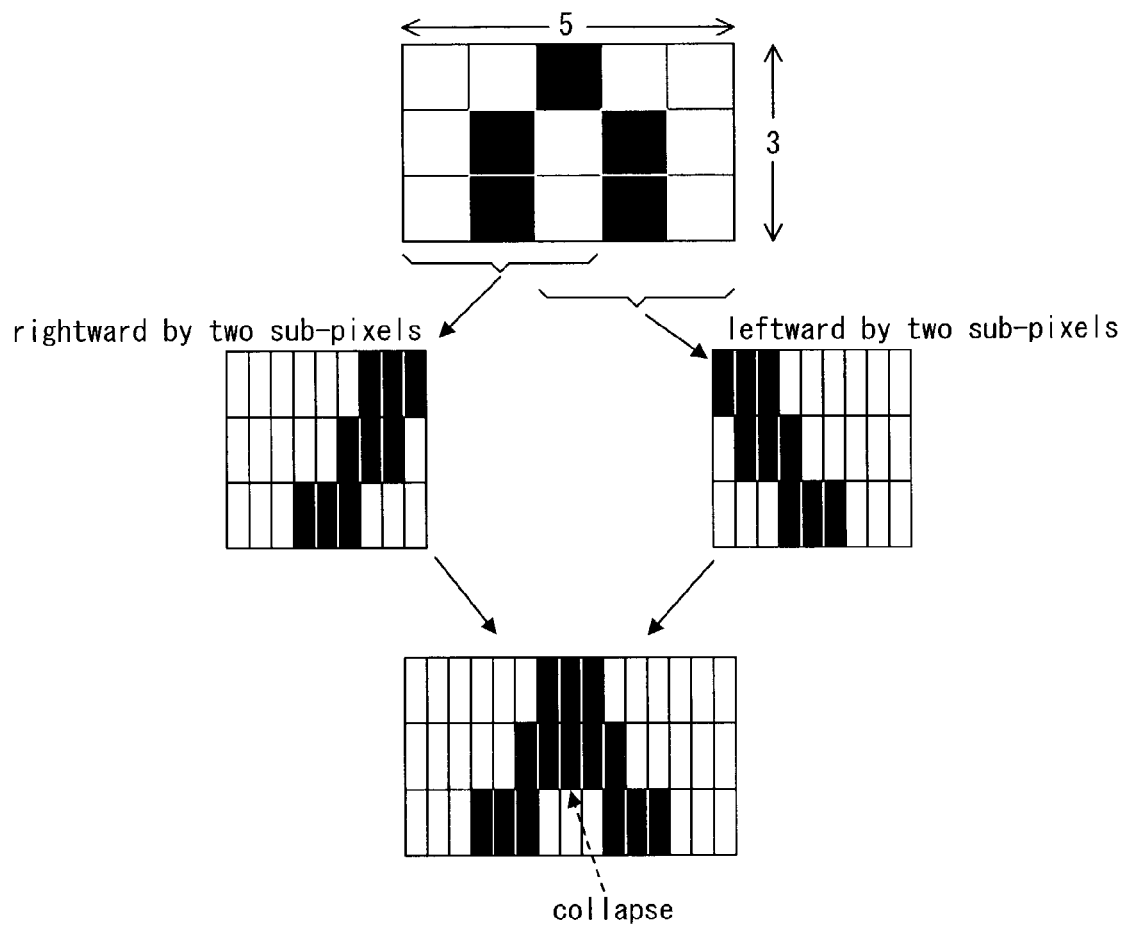
FIG. 11(a) is a descriptive illustration, showing an inconvenience that occurs when the numbers x, y are defined as x=y=2.
Figure 11B:
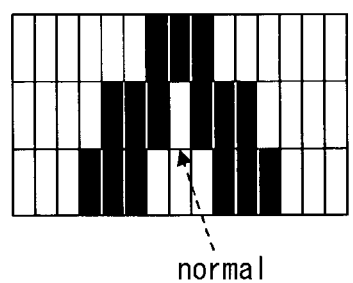
FIG. 11(b) is a description illustration, showing beneficial effects that occur when the numbers x, y are defined as x=y=1.

FIG. 11 is a descriptive illustration, showing the line smoothness under the assumption of x=y=1. Note that FIG. 11 illustrates an inverted V-shaped line in an area that consists of three pixels-by-five pixels.

FIG. 11(*a*) illustrates an example in which a three-times magnified pattern of a target pixel, two sub-pixel patterns aligned with the target pixel in the first direction on the left side of the target pixel, and two sub-pixel patterns aligned with the target pixel in the first direction on the right side of the target pixel are determined according to the definition of x=y=2. The pattern-determining unit 9 provides seven-bit output.

In FIG. 11(*a*), a black pixel positioned at the second row and the second column is displaced rightward by amounts of two sub-pixels, while a black pixel positioned at the second row and the fourth column is displaced leftward by amounts of two sub-pixels.

As a result, a character as shown in FIG. 11(*a*) is partially collapsed and blacked out in out line. In short, when the numbers x, y are defined as x=y=2, then such an objectionable character is likely to occur as a result of the shifting.

FIG. 11(*b*) illustrates an example in which the three-times magnified pattern and horizontally contiguously adjacent sub-pixel patterns next thereto are determined according to the definition of x=y=1. The pattern-determining unit 9 provides five-bit output.

As a result, no smears are found in a character of FIG. 11(*b*). For x=y=1, the character smearing is inhibited when the shifting according to the present embodiment is practiced. This is because the shifting displaces a pixel by an amount of only one sub-pixel.

Next, each component in FIG. 1 is described under the condition of n=m=1 and x=y=1.

As illustrated in FIGS. 3 and 7, the reference pattern storage unit 10 stores each reference pattern as well as a corresponding three-times magnified pattern with horizontally contiguously adjacent sub-pixel patterns next thereto. In the reference pattern storage unit 10, the reference patterns are correlated with the three-times magnified patterns with the horizontally contiguously adjacent sub-pixel patterns.

As previously discussed, the pattern-determining unit 9 references the reference pattern storage unit 10, and then determines a three-times magnified pattern and horizontally contiguously adjacent sub-pixel patterns next thereto using pattern matching as illustrated in FIGS. 3 and 7.

The three-times magnified image data storage unit 11 stores three-times magnified image data that corresponds to an original image. The three-times magnified image data includes the three-times magnified pattern and the horizontally contiguously adjacent sub-pixel patterns next thereto, which are all determined by the pattern-determining unit 9. The three-times magnified image data is allocated to three sub-pixels (light-emitting elements) that form a pixel.

The three-times magnified image stored in the three-times magnified image data storage unit 11 is filtered by the filtering unit 12 in a manner as herein discussed in the section of the prior art. The filtered image is put into the display image storage unit 4.

The above describes an example in which the three-times magnified pattern and the horizontally contiguously adjacent sub-pixel patterns next thereto are determined using the pattern matching as shown in FIG. 3. Alternatively, the three-times magnified pattern and the horizontally contiguously adjacent sub-pixel patterns next thereto may be expressed by bits as given below.

Referring to FIG. 12, assume that black and while are expressed by 0 (zero) and 1 (one), respectively. In a reference pattern, whites and blacks defined by eight pixels can be expressed by respective "0" or "1" bit strings (eight digits) in the order ranging from an upper-left pixel to a lower-right pixel.

When the reference pattern that consists of the eight pixels is all black as illustrated in FIG. 3(*a*), then the reference pattern may be expressed by bit string 00000000. A corresponding three-times magnified pattern with horizontally contiguously adjacent sub-pixel patterns next thereto may be expressed by bit string 00000. (See the top of FIG. 12.)

Conversely, when the reference pattern that consists of the eight pixels is entirely white as illustrated in FIG. 3(*e*), then the reference pattern may be expressed by bit string 11111111. A corresponding three-times magnified pattern with horizontally contiguously adjacent sub-pixel patterns next thereto may be expressed by bit string 10001. (See the bottom of FIG. 12.)

Similar to the above, even with such bit string expression, the three-times magnified pattern/horizontally contiguously adjacent sub-pixel pattern-determining rules are established in advance for a variety of intermediate reference patterns between bit strings 00000000 and 11111111. When all of the rules are set up, then two hundred and fifty six (256) different combinations as previously discussed are defined. Alternatively, fewer rules may be pre-established by omitting part of the rules in view of symmetry and black-white inversion.

The rules using the bit string are placed into the reference pattern storage unit 10, in which the reference patterns are correlated with the three-times magnified patterns using an arrangement or other known storage structures, while the bit strings are itemized by indexes. This system allows a desired three-times magnified pattern with horizontally contiguously adjacent sub-pixel patterns next thereto to be found immediately when the reference pattern storage unit 10 is referenced by a corresponding index.

Other equivalent notations such as a hexadecimal notation may, of course, replace the eight-digit bit string.

As discussed above, when the three-times magnified pattern/horizontally contiguously adjacent sub-pixel pattern-determining rules are expressed by bits, then as illustrated in FIG. 12, the reference pattern storage unit 10 stores bit strings that express by bits each reference pattern and a corresponding three-times magnified pattern with horizontally contiguously adjacent sub-pixel patterns next thereto. In the reference pattern storage unit 10, the reference patterns are correlated with the three-times magnified patterns with the horizontally contiguously adjacent sub-pixel patterns next thereto.

In this instance, the pattern-determining unit 9 references the reference pattern storage unit 10, and then determines the three-times magnified pattern and the horizontally contiguously adjacent sub-pixel patterns next thereto on the basis of the results from retrieval using an index as shown in FIG. 12.

Figure 13:
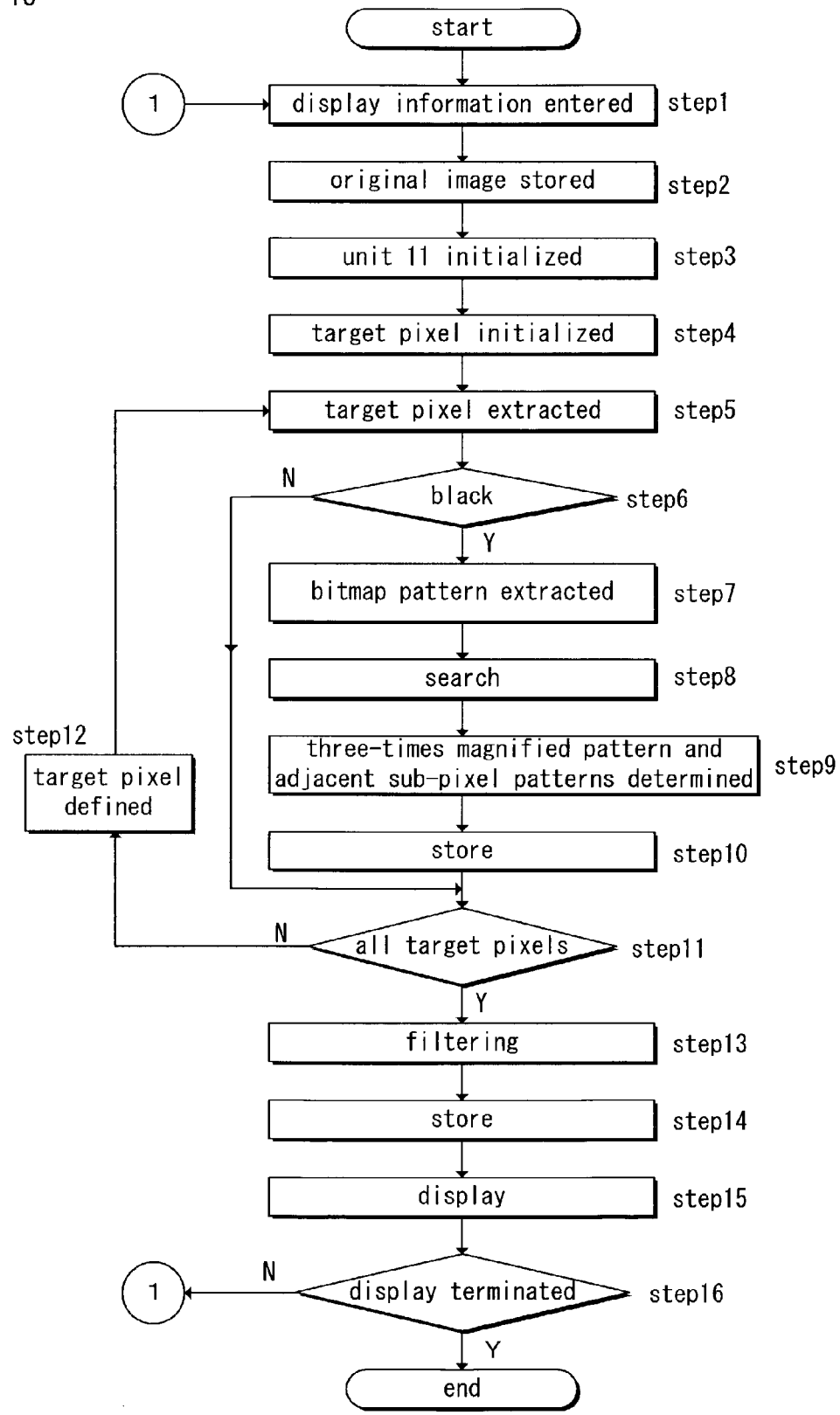
FIG. 13 is a flowchart, illustrating how the display equipment behaves.

A flow of processing is now described using the display equipment of FIG. 1 with reference to FIG. 13 under the assumption of n=m=1 and x=y=1. At step 1, the display information input unit 1 enters display information.

When the display information input unit 1 instructs the display control unit 2 to display a specific raster font data stored in the original image data group storage unit 5, then the display control unit 2 places a current raster font data in the original image data group storage unit 5 by way of original image data into the original image data storage unit 6 without changing the raster font data.

When the display information input unit 1 instructs the display control unit 2 to display a specific vector font data, then the display control unit 2 draws the vector font data at a predetermined area in order to generate a raster image, and then places the resulting raster image as an original image into the original image data storage unit 6.

Assume that the display information input unit 1 enters a usual raster image into the display control unit 2. The usual raster image is not stored in the original image data group storage unit 5. At step 2, the display control unit 2 draws the entered raster image at a predetermined area, and then places it into the original image data storage unit 6.

At step 3, the display control unit 2 initializes the three-times magnified image data storage unit 11 that contains the determination results from the pattern-determining unit 9. More specifically, when a target pixel is black (ON), then the entire image data storage area of the three-times magnified image data storage unit 11 is initialized to provide white data (OFF) in order to determine a three-times magnified pattern and horizontally contiguously adjacent sub-pixel patterns next thereto. This means that three-times magnified data to be allocated to all sub-pixels that form an original image is initialized to provide white data (OFF). The three-times magnified data corresponds to a single original image.

When the target pixel is white (OFF), then the entire image data storage area of the three-times magnified image data storage unit 11 is initialized to provide black data (ON) in order to determine the three-times magnified pattern and the horizontally contiguously adjacent sub-pixel patterns next thereto.

The following describes an example in which the three-times magnified pattern and the horizontally contiguously adjacent sub-pixel patterns next thereto are determined when the target pixel is black (ON).

At step 4, the display control unit 2 defines a pixel at an upper-left initial position as a target pixel in the target pixel-determining unit 7.

At step 5, the display control unit 2 instructs the target pixel-determining unit 7 to extract the target pixel in order to determine whether or not the target pixel is black.

The target pixel-determining unit 7 extracts the target pixel from original image data stored in the original image data storage unit 6.

At step 6, the target pixel-determining unit 7 determines whether or not the extracted target pixel is processed to determine the three-times magnified pattern and the horizontally contiguously adjacent sub-pixel patterns next thereto. In short, the target pixel-determining unit 7 determines whether or not the extracted target pixel is black (ON).

When the determination in step 6 results in an affirmative answer, then the routine is advanced to step 7. In this instance, the display control unit 2 instructs the bitmap pattern-extracting unit 8 to extract a bitmap pattern that consists of surrounding eight pixels about the target pixel.

When the determination in step 6 results in a negative answer, or when the target pixel is determined to be white (OFF), then the routine is advanced to step 11. At step 12, the display control unit 2 defines each of the remaining pixels as a target pixel when it is found at step 11 that not all pixels have yet been defined as the target pixels.

Figure 14A:
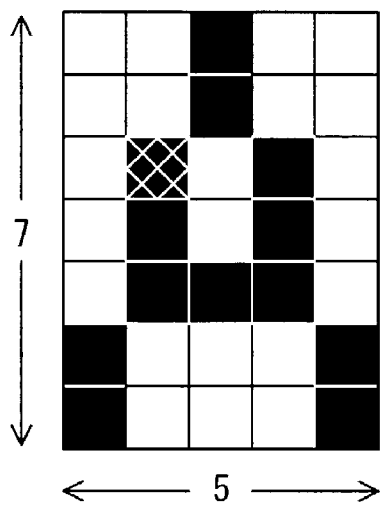
FIG. 14(a) is an illustration, showing an example of an original image.
Figure 14B:
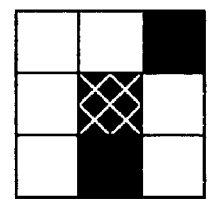
FIG. 14(b) is an illustration, showing an example of a bitmap pattern extracted from the original image.
Figure 14C:
FIG. 14(c) is an illustration, showing an example of a three-times magnified pattern with horizontally contiguously adjacent sub-pixel patterns next thereto.

At step 7, the bitmap pattern-extracting unit 8 extracts the above bitmap pattern from the original image data stored in the original image data storage unit 6, and then returns the extracted bitmap pattern to the display control unit 2. Assume that the pixel defined by hatched lines in FIG. 14(*a*) is a current target pixel. The bitmap pattern-extracting unit 8 extracts a bitmap pattern as illustrated in FIG. 14(*b*). The extracted bitmap pattern consists of neighboring eight pixels about the target pixel, but excludes the target pixel.

Note that the target pixels in FIGS. 14(*a*) and 14(*b*) are marked with the hatched lines for convenience of description. Actually, the target pixels in FIGS. 14(*a*) and 14(*b*) are black.

The display control unit 2 passes the extracted bitmap pattern, upon receipt thereof from the bitmap pattern-extracting unit 8, over to the pattern-determining unit 9, and then instructs the pattern-determining unit 9 to determine a three-times magnified pattern and horizontally contiguously adjacent sub-pixel patterns next thereto. The determined patterns must be matched with the extracted bitmap pattern.

At step 8, the pattern-determining unit 9 references the reference pattern storage unit 10 in order to retrieve the three-times magnified pattern/horizontally contiguously adjacent sub-pixel pattern-determining rules. The pattern-determining unit 9 searches a reference pattern that coincides with the received bitmap pattern. At step 9, the pattern-determining unit 9 determines a proper three-times magnified pattern and horizontally contiguously adjacent sub-pixel patterns next thereto. The patterns all correspond to the searched reference pattern. At step 10, the pattern-determining unit 9 places the determined three-times magnified pattern with horizontally contiguously adjacent sub-pixel patterns into the three-times magnified image data storage unit 11.

For example, the pattern-determining unit 9 searches a reference pattern that is coincident with a bitmap pattern as illustrated in, e.g., FIG. 14(*b*), and then determines a three-times magnified pattern and horizontally contiguously adjacent sub-pixel patterns next thereto on the basis of the searched reference pattern before putting the determined patterns into the three-times magnified image data storage unit 11.

While defining every pixel as a target pixel at step 12, the display control unit 2 repeats, at step 11, the processing of step 5–10 until all of the target pixels are processed. When the pattern-determining unit 9 places the three-times magnified pattern with the horizontally contiguously adjacent sub-pixel patterns in sequence into the three-times magnified image data storage unit 11, then the three-times magnified image data storage unit 11 contains information corresponding to an image as illustrated in FIG. 15.

When the above repeated processing is terminated, then at step 13, the display control unit 2 permits the filtering unit 12 to filter the three-times magnified image data contained in the three-times magnified image data storage unit 11. At step 14, the filtering unit 12 brings the filtered image into the display image storage unit 4.

At step 15, the display control unit 2 allocates the three-times magnified image data to single pixel-forming three light-emitting elements of the display device 3 in accordance with a display image contained in the display image storage unit 4, thereby displaying an image on the display device 3.

Figure 15:
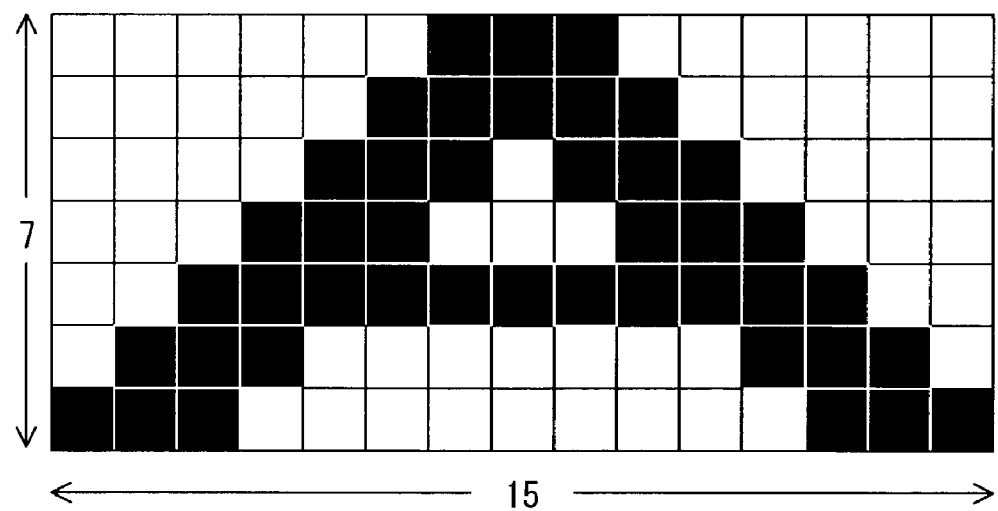
FIG. 15 is an illustration, showing an example of a three-times magnified image.
Figure 16:
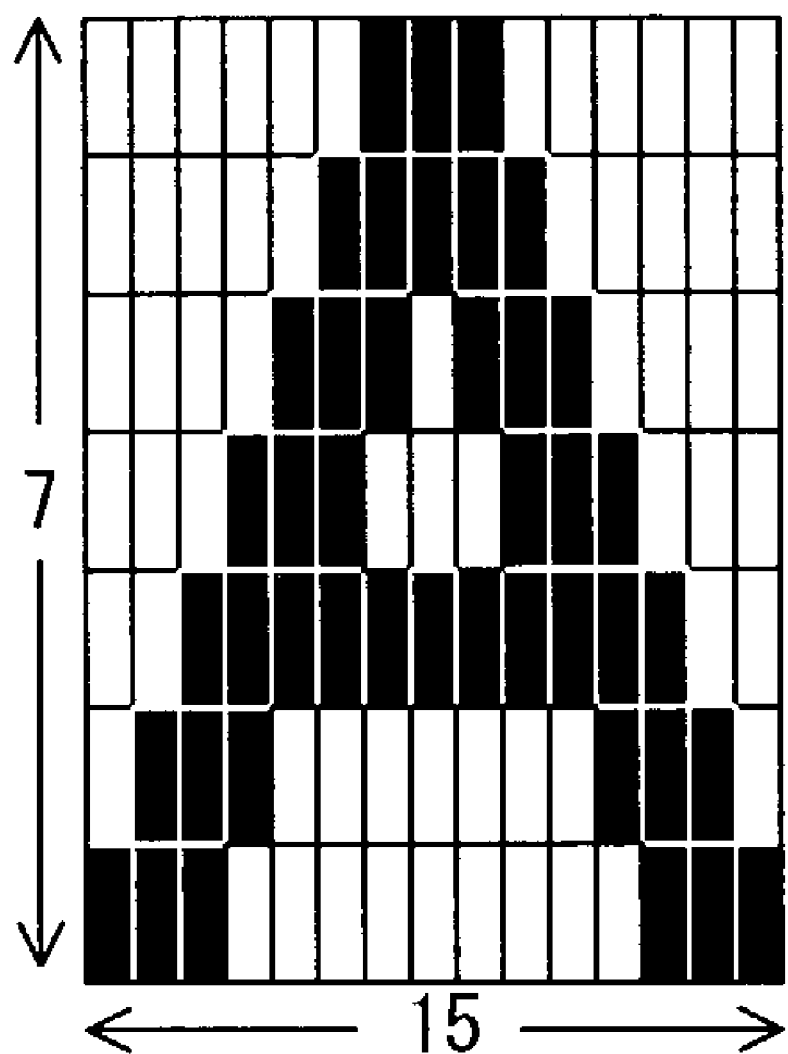
FIG. 16 is an illustration, showing an example of the three-times magnified image displayed on a per sub-pixel basis.

The image in FIG. 15 is displayed in a manner as illustrated in FIG. 16. When the image in FIG. 16 is compared with that of FIG. 14(*a*), then it is found that the image in FIG. 16 is less jaggy and by far legible.

At step 16, the display control unit 2 returns the routine to step 1 when display is non-terminated.

The following describes a specific process by way of illustration with reference to the drawings, in which the pattern-determining unit 9 determines a three-times magnified pattern and horizontally contiguously adjacent sub-pixel patterns next thereto using pattern matching under the assumption of n=m=1 and x=y=1.

Figure 17:
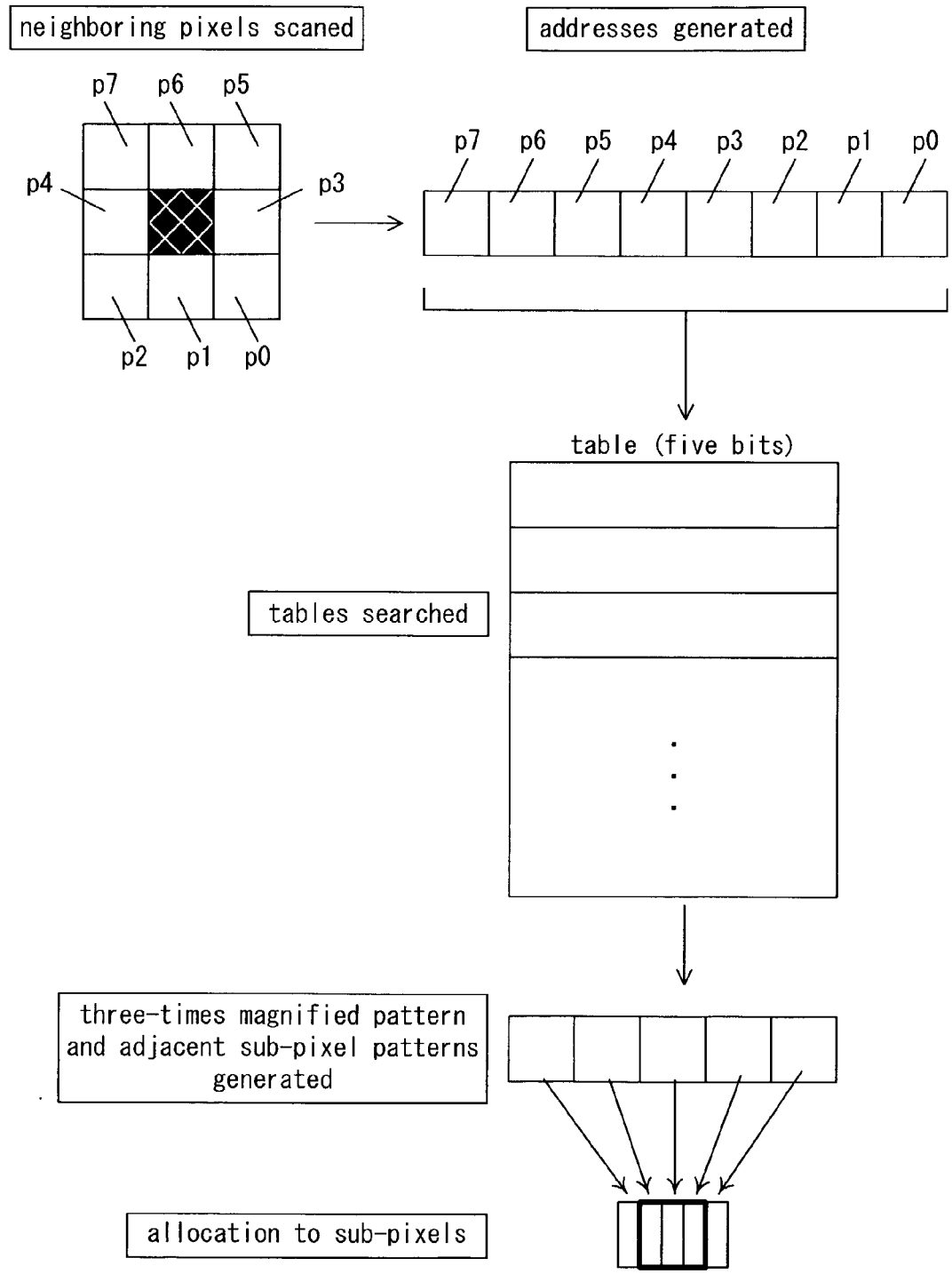
FIG. 17 is an illustration, showing, by way of illustration, the steps of determining a three-times magnified pattern and horizontally contiguously adjacent sub-pixel patterns next thereto.

FIG. 17 illustrates the above specific process.

Assume that a square marked with hatched lines in FIG. 17 is a target pixel. The pattern-determining unit 9 scans neighboring eight pixels p0–p7 about the target pixel in order to generate addresses. Note that the bitmap pattern-extracting unit 8 extracts a bitmap pattern that consists of the neighboring eight pixels although FIG. 17 includes the target pixel for convenience of description.

The pattern-determining unit 9 retrieves tables in the reference pattern storage unit 10, and then defines table data (five bits), which correspond to the generated addresses, as a three-times magnified pattern with horizontally contiguously adjacent sub-pixel patterns next thereto.

The filtering unit 12 filters the determined three-times magnified pattern and horizontally contiguously adjacent sub-pixel patterns next thereto. The filtered three-times magnified pattern and horizontally contiguously adjacent sub-pixel patterns next thereto are allocated to target pixel-forming three sub-pixels and horizontally contiguously adjacent sub-pixels next to the three sub-pixels.

The table in the reference pattern storage unit 10 as discussed above is now described. Since the numbers n, m are defined as n=m=1, the bitmap pattern extracted by the bitmap pattern-extracting unit 8 includes two hundred and fifty six (256)(i.e., the eighth power of 2) different combinations. The resulting addresses include the same number of combinations.

As a result, the reference pattern storage unit 10 includes 256-different tables that correspond to the 256-different addresses.

Each of the tables contains a three-times magnified pattern with horizontally contiguously adjacent sub-pixel patterns next thereto (five-bit data) in accordance with the three-times magnified pattern/horizontally contiguously adjacent sub-pixel pattern-determining rules.

As described with reference to FIGS. 9 and 10, pursuant to the present embodiment, a pixel can be displaced in the first direction by amounts of some sub-pixels according to predetermined "x" and "y" values without any change in pixel value.

This feature makes it possible to suppress a variation in output image density, which otherwise would conspicuously emerge as result of a change in width of a line that describes an object (a character, a symbol, a figure, or a combination thereof) when the object is displayed on a per sub-pixel basis. As a result, a high-quality display on a per sub-pixel basis is achievable. (See FIG. 5.)

At step 6 in FIG. 13, the target pixel-determining unit 7 determines whether or not the target pixel is black. The pattern-determining unit 9 determines the three-times magnified pattern and the horizontally contiguously adjacent sub-pixel patterns next thereto only when the target pixel is black.

This system reduces a total processing time, when compared with the case in which the above patterns are determined with reference to all target pixels. That is, the system load can be reduced. Consequently, the display equipment according to the present embodiment is good for equipment such as a cellular phone and a mobile computer, which have many constraints on system resources.

At steps 7–9 in FIG. 13, the pattern-determining unit 9 dynamically determines the three-times magnified pattern and the horizontally contiguously adjacent sub-pixel patterns next thereto on the basis of the black target pixel. This feature eliminates the need to statically retain the three-times magnified pattern with the horizontally contiguously adjacent sub-pixel patterns next thereto. In addition, a three-times magnified pattern of a white target pixel need not be retained statically because it is obtained by the initialization at step 3 of FIG. 13.

As a result, the display equipment according to the present embodiment provides less system load than when the three-times magnified pattern with the horizontally contiguously adjacent sub-pixel patterns next thereto are statically contained. This feature in combination with the previously discussed feature renders the display equipment according to the present embodiment further good for the equipment having many constraints on system resources.

Furthermore, a raster image and a three-times magnified pattern of the raster image with horizontally contiguously adjacent sub-pixel patterns next thereto need not be known. This means that a wide range of images such as a photographic portrait image downloaded from a server can be displayed on a per sub-pixel basis using a substantially improved resolution. As a result, such images are legibly displayed.

Although the above description discusses a reference pattern having a rectangular profile (see FIG. 2), the present embodiment is not limited to such a rectangular reference pattern.

For example, a pattern having a rectangular profile and having an additional pixel at a position slanted with respect to a target pixel can be viewed as a reference pattern. An example of such a pattern is now described with reference to the drawings.

FIG. 18(*a*) defines a non-rectangular reference pattern, whose profile is not rectangular. Note that a pixel marked with hatched lines in FIG. 18(*a*) denotes a target pixel.

As illustrated in FIG. 18(*a*), the reference pattern having such a non-rectangular profile consists of a total of twenty pixels. More specifically, the reference pattern is originally based on a pattern that has a rectangular profile and further that consists of five pixels-by-five pixels including the target pixel, but the reference pattern is formed by omitting from such a rectangular pattern the following: a pixel above a contiguously adjacent pixel that is disposed above the target pixel; a rightward pixel next to a contiguously adjacent pixel that is disposed rightward next to the target pixel; a pixel beneath a contiguously adjacent pixel that is located beneath the target pixel; a leftward pixel next to a contiguously adjacent pixel that is disposed leftward next to the target pixel; and, the target pixel.

The reference pattern in FIG. 18(*a*) includes different combinations of the twentieth power of 2. A relationship between each reference pattern and a three-times magnified pattern with contiguously adjacent sub-pixel patterns next thereto is now described with reference to five different reference patterns among the different combinations of the twentieth power of 2.

As illustrated in FIG. 18(*b*), assume that a reference pattern consisting of twenty pixels includes the following black pixels: an upper pixel above the target pixel; a leftward pixel next to the upper pixel; a further leftward pixel next to the leftward pixel; and, a pixel beneath the target pixel. In this instance, as illustrated in FIG. 18(*c*), a three-times magnified pattern 90 is set to consist of a central black target pixel and opposite black pixels positioned contiguously adjacent to the target pixel. As illustrated in FIG. 18(*c*), a leftward sub-pixel pattern 91 next to the three-times magnified pattern 90, a further leftward sub-pixel 92 next to the leftward sub-pixel pattern 91, a rightward sub-pixel pattern 93 next to the three-times magnified pattern 90, and a further rightward sub-pixel pattern 94 next to the rightward sub-pixel pattern 93 are all set to be white.

As illustrated in FIG. 18(*d*), assume that the twenty pixel-based reference pattern includes the following black pixels: an upper pixel above the target pixel; a leftward pixel next to the upper pixel; a pixel above the leftward pixel; and, a pixel beneath the target pixel. In this instance, as illustrated in FIG. 18(*e*), the three-times magnified pattern 90 is set to consist of a central black target pixel and opposite black pixels positioned contiguously adjacent to the target pixel. As illustrated in FIG. 18(*e*), a leftward sub-pixel pattern 91 next to the three-times magnified pattern 90 is set to be black, but a further leftward sub-pixel 92 next to the leftward sub-pixel pattern 91, a rightward sub-pixel pattern 93 next to the three-times magnified pattern 90, and a further rightward sub-pixel pattern 94 next to the rightward sub-pixel pattern 93 are all set to be white.

As illustrated in FIG. 18(*f*), assume that the twenty pixel-based reference pattern has a rightward pixel next to the target pixel and a pixel below the target pixel rendered black. As shown in FIG. 18(*g*), the three-times magnified pattern 90 is set to consist of a central black target pixel and opposite black pixels positioned contiguously adjacent next to the target pixel. In this case, as illustrated in FIG. 18(*g*), a leftward sub-pixel pattern 91 next to the three-times magnified pattern 90, a further leftward sub-pixel 92 next to the leftward sub-pixel pattern 91, a rightward sub-pixel pattern 93 next to the three-times magnified pattern 90, and a further rightward sub-pixel pattern 94 next to the rightward sub-pixel pattern 93 are all set to be white.

As illustrated in FIG. 18(*h*), assume that the twenty pixel-based reference pattern includes the following black pixels: a rightward pixel next to the target pixel; an upper pixel disposed at an upper-right position of the rightward pixel; a lower pixel beneath the target pixel; and a further lower pixel disposed at a lower-left position of the lower pixel. As shown in FIG. 18(*i*), the three-times magnified pattern 90 is set to consist of a central black target pixel, a rightward black pixel next to the target pixel, and a leftward white pixel next to the target pixel. In this instance, as illustrated in FIG. 18(*i*), a leftward sub-pixel pattern 91 next to the three-times magnified pattern 90, a further leftward sub-pixel 92 next to the leftward sub-pixel pattern 91, a rightward sub-pixel pattern 93 next to the three-times magnified pattern 90, and a further rightward sub-pixel pattern 94 next to the rightward sub-pixel pattern 93 are all set to be white.

For a variety of intermediate reference patterns between the above patterns, the three-times magnified pattern/horizontally contiguously adjacent sub-pixel pattern-determining rules are established in advance. When all of the rules are set up, then different combinations of the twentieth power of 2 as previously discussed are defined. Alternatively, fewer rules may be pre-established by omitting part of the rules in view of symmetry and black-white inversion.

Note that FIG. 18 illustrates, by way of illustration, how the bitmap-extracting unit 8 and the pattern-determining unit 9 behave when the target pixel is black.

As illustrated in FIG. 18, in addition to the beneficial effects obtained by the reference pattern having a rectangular profile, the reference pattern having a non-rectangular profile provides beneficial effects as discussed below.

Figure 19A:
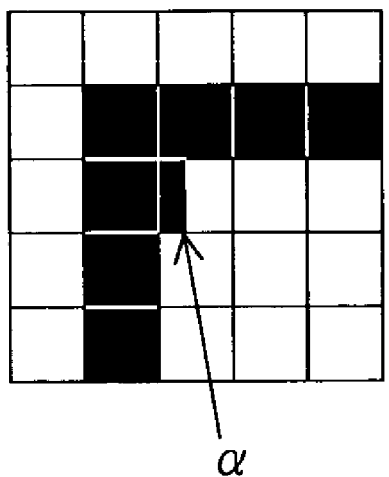
FIG. 19(*a*) is a descriptive illustration, showing an objectionable effect.
Figure 19B:
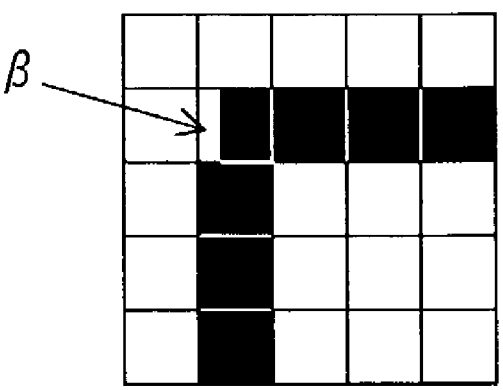

As illustrated in FIG. 3, a three-times magnified pattern and horizontally contiguously adjacent sub-pixel patterns next thereto are determined on the basis of a reference pattern that has a rectangular profile and further that includes a (3*3−1) number of pixels. As illustrated in FIG. 19(*a*), when a Γ-like (Γ is an ancient Greek character in capital letter) object is displayed on a per sub-pixel basis, then a protrusion as designated by arrow "α" occurs on the object. In short there are cases where an area to be displayed at a rectangular angle is objectionably smoothly displayed.

As illustrated in FIG. 3, a three-times magnified pattern and horizontally contiguously adjacent sub-pixel patterns next thereto are determined on the basis of a reference pattern that has a rectangular profile and further that includes a (3*3−1) number of pixels. As illustrated in FIG. 19(*b*), when a Γ-like (Γ is an ancient Greek character in capital letter) object is displayed on a per sub-pixel basis, then a cutout as designated by arrow "β" occurs on the object. Similarly, this means that there is likelihood that an area to be displayed as a rectangular angle is objectionably smoothly displayed.

The use of a reference pattern that consists of a greater number of pixels makes it feasible to determine a three-times magnified pattern with contiguously adjacent sub-pixels patterns next to a target pixel in an attempt to avoid creating the protrusion and cutout when such a Γ-like character is displayed.

For example, when a reference pattern that consists of a (5*5−1) number of pixels is employed, then it is possible to determine a three-times magnified pattern and contiguously adjacent sub-pixels patterns next to a target pixel in an effort to avoid producing the protrusion and cutout when the Γ-like character is displayed.

At the same time, a total of twenty-four pixels form the reference pattern, resulting in increase in both a processing time and a required storage capacity.

In such an instance, as illustrated in FIG. 18(*a*), a reference pattern having a non-rectangular profile and further consisting of a total of twenty pixels may be employed. As illustrated in FIGS. 18(*b*) and 18(*c*), the use of such a reference pattern makes it possible to determine a three-times magnified pattern of a target pixel and contiguously adjacent sub-pixel patterns next to the target pixel such that an original shape such as the Γ-like character remains intact while respective increases in both a processing time and a required storage capacity are inhibited.

In brief, an image, whose smooth display must be prohibited, looks practically similar to an original image, while an image to be smoothly displayed is smoothed. As a result, a variation in image density can be suppressed. In addition, a reduced processing time and a less storage capacity are realized.

As evidenced by the above, the use of such a non-rectangular reference pattern formed by a total of twenty pixels provides a higher quality display while a reduced processing time and a less storage capacity are required.

A total of only twenty pixels as mentioned above are sufficient to provide such beneficial effects because the Γ-like character can be appreciated as a displayed image, even when the reference pattern having a rectangular profile and consisting of a (5*5−1) number of pixels excludes: a pixel above a contiguously adjacent pixel that is positioned above the target pixel; a rightward pixel next to a contiguously adjacent pixel that is disposed rightward next to the target pixel; a pixel beneath a contiguously adjacent pixel that is disposed beneath the target pixel; and, a leftward pixel next to a contiguously adjacent pixel that is positioned leftward next to the target pixel.

The above discusses an example in which an original shape like a Greek Γ-like character is retained. When the reference pattern having a non-rectangular profile and consisting of twenty pixels as illustrated in FIG. 18(a) is employed, then as illustrated in FIGS. 18(h) and 18(i), a slanted line can be smoothly displayed while respective increases in both a processing time and a required storage capacity are suppressed.

As discussed above, when a greater number of pixels are required to provide a higher quality display, then a reference pattern having a non-rectangular profile and consisting of a minimized number of pixels required for such a higher quality display may be employed. As a result, such an expected display is achievable while respective increases in both a processing time and a required storage capacity is suppressed.

Figure 18A:
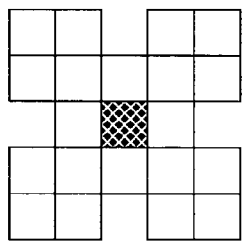
FIG. 18(a) is an illustration, defining a reference pattern.
Figure 18B:
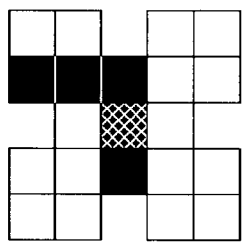
FIG. 18(b) is an illustration, showing an example of a reference pattern.
Figure 18C:
FIG. 18(c) is an illustration, showing an example of a three-times magnified pattern with horizontally contiguously adjacent sub-pixel patterns next thereto.
Figure 18D:
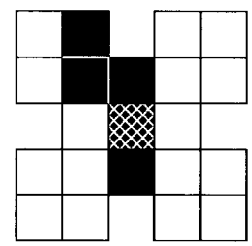
FIG. 18(d) is an illustration, showing another example of a reference pattern.
Figure 18E:
FIG. 18(e) is an illustration, showing another example of a three-times magnified pattern with horizontally contiguously adjacent sub-pixel patterns next thereto.
Figure 18F:
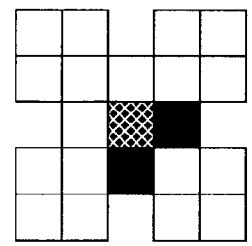
FIG. 18(f) is an illustration, showing a further example of a reference pattern.
Figure 18G:
FIG. 18(g) is an illustration, showing a further example of a three-times magnified pattern with horizontally contiguously adjacent sub-pixel patterns next thereto.
Figure 18H:
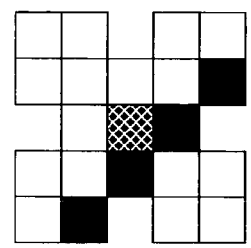
FIG. 18(h) is an illustration, showing a yet further example of a reference pattern.
Figure 18I:
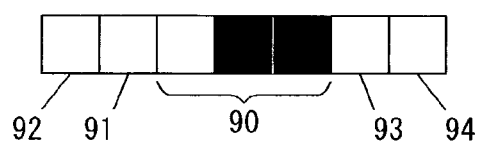
FIG. 18(*i*) is an illustration, showing a yet further example of a three-times magnified pattern with horizontally contiguously adjacent sub-pixel patterns next thereto.

Note that a reference pattern having a non-rectangular profile is not limited to that as illustrated in FIG. 18(a).

FIG. 18 describes an example in which the three-times magnified pattern of the target pixel and the sub-pixel patterns next to the target pixel are determined using pattern matching. Alternatively, the three-times magnified pattern/contiguously adjacent sub-pixel pattern-determining rules may be expressed by bits in order to determine the three-times magnified pattern of the target pixel and the sub-pixel patterns next thereto on the basis of the results from retrieval using an index.

Similarly, fewer rules may be pre-established in view of symmetry and black-white inversion.

(Embodiment 2)

Figure 20:
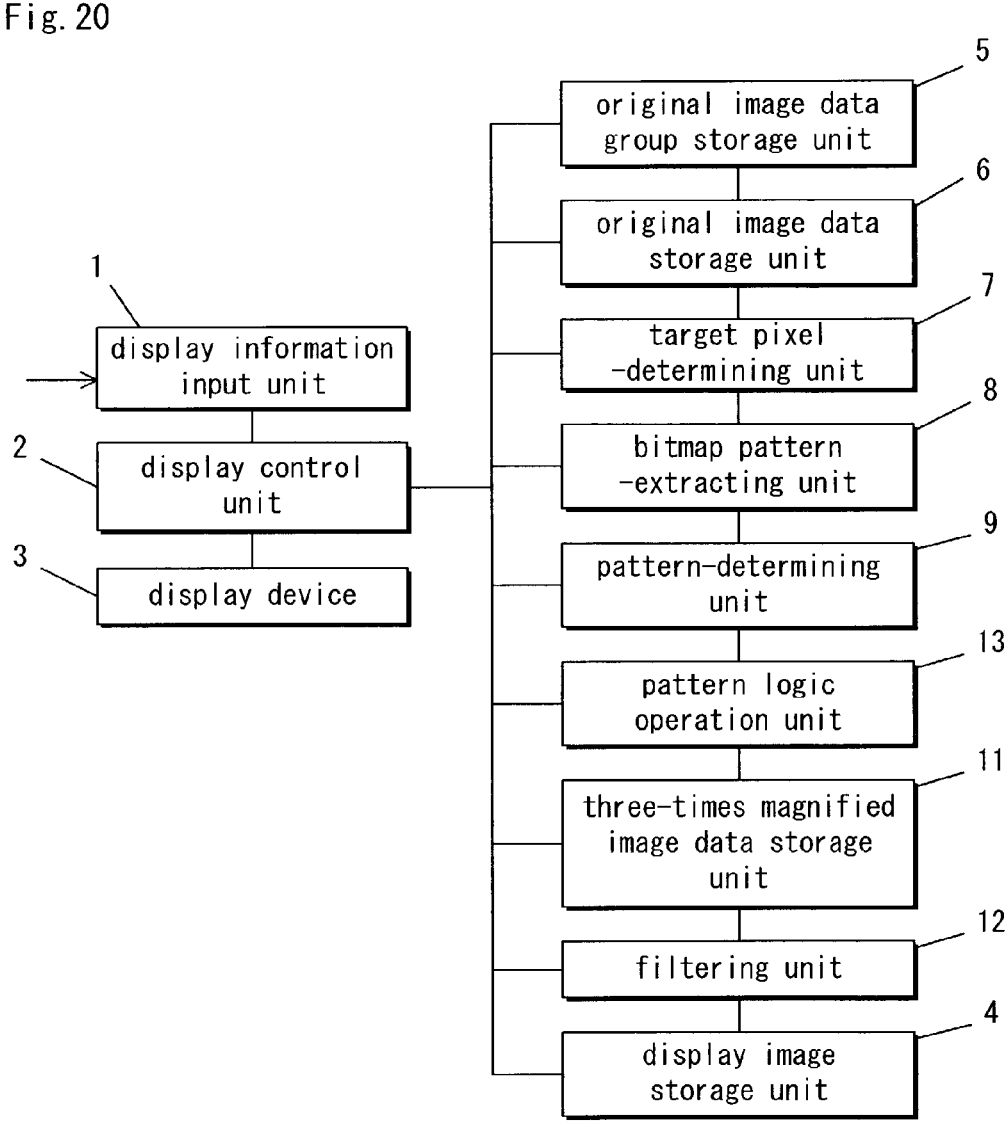
FIG. 20 is a block diagram, illustrating display equipment according to a second embodiment.

A second embodiment is now described. Only the differences in structure from the previous embodiment are described. FIG. 20 is a block diagram, illustrating display equipment according to the present embodiment.

Different from the previous embodiment, the present embodiment determines a three-times magnified pattern and horizontally contiguously adjacent sub-pixel patterns next thereto on the basis of logic operation, not by storing three-times magnified pattern-determining rules. Therefore, as illustrated in FIG. 20, a pattern logic operation unit 13 is substituted for the reference pattern storage unit 10 of FIG. 1.

The following discusses an example in which a three-times magnified pattern and horizontally contiguously adjacent sub-pixel patterns next thereto are determined under the assumption of n=m=1 and x=y=1 when a target pixel is black.

The manner in which the pattern logic operation unit 13 performs logic operation is described below with reference to FIG. 21.

As illustrated in FIG. 21(a), the pattern logic operation unit 13 includes a function whereby the pattern logic operation unit 13 judges conditions as illustrated in FIGS. 21(b) to 21(e). The conditions are related to a total of eight pixels. The total eight pixels are derived by subtracting a central target pixel (0, 0) from a total of three pixels-by-three pixels that consist of the central target pixel (0, 0) and neighboring pixels about the target pixel. As a result, the pattern logic operation unit 13 provides a five-digit bit value as a return value according to the judgment results. The five-digit bit value determines the three-times magnified pattern and the horizontally contiguously adjacent sub-pixel patterns next thereto.

Note that the pixels marked with the symbol * as illustrated in FIG. 21(b) to FIG. 21(e) are ignored, whether white or black. Blacks and whites denote the numbers 1 (one) and 0 (zero), respectively. Although the target pixel is black, it is marked with hatched lines for convenience of hi description.

As illustrated in FIG. 21(b), when horizontally contiguously adjacent pixels next to the black target pixel are both black, then the return value 11111 results.

As illustrated in FIG. 21(c), assume that a pixel above the target pixel is white; a pixel at an upper-left position slanted with reference to the target pixel is white; a leftward pixel next to the target pixel is white; a pixel beneath the target pixel is black; a pixel at an upper-right position slanted with reference to the target pixel is black. In this instance, the return value 00111 results.

As seen from FIGS. 21(d) to 21(e) and so on, the pattern logic operation unit 13 includes other operable logics.

It would be understood from the above that the present embodiment is able to determine the three-times magnified pattern and the horizontally contiguously adjacent sub-pixel patterns next thereto in a manner similar to the previous embodiment. As a result, the present embodiment provides beneficial effects similar to those of the previous embodiment because the shifting similar to that of the previous embodiment is practiced.

The present embodiment depends upon how the logic operation is practiced, not on how large a storage area is used. Thus, the display equipment according to the present embodiment can be installed with easy into equipment having a considerably limited storage area.

Figure 22:
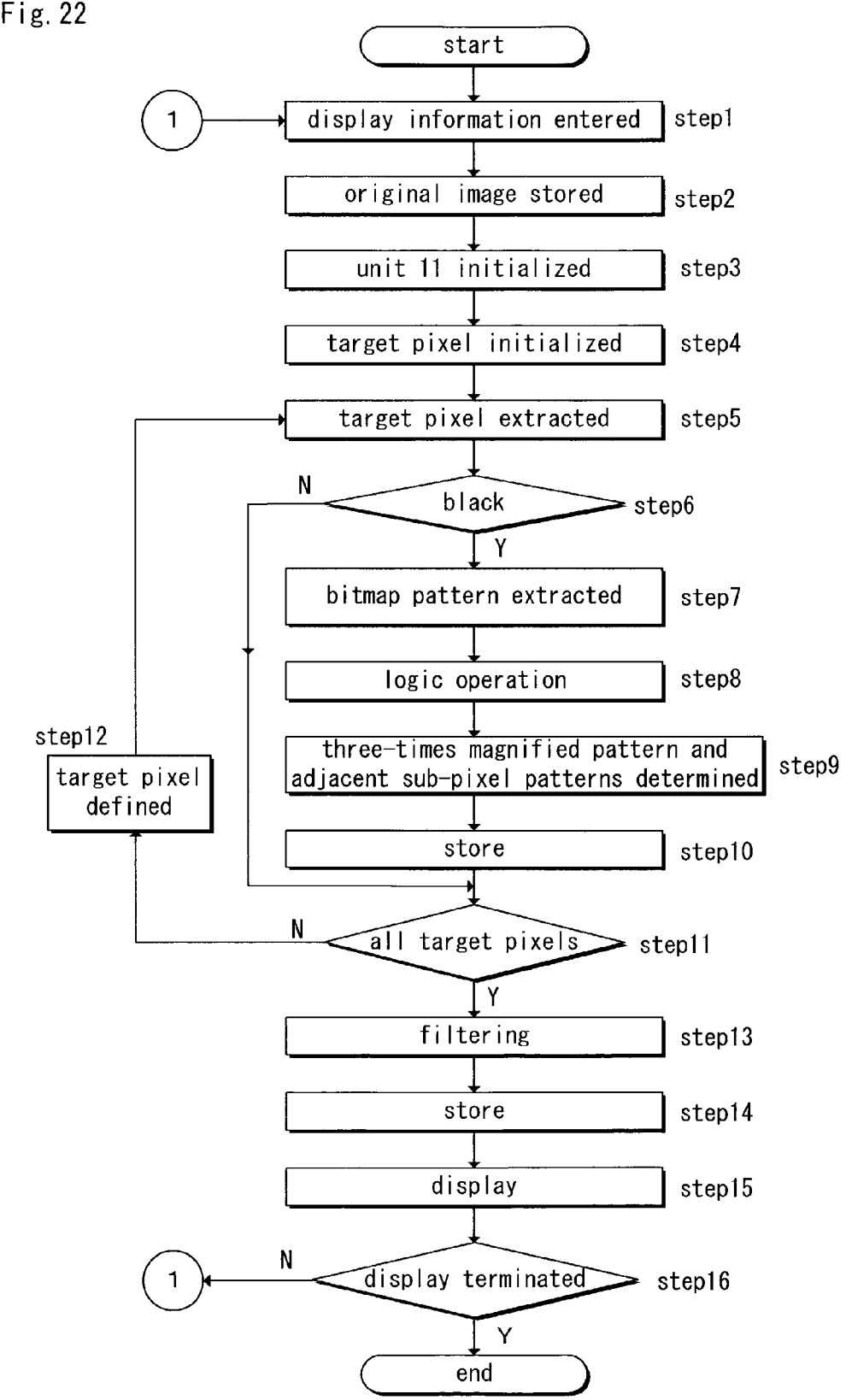
FIG. 22 is a flowchart, illustrating how the display equipment behaves.

The following discusses, with reference to FIG. 22, a flow of processing using the display equipment of FIG. 20. Differences in processing from the previous embodiment are mainly described. In FIG. 22, step 8 (pattern logic operation) is substituted for different step 8 (searching the reference pattern storage unit 10) of FIG. 13.

Referring to FIG. 22, at step 8, the display control unit 2 instructs the pattern-determining unit 9 to determine a three-times magnified pattern and horizontally contiguously adjacent sub-pixel patterns next thereto, and then the pattern-determining unit 9 permits the pattern logic operation unit 13 to perform the logic operation as discussed above.

At step 9, the pattern-determining unit 9 acquires the return value. This means that the three-times magnified pattern and the horizontally contiguously adjacent sub-pixel patterns next thereto have been determined.

At step 10, the pattern-determining unit 9 places the three-times magnified pattern and the horizontally contiguously adjacent sub-pixel patterns next thereto according to the return value into the three-times magnified image data storage unit 11.

The remaining courses of processing are similar to those of FIG. 13.

Note that a combination of the previous and present embodiments is, of course, incorporated into the present invention. For example, a two-step process is acceptable, in which the reference pattern storage unit 10 and the pattern logic operation unit 13 provide respective courses of processing. In this instance, either the reference pattern storage unit 10 or the pattern logic operation unit 13 may provide an earlier action.

As illustrated in FIG. 21, the above discusses a reference pattern having a rectangular profile. However, the present embodiment is not limited to such a rectangular reference pattern.

For example, a pattern having a rectangular profile and including an additional pixel at a position slanted with respect to a target pixel may also be taken as a reference pattern in a manner similar to the previous embodiment.

(Embodiment 3)

A third embodiment is now described.

Figure 23:
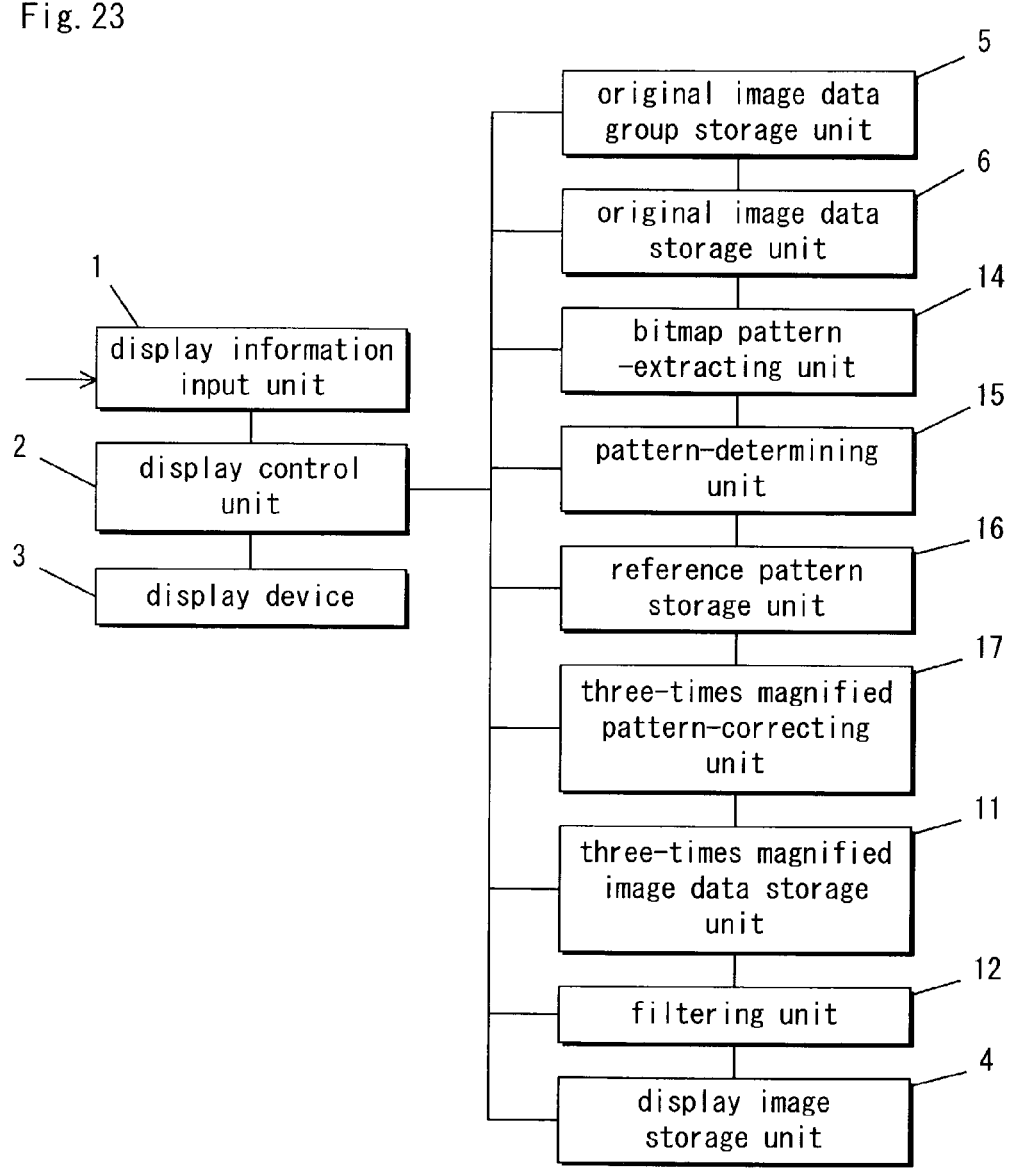
FIG. 23 is a block diagram, illustrating display equipment according to a third embodiment.

FIG. 23 is a block diagram, illustrating display equipment according to the present embodiment.

As illustrated in FIG. 23, the display equipment includes a display information input unit 1, a display control unit 2, a display device 3, a display image storage unit 4, an original image data group storage unit 5, an original image data storage unit 6, a bitmap pattern-extracting unit 14, a pattern-determining unit 15, a reference pattern storage unit 16, a three-times magnified pattern-correcting unit 17, a three-times magnified image data storage unit 11, and a filtering unit 12. The same components as those of FIG. 1 are identified by the same reference characters, and descriptions related thereto are omitted.

The bitmap pattern-extracting unit 14 in FIG. 23 extracts a bitmap pattern from original image data stored in the original image data storage unit 6. The extracted bitmap pattern is identical in shape to a corresponding reference pattern.

Figure 24:
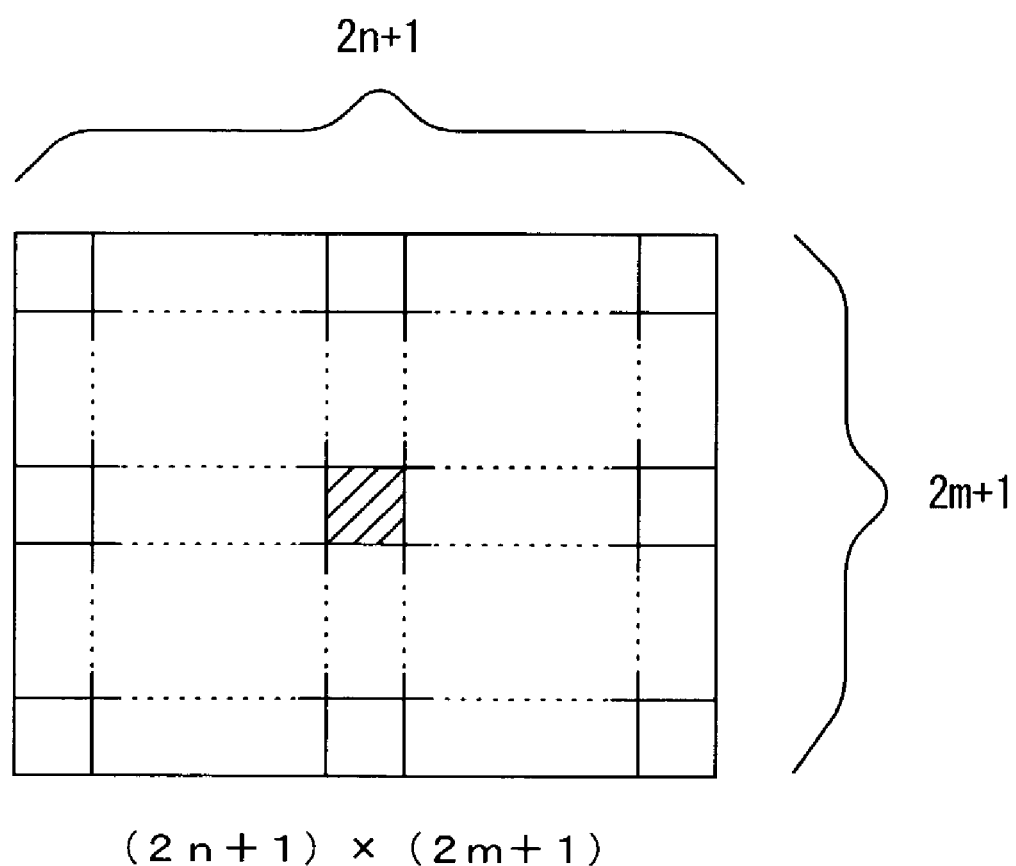
FIG. 24 is an illustration, defining a reference pattern.

In general, the pattern is defined as illustrated in FIG. 24. More specifically, the pattern is formed by a central pixel, which is defined by hatched lines as a target pixel, and surrounding pixels about the target pixel. In other words, the pattern consists of a total number $((2n+1)*(2m+1))$ ("n", "m" are natural numbers) of pixels. The pattern includes different combinations of the $(2n+1)*(2m+1)$ power of 2. The present embodiment materially differs from the first embodiment in the number of pixels because a total number of pixels according to the first embodiment is $((2n+1)*(2m-1)-1))$ ("n", "m" are natural numbers) as illustrated in FIG. 2.

The use of such a rectangular reference pattern determines a position of any referenced pixel with ease, and requires less processing.

The numbers "n", "m" are preferably defined as n=m=1 in order to reduce the system load. In this instance, the pattern consists of nine pixels, and includes five hundred and twelve (512) different combinations.

The pattern-determining unit 15 searches the reference pattern storage unit 16 that store reference patterns, for an appropriate reference pattern that is coincident with the bitmap pattern extracted by the bitmap pattern-extracting unit 14. The pattern-determining unit 15 determines, according to the searched reference pattern, a three-times magnified pattern of the target pixel and sub-pixel patterns positioned next to the target pixel in the first direction.

The determined sub-pixel patterns as discussed above consist of an "x" ("X" is an integer) number of sub-pixel patterns aligned with the target pixel in the first direction on one side of the target pixel and a "y" ("y" is a natural number) number of sub-pixel patterns aligned with the target pixel in the first direction on the other side of the target pixel.

The determined three-times magnified pattern as discussed above is obtained by magnifying the target pixel three times in the first direction according to the reference pattern as described later, not by simply magnifying the target pixel.

The following description is made under the assumption of n=m=1 and x=y=1. The assumption n=m=1 means that the reference pattern as well as the extracted bitmap pattern consists of nine pixels. When the first direction is named as a horizontal direction, then a three-times magnified pattern of a target pixel and horizontally contiguously adjacent sub-pixel patterns next to the target pixel are determined according to the assumption of x=y=1.

In the above example, nine-pixel input results, while the pattern-determining unit 15 provides five-bit output. This is exhibited only by way of illustration, and other results such as twenty-five-pixel input (n=m=2) and seven-bit output (x=y=2) are realized.

The above description is again made below with reference to the drawings.

As illustrated in FIG. 25(a), when a reference pattern consisting of nine pixels is entirely black, then as illustrated in FIG. 25(b), a three-times magnified pattern 60 is set to consist of a central black target pixel and black pixels horizontally contiguously adjacent to the target pixel. As shown in FIG. 25(b), horizontally contiguously adjacent sub-pixel patterns 61, 62 next to the three-times magnified pattern 60 are both set to be black.

Conversely, as illustrated in FIG. 25(e), when the reference pattern is entirely white, then as illustrated in FIG. 25(f), the three-times magnified pattern 60 is set to consist of a central white target pixel and black pixels horizontally contiguously adjacent to the target pixel. As shown in FIG. 25(f), horizontally contiguously adjacent sub-pixel patterns 61, 62 next to the three-times magnified pattern 60 are both set to be white.

For a variety of intermediate reference patterns between the above opposite patterns, three-times magnified pattern/horizontally contiguously adjacent sub-pixel pattern-determining rules are established in advance. When all of the rules are set up, then 512-different combinations as previously discussed are defined. Alternatively, fewer rules may be pre-established in view of symmetry and black-white inversion.

Figure 25:
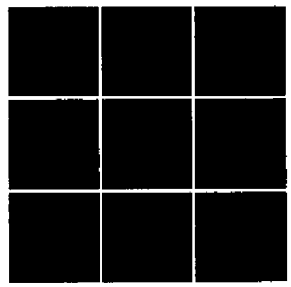
FIG. 25(*a*) is an illustration, showing an example of a reference pattern.
Figure 25:
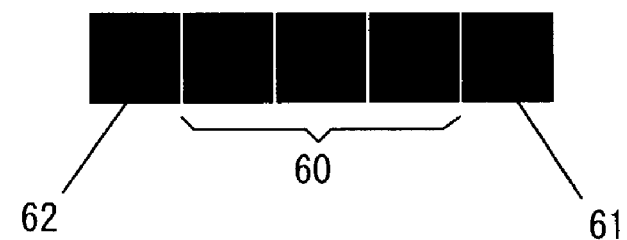
Figure 25:
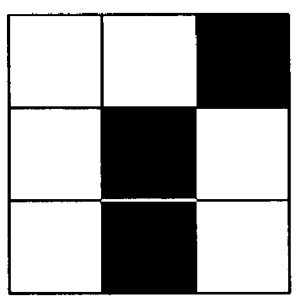
Figure 25:
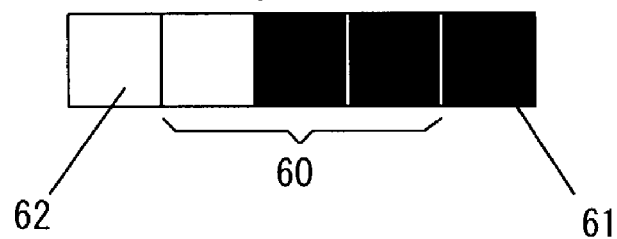
Figure 25:
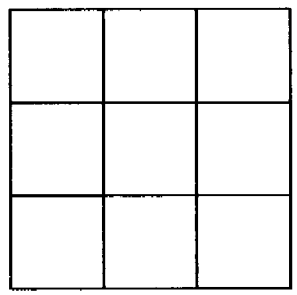
Figure 25:
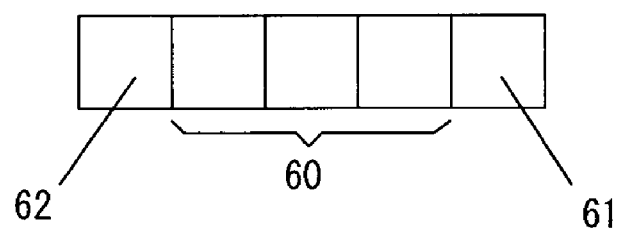

The above discusses an example in which the three-times magnified pattern and the horizontally contiguously adjacent sub-pixel patterns next thereto are determined using pattern matching. The three-times magnified pattern/horizontally contiguously adjacent sub-pixel pattern-determining rules as illustrated in FIG. 25 are prepared in order to display smoother (less jagged) lines than those displayed on a pixel-by-pixel basis. Such a smoother display is achievable using the per-sub-pixel technique in which a resolution magnified three times in the first direction is available.

The determined three-times magnified pattern is allocated to three sub-pixels that form a target pixel. The determined horizontally contiguously adjacent sub-pixel patterns are allocated to sub-pixels that are horizontally positioned next to the target pixel.

As described above, the three-times magnified pattern and the horizontally contiguously adjacent sub-pixel patterns next thereto are determined to provide five sub-pixel patterns. The use of the five sub-pixel patterns allows a pixel to be displaced horizontally by an amount of a sub-pixel without any change in pixel value.

Such an operation is called "shifting", which is identical in meaning to that of the first embodiment. The present embodiment executes the shifting, and provides beneficial effects similar to those of the first embodiment as illustrated in FIG. 5.

It is to be noted that the present embodiment differs from the first embodiment in that the three-times magnified pattern and the horizontally contiguously adjacent sub-pixel patterns next thereto are determined with respect to all target pixels, not only the black target pixels.

This is done in order to provide beneficial effects by imparting the shifting to characters such as pictorial characters and inverted characters in which black pixels are of little importance or in which white and black pixels have the same significance.

As a result, each white pixel also experiences the shifting, thereby suppressing a variation in output image density, which otherwise would conspicuously occur as a result of a varied line width of the white pixel.

However, when all of the target pixels experience the shifting, then there may occur a pattern mismatch between one three-times magnified pattern with horizontally contiguously adjacent sub-pixel patterns next thereto, which are determined from a certain pixel, and another three-times magnified pattern with horizontally contiguously adjacent sub-pixel patterns next thereto, which are determined from a contiguously adjacent pixel next to that particular pixel.

As illustrated in FIG. 23, in order to obviate the mismatch, the three-times magnified pattern-correcting unit 17 is provided. The manner in which the mismatch is eliminated is now described in detail with reference to the drawings.

Figure 26:
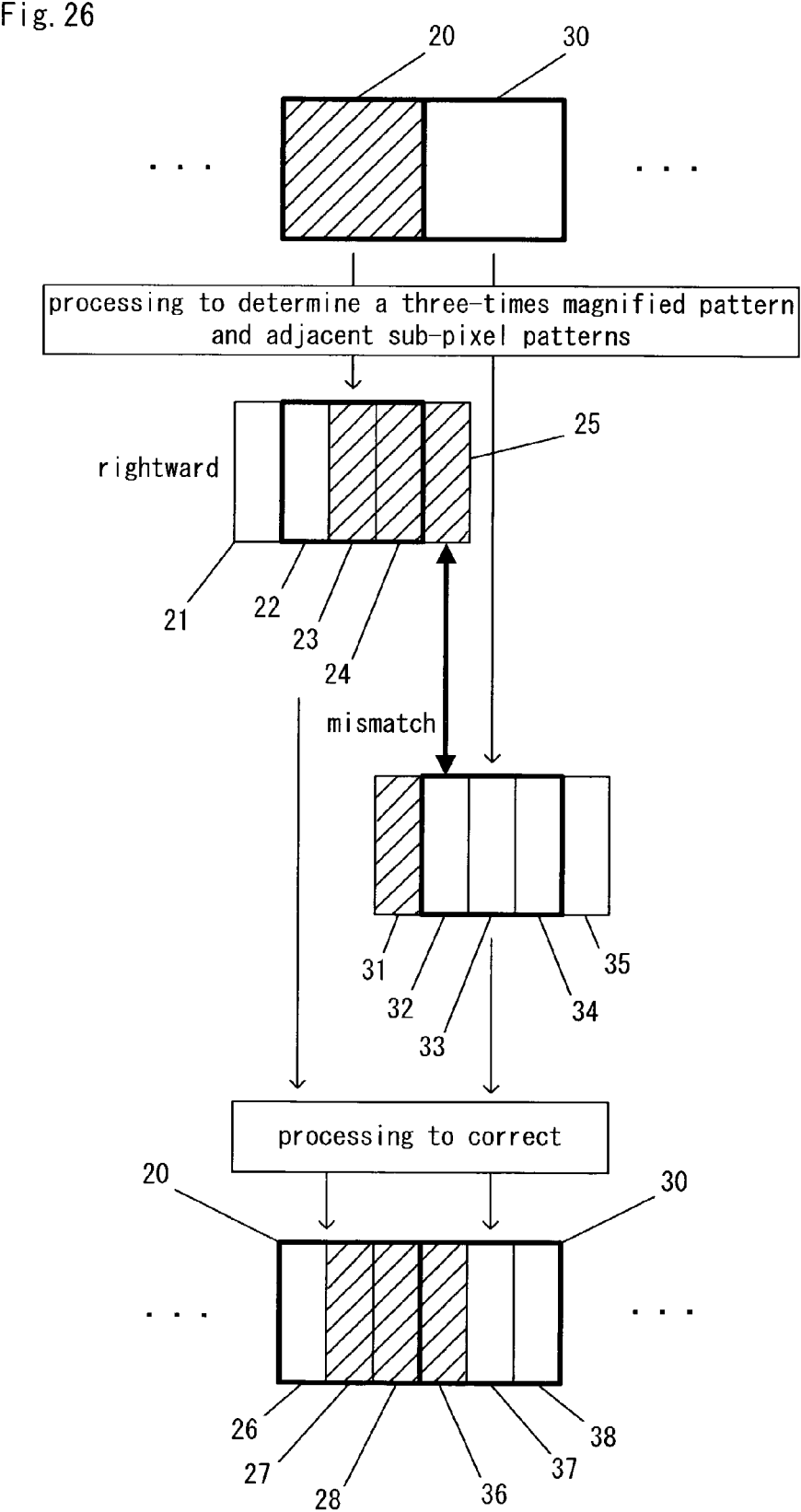
FIG. 26 is an illustration, showing an example in which a three-times magnified pattern is corrected.

FIG. 26 is a descriptive illustration, showing how the three-times magnified pattern-correcting unit 17 operates. Note that pixels and sub-pixels defined by hatched lines are all black.

As illustrated in FIG. 26, assume that an original image has a black pixel 20 and a white pixel 30 positioned contiguously adjacent to one another.

Assume that, when the pixel 20 is defined as a target pixel, then a three-times magnified pattern and horizontally contiguously adjacent sub-pixel patters next thereto are determined, as defined by sub-pixels 21 to 25. Further assume that, when the pixel 30 is defined as a target pixel, then a three-times magnified pattern and horizontally contiguously adjacent sub-pixel patterns next thereto are determined, as defined by sub-pixels 31 to 35.

In this case, the sub-pixels 24 and 31 overlap one another, but they are the same black patterns. Therefore, there is no problem.

However, a problem arises when the black sub-pixel 25 and the white sub-pixel 32 overlap one another. That is, a mismatch occurs between such different (white and black) patterns. In order to obviate the mismatch, either one of the two sub-pixels 25, 32 must be rendered either black or white.

The three-times magnified pattern-correcting unit 17 eliminates the mismatch, thereby providing a properly corrected three-times magnified pattern.

The following discusses an example in which the three-times magnified pattern-correcting unit 17 provides a corrected three-times magnified patter. In order to obviate the mismatch, the three-times magnified pattern-correcting unit 17 evaluates the three-times magnified pattern and horizontally contiguously adjacent sub-pixel patterns next thereto determined by the pattern-determining unit 15, depending upon whether or not the patterns have experienced the "shifting".

As seen from FIG. 26, the target pixel 20 is subjected to rightward shifting in the pixels 21 to 25, but the target pixel 30 undergoes no shifting in the pixels 31 to 35.

The three-times magnified pattern-correcting unit 17 gives precedence to the patterns subjected to the shifting, i.e., the patterns consisting of the sub-pixels 21–25, over the opposite patterns that consist of the sub-pixels 31 to 35.

Accordingly, in the discrepant sub-pixels 25 and 32, the black sub-pixel pattern 25 determined on the basis of the black target pixel 20 is valued over the white sub-pixel pattern 32. As a result, the white target pixel 30 includes a leftmost sub-pixel pattern 36 rendered black. Since the sub-pixels 33, 34 suffer from no mismatch, the target pixel 30 further includes central and rightward sub-pixels 37, 38, whose white patterns are reproduced from those of the sub-pixels 33, 34, respectively.

This is the way in which the three-times magnified pattern-correcting unit 17 determines the sub-pixel patterns 36–38 of the target pixel 30 or a corrected three-times magnified pattern thereof.

Since the sub-pixels 22 to 24 suffer from no mismatches, the target pixel 20 consists of three sub-pixels 26, 27, 28 reproduced from the sub-pixel patterns 22, 23, 24, respectively. This means that no correction is made to the three-times magnified pattern of the target pixel 20.

Figure 27:
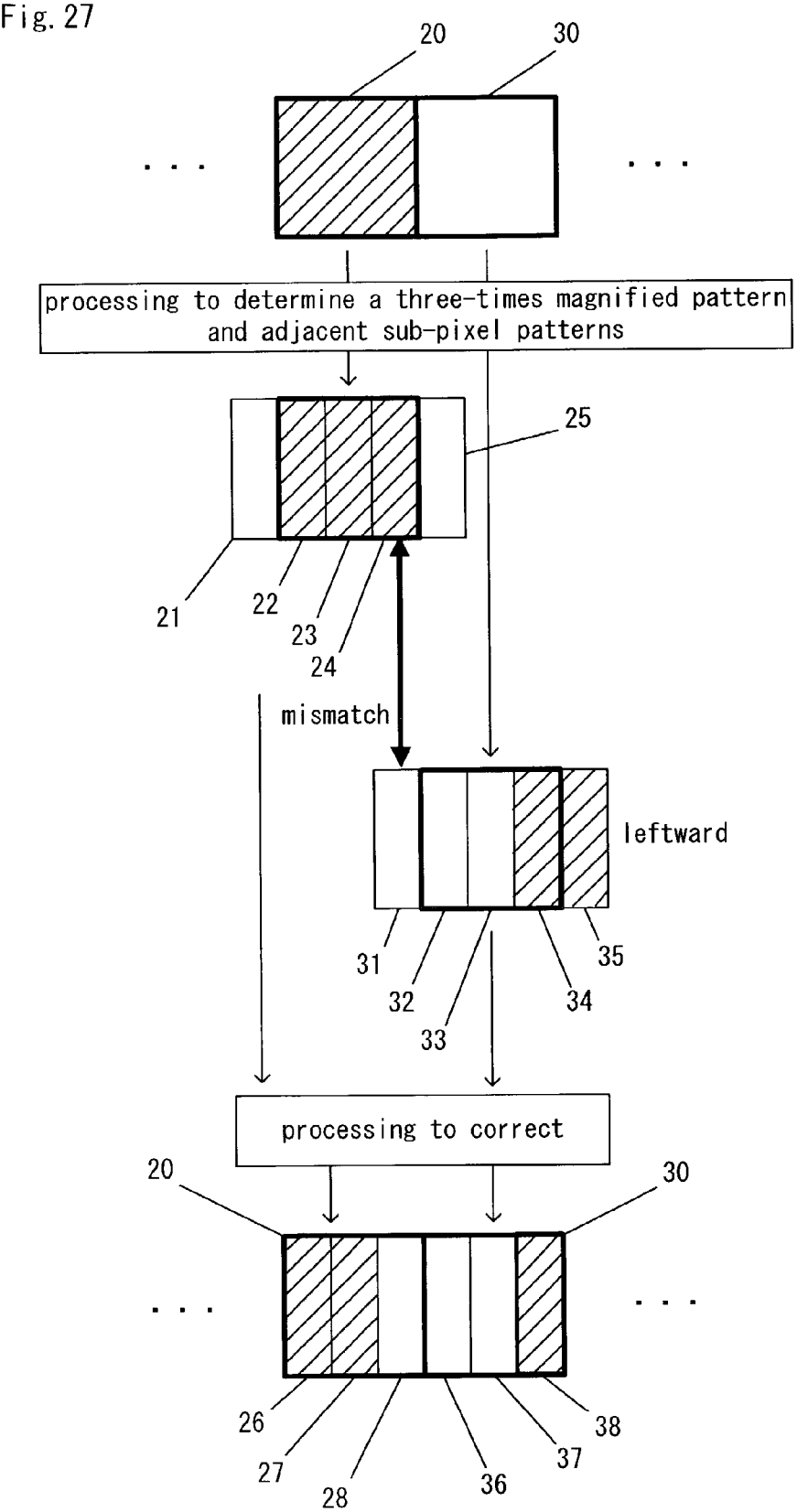
FIG. 27 is an illustration, showing another example in which a three-times magnified pattern is corrected.

FIG. 27 illustrates, by way of illustration, how a three-times magnified pattern is corrected when it is assumed that the pixel 30 in FIG. 26 experiences the shifting.

Assume that, when the pixel 20 is defined as a target pixel, then a three-times magnified pattern and horizontally contiguously adjacent sub-pixel patterns next thereto are determined, as defined by sub-pixels 21 to 25. Further assume that, when the pixel 30 is defined as a target pixel, then a three-times magnified pattern and horizontally contiguously adjacent sub-pixel patterns next thereto are determined, as defined by sub-pixels 31 to 35.

In this instance, the sub-pixel 25, 32 having the same white patterns overlap one another, and there is no problem therebetween.

However, a problem arises when the black sub-pixel 24 and the white sub-pixel 31 overlap one another. That is, a mismatch occurs between such different (white and black) data.

The pixel 30 is subjected to leftward shifting in the sub-pixels 31 to 35. The target pixel 20 undergoes no shifting in the sub-pixels 21 to 25.

The three-times magnified patter-correcting unit 17 gives precedence to the patterns subjected to the shifting, i.e., the patterns consisting of the sub-pixels 31–35, over the opposite patterns that consist of the sub-pixels 21–25.

Accordingly, in the discrepant sub-pixels 24 and 31, the white sub-pixel pattern 31 determined on the basis of the white target pixel 30 is valued over the black sub-pixel pattern 24. As a result, the black target pixel 20 includes a rightmost sub-pixel pattern 28 rendered white. Since the sub-pixels 23, 22 suffer from no mismatch, the target pixel 20 further includes central and leftward sub-pixels 27, 26, whose black patterns are reproduced from those of the sub-pixel patterns 23, 22, respectively.

This is the manner in which the three-times magnified pattern-correcting unit 17 determines the sub-pixel patterns 26–28 of the target pixel 20 or a corrected three-times magnified pattern thereof.

Since the sub-pixels 32 to 34 suffer from no mismatches, the target pixel 30 consists of three sub-pixels 36, 37, 38 reproduced from the sub-pixel patterns 32, 33, 34, respectively. This means that no correction is made to the three-times magnified pattern of the target pixel 30.

Figure 28:
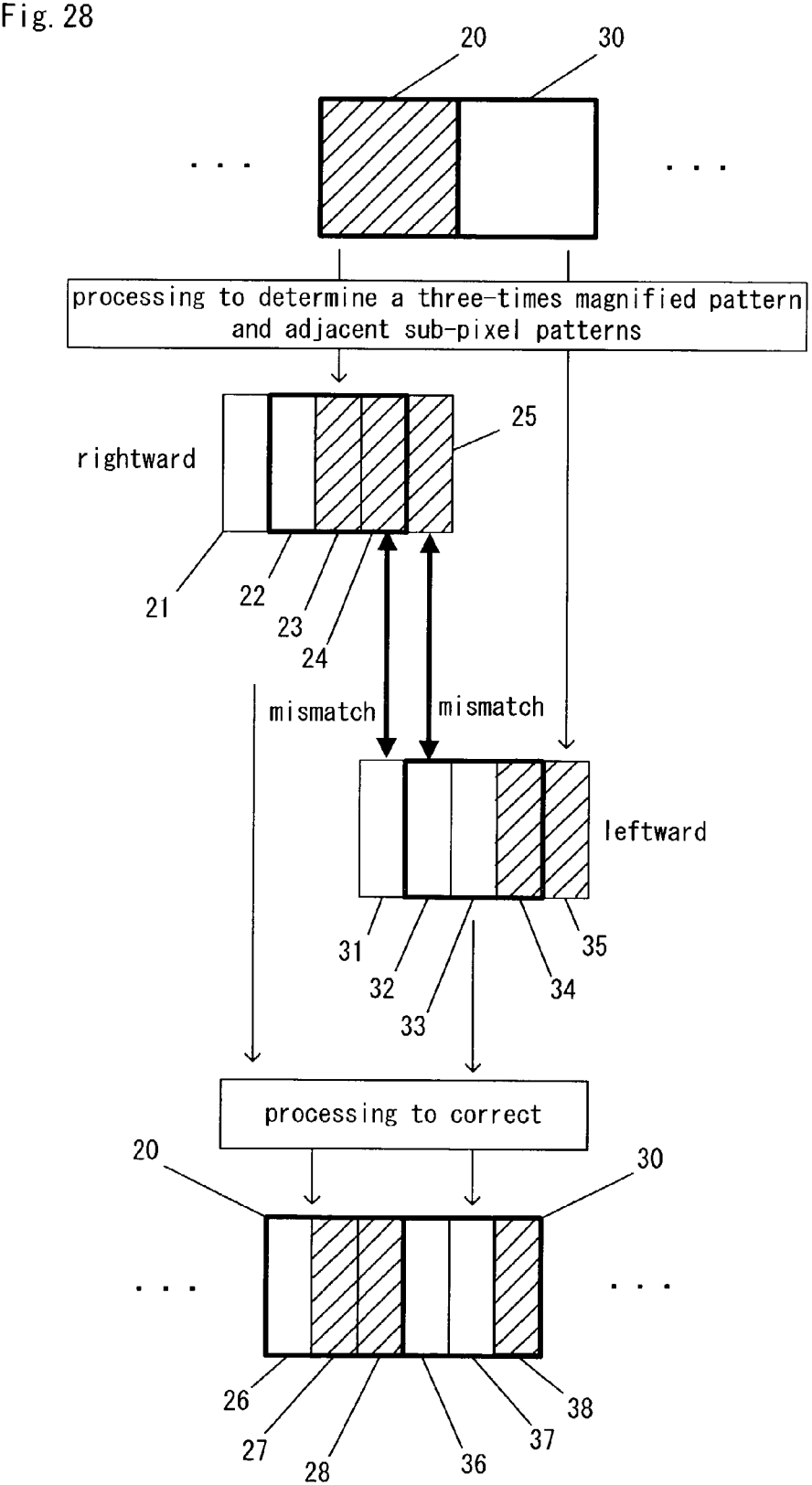
FIG. 28 is an illustration, showing a further example in which a three-times magnified pattern is corrected.

FIG. 28 illustrates, by way of illustration, how three-times magnified patterns are corrected when the pixels 20, 30 of FIG. 26 experience the rightward and leftward shifting, respectively.

Assume that, when the pixel 20 is defined as a target pixel, then a three-times magnified pattern and horizontally contiguously adjacent sub-pixel patterns next thereto are determined, as defined by sub-pixels 21 to 25. Further assume that, when the pixel 30 is defined as a target pixel, then a three-times magnified pattern and horizontally contiguously adjacent sub-pixel patterns next thereto are determined, as defined sub-pixels 31 to 35.

In this instance, pixels having different patterns, more specifically the black sub-pixel 24 and the white sub-pixel 31, overlap one another, thereby causing a mismatch therebetween. In addition, the black sub-pixel 25 and the white sub-pixel 32, both of which have different patterns, overlap one another, thereby bringing about another mismatch therebetween.

The pixel 20 is subjected to rightward shifting in the sub-pixels 21 to 25. The target pixel 30 undergoes leftward shifting in the sub-pixels 31 to 35.

In this instance, both of the patterns experience the shifting. This precludes the step of evaluating the patterns, depending upon whether they have been subjected to the shifting, as illustrated in FIGS. 26 and 27, in order to eliminate the mismatches.

In such a case, the three-times magnified pattern-correcting unit 17 precedes original image data over the above patterns. More specifically, the discrepant sub-pixels 24, 31 correspond to a rightmost pixel 28 of the pixel 20, and the rightmost sub-pixel 28 has black data reproduced from the pixel 20 of the original image. The discrepant sub-pixels 25, 32 correspond to a leftmost pixel 36 of the pixel 30, and the leftmost sub-pixel 36 has white data reproduced from the pixel 30 of the original image.

In this way, the three-times magnified pattern-correcting unit 17 provides the sub-pixel patters 26 to 28 of the pixel 20 i.e., a corrected three-times magnified pattern thereof, as well as the sub-pixel patterns 36 to 38 of the pixel 30, i.e., a corrected three-times magnified pattern thereof.

Figure 29:
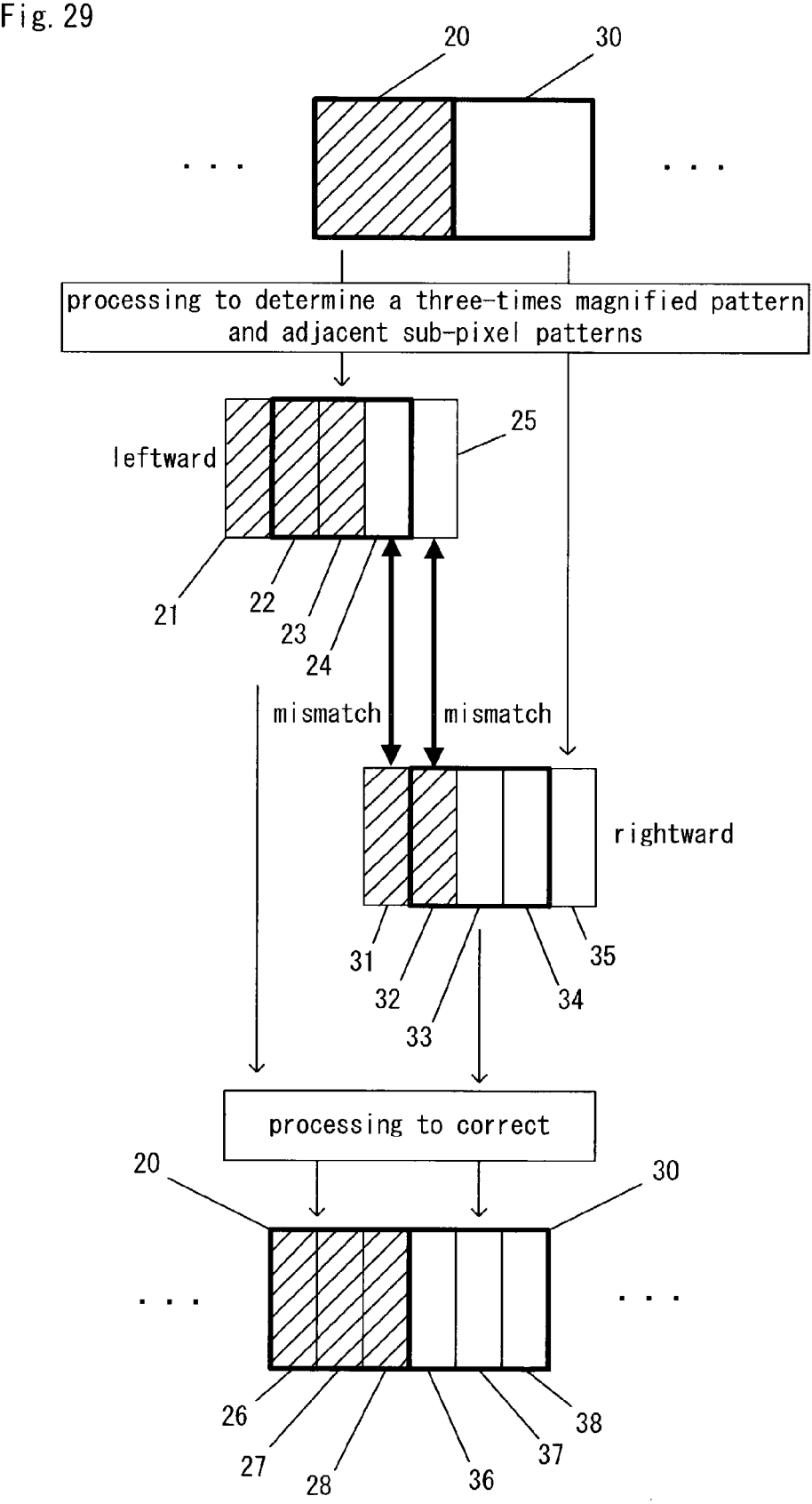
FIG. 29 is an illustration, showing a yet further example in which a three-times magnified pattern is corrected.

FIG. 29 illustrates, by way of illustration, how three-times magnified patterns are corrected when the pixels 20, 30 of FIG. 26 are subjected to leftward and rightward shifting, respectively.

Assume that, when the pixel 20 is defined as a target pixel, then a three-times magnified pattern and horizontally contiguously adjacent sub-pixel patterns next thereto are determined, as defined by sub-pixels 21 to 25. Assume that, when the pixel 30 is defined as a target pixel, then a three-times magnified pattern and horizontally contiguously adjacent sub-pixel patterns next thereto are determined, as defined by sub-pixels 31 to 35.

In this instance, pixels having different patterns, more specifically the white sub-pixel 24 and the black sub-pixel 31, overlap one another, thereby causing a mismatch therebetween. In addition, the white sub-pixel 25 and the black sub-pixel 32, both of which have different patterns, overlap one another, thereby producing another mismatch therebetween.

The pixel 20 is subjected to leftward shifting in the sub-pixels 21 to 25. The target pixel 30 undergoes rightward shifting in the sub-pixels 31 to 35.

The mismatches must be eliminated from the pixels 20, 30 in a manner similar to FIG. 28 because both of them experience the shifting.

The three-times magnified pattern-correcting unit 17 precedes original image data over the above patterns. More specifically, the discrepant sub-pixels 24, 31 correspond to a rightmost pixel 28 of the pixel 20, and the rightmost sub-pixel 28 has black data reproduced from the pixel 20 of the original image. The discrepant sub-pixels 25, 32 correspond to a leftmost pixel 36 of the pixel 30, and the leftmost sub-pixel 36 has white data reproduced from the pixel 30 of the original image.

This is the way in which the three-times magnified patter-correcting unit 17 provides the sub-pixel patterns 26 to 28 of the pixel 20, i.e., a corrected three-times magnified pattern thereof, as well as the sub-pixel patterns 36 to 38 of the pixel 30, i.e., a corrected three-times magnified pattern thereof.

Figure 30:
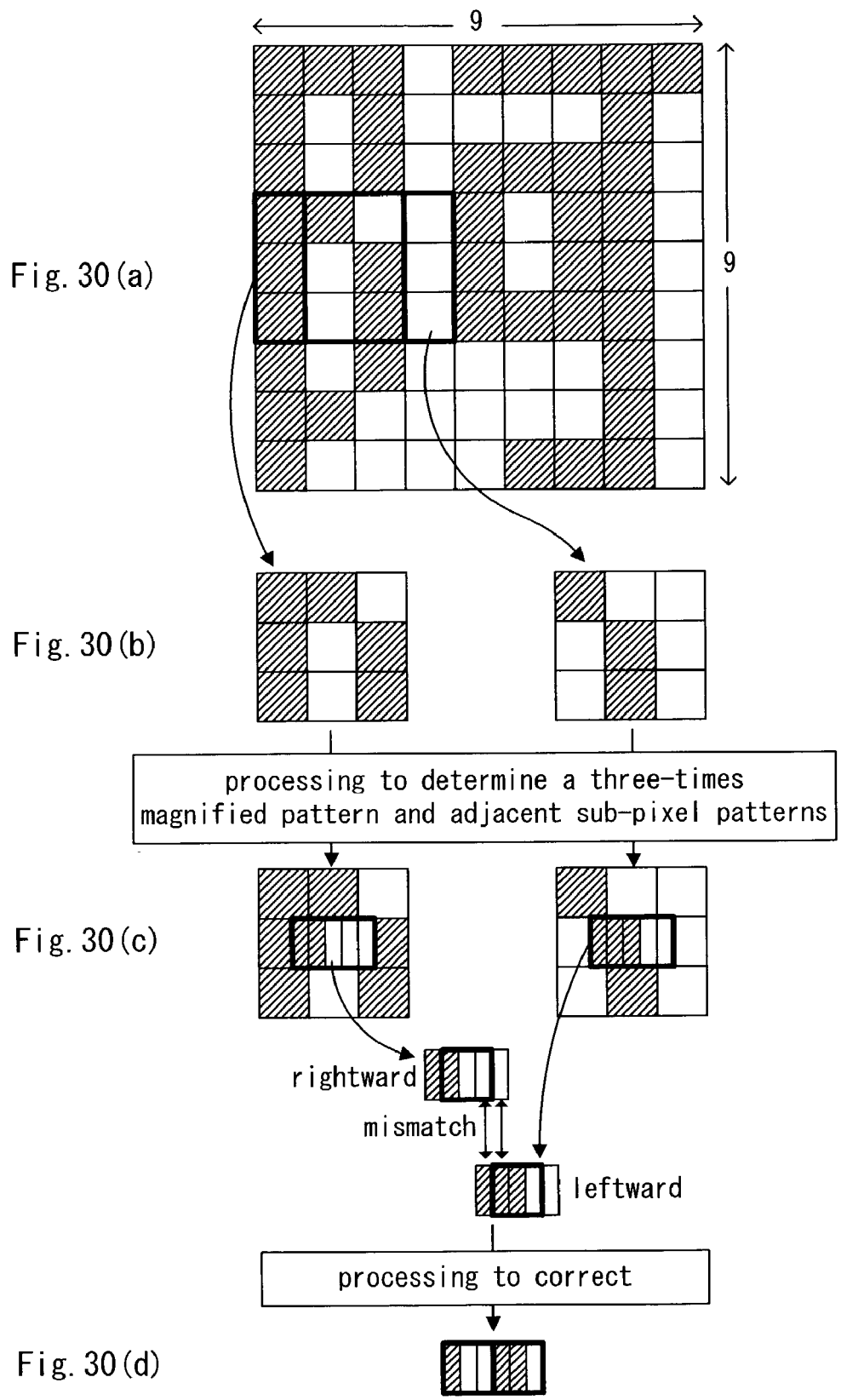
FIG. 30(*a*) is an illustration, showing an example of an original image.

FIG. 30 illustrates the step of extracting a bitmap pattern from an original image to the step of correcting the extracted bitmap pattern. Note that pixels and sub-pixels marked with hatched lines in FIG. 30 are all black.

FIG. 30(a) illustrates an original image that consists of nine pixels-by-nine pixels. As illustrated in FIG. 30(b), assume that a bitmap pattern consisting of nine pixels is extracted. FIG. 30(b) illustrates two different bitmap patterns. A leftward bitmap pattern has a white target pixel positioned at the center thereof. A rightward bitmap pattern has a black target pixel disposed at the center thereof.

As illustrated in FIG. 30(c), a three-times magnified pattern and horizontally contiguously adjacent sub-pixel patterns next thereto are determined on the basis of each of the extracted bitmap patterns. In this instance, the white target pixel undergoes rightward shifting, while the black target pixel experiences leftward shifting.

The three-times magnified pattern-correcting unit 17 eliminates mismatches between overlapped sub-pixels in accordance with the examples as illustrated in FIGS. 28 and 29. More specifically, pixel data of the original image is valued over the above patterns in order to remove the mismatches. As a result, as illustrated in FIG. 30(d), corrected three-times magnified patterns are determined.

In FIG. 30(d), leftward three sub-pixel patterns correspond to a three-times magnified pattern of the white target pixel, while rightward three sub-pixel patterns correspond to a three-times magnified pattern of the black target pixel.

Figure 31:
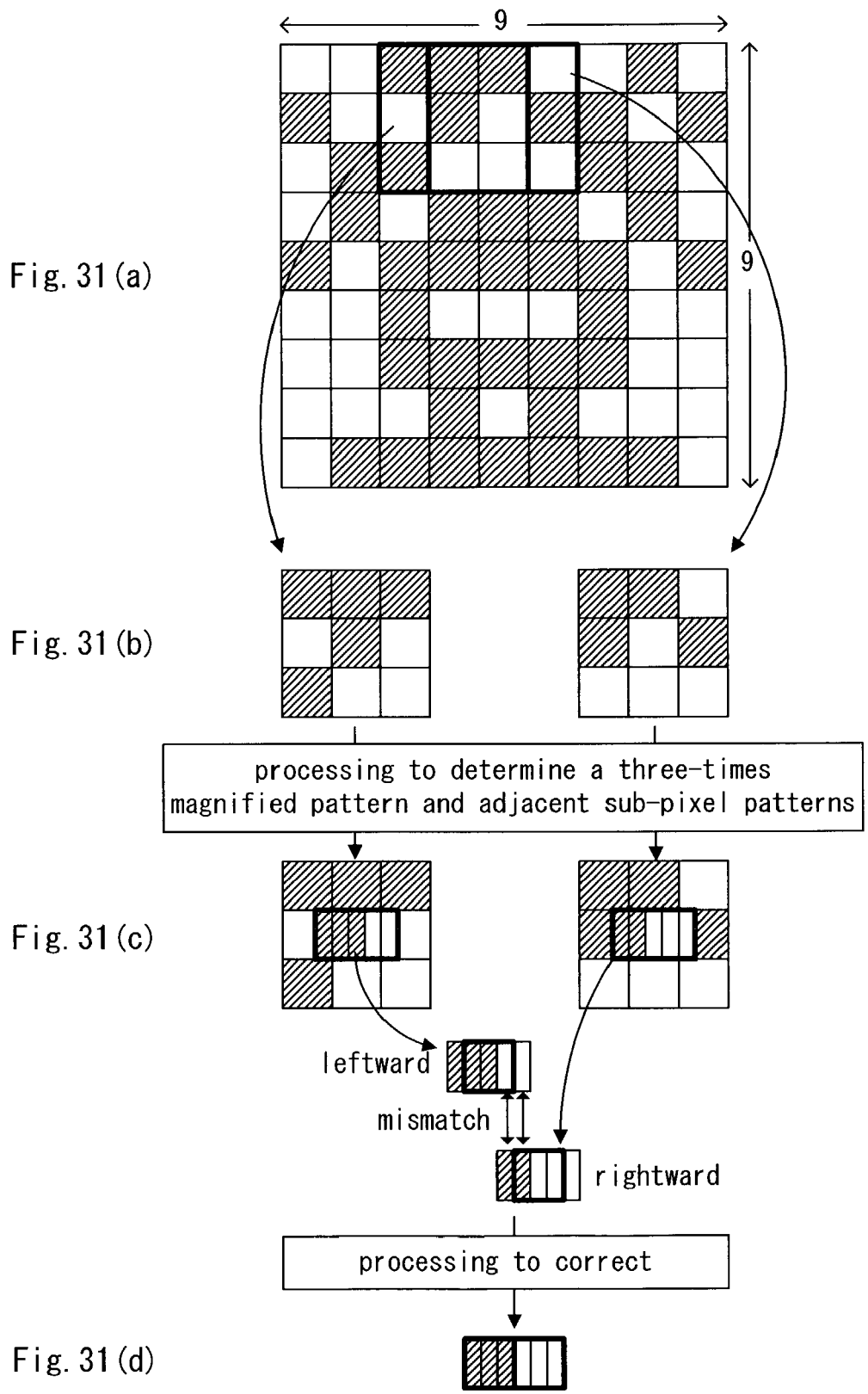
FIG. 31(*a*) is an illustration, showing another example of an original image.

FIG. 31 illustrates the step of extracting a bitmap pattern from an original image to the step of correcting the extracted bitmap pattern.

FIG. 31(a) illustrates an original image that consists of nine pixels-by-nine pixels. As illustrated in FIG. 31(b), assume that a bitmap pattern consisting of nine pixels is extracted. FIG. 30(b) illustrates two different bitmap patterns. A leftward bitmap pattern has a black target pixel positioned at the center thereof. A rightward bitmap pattern has a white target pixel disposed at the center thereof.

As illustrated in FIG. 31(c), a three-times magnified pattern and horizontally contiguously adjacent sub-pixel patterns next thereto are determined on the basis of each of the extracted bitmap patterns. In this instance, the black target pixel is subjected to leftward shifting, while the white target pixel experiences rightward shifting.

The three-times magnified pattern-correcting unit 17 eliminates mismatches between overlapped sub-pixels in accordance with the examples as illustrated in FIGS. 28 and 29. More specifically, pixel data of the original image is valued over the above patterns in order to remove the mismatches. As a result, corrected three-times magnified patterns are determined as illustrated in FIG. 31(d).

In FIG. 31(d), leftward three sub-pixel patterns correspond to a three-times magnified pattern of the black target pixel, while rightward three sub-pixel patterns correspond to a three-times magnified pattern of the white target pixel.

The above describes with reference to FIGS. 26 to 31 how the mismatches between the overlapped sub-pixels are removed, depending upon whether the three-times magnified patterns have been subjected to the shifting, in order to provide corrected three-times magnified patterns. However, the present embodiment is not limited to the above. For example, the mismatches can be removed using other codes of evaluation in which, e.g., a rightward pixel is valued over all others. In brief, a single pattern-determining rule is established when the mismatches occur between the overlapped sub-pixels.

Now, attention is directed back to FIG. 23 in which the components of the display equipment are described.

As illustrated in FIG. 25, the reference pattern storage unit 16 stores each reference pattern and a corresponding three-times magnified pattern with horizontally contiguously adjacent sub-pixel patterns next thereto. In the reference pattern storage unit 16, the reference patterns are correlated with the three-times magnified patterns and the horizontally contiguously adjacent sub-pixel patterns next thereto.

As previously discussed, the pattern-determining unit 15 references the reference pattern storage unit 16, and then determines the three-times magnified pattern and the horizontally contiguously adjacent sub-pixel patterns next thereto using pattern matching as shown in FIG. 25.

The above describes an example in which the three-times magnified pattern and the horizontally contiguously adjacent sub-pixel patterns next thereto are determined using the pattern matching as shown in FIG. 25. Alternatively, the patterns may be expressed as by bits.

As illustrated in FIG. 32, assume that blacks and whites are expressed as 0 (zero) and 1 (one), respectively. The blacks and whites formed by nine pixels may be expressed by bit strings (nine digits) in which numerals 0, 1 are aligned with one another in sequence ranging from an upper-left pixel to a lower-right pixel.

As illustrated in FIG. 25(a), when the nine pixel-based reference pattern is entirely black, then the reference pattern and a corresponding three-times magnified pattern with horizontally contiguously adjacent sub-pixel patterns next thereto may be expressed by bit string 000000000 and bit string 00000, respectively. (See the top of FIG. 32.)

Conversely, when the nine pixel reference pattern is are entirely white as illustrated in FIG. 25(e), then the reference pattern and a corresponding three-times magnified pattern with horizontally contiguously adjacent sub-pixel patterns next thereto may be expressed by bit string 111111111 and bit string 11111, respectively. (See the bottom of FIG. 32.)

Similarly, for a variety of intermediate patterns between the above opposite bit strings 000000000 and 111111111, three-times magnified pattern/horizontally contiguously adjacent sub-pixel pattern-determining rules are established in advance. When all of the rules are set up, then 512-different combinations as previously discussed are defined. Alternatively, fewer rules may be pre-established by omitting part of the rules in view of symmetry and black-white inversion.

The rules using the bit strings are placed into the reference pattern storage unit 16, in which the reference patterns are correlated with the three-times magnified patterns using an arrangement or other known storage structures, while the bit strings are itemized by indexes. This system allows a desired three-times magnified pattern and horizontally contiguously adjacent sub-pixel patterns next thereto to be found immediately when the reference pattern storage unit 16 is referenced by a corresponding index.

Other equivalent notations such as a hexadecimal notation may, of course, replace the nine-digit bit string.

As described above, when the three-times magnified pattern/horizontally contiguously adjacent sub-pixel pattern-determining rules are expressed by bit strings, then as illustrated in FIG. 32, the reference pattern storage unit 16 stores bit strings that express by bits each reference pattern and a corresponding three-times magnified pattern with horizontally contiguously adjacent sub-pixel patterns next thereto. In the reference pattern storage unit 16, the reference patterns are correlated with the three-times magnified patterns and the horizontally contiguously adjacent sub-pixel patterns next thereto.

The pattern-determining unit 15 references the reference pattern storage unit 16, and then determines the three-times magnified pattern and the horizontally contiguously adjacent sub-pixel patterns next thereto on the basis of the results from retrieval using the indexes as shown in FIG. 32.

Figure 33:
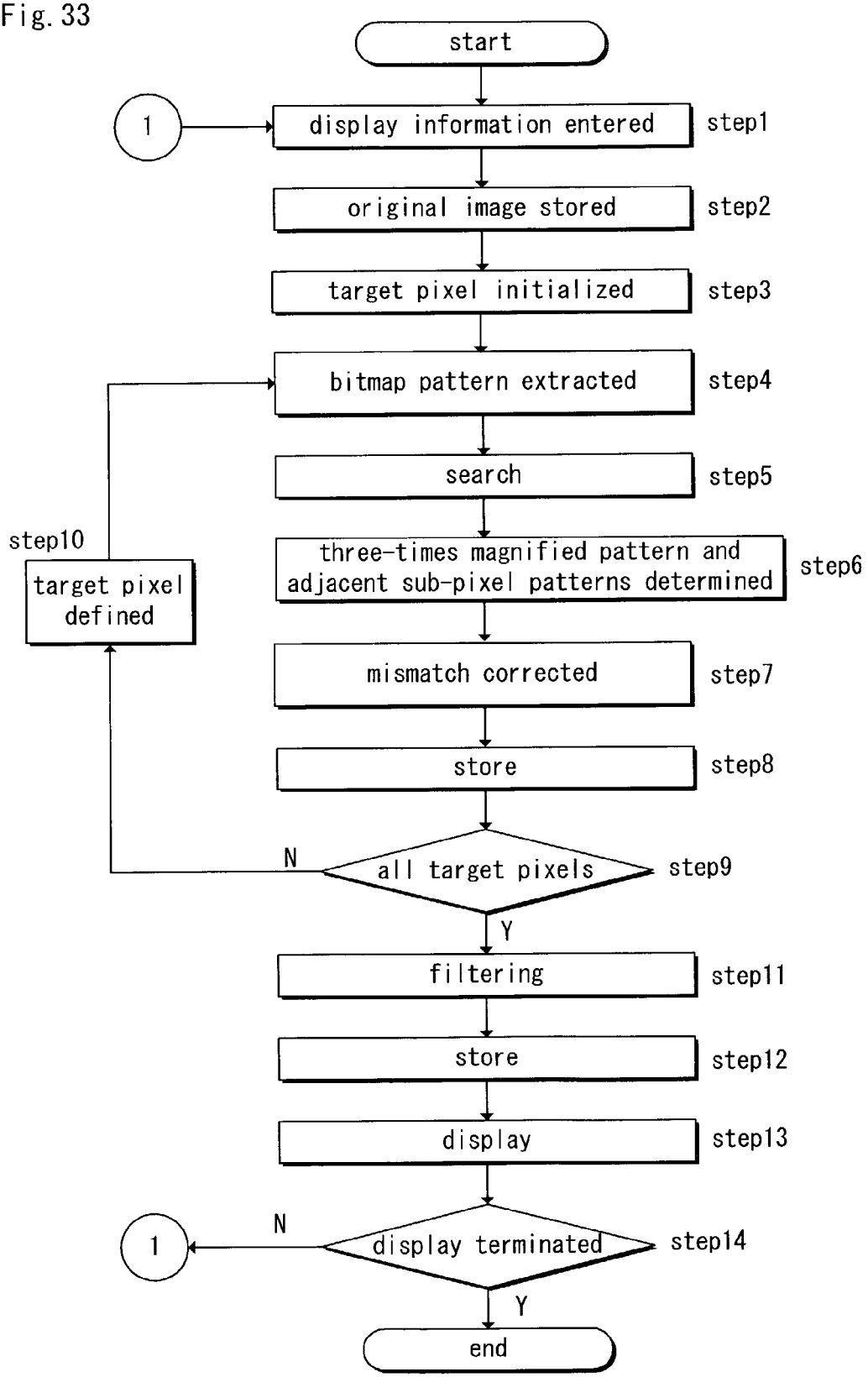
FIG. 33 is a flowchart illustrating how the display equipment behaves.

Next, a flow of processing using the display equipment of FIG. 23 is described with reference to FIG. 33. Note that descriptions on processing similar that of FIG. 13 are omitted. In FIG. 33, steps 1 and 2 are similar to those of FIG. 13.

At step 3, the display control unit 2 defines a pixel at an upper-left initial position as a target pixel in the bitmap pattern-extracting unit 14, and then instructs the bitmap pattern-extracting unit 14 to extract a bitmap pattern when the target pixel is located at the initial position.

At step 4, the bitmap pattern-extracting unit 14 extracts such a bitmap pattern from original image data stored in the original image data storage unit 6. The bitmap pattern consists of nine pixels, or rather the target pixel and neighboring pixels thereabout. The bitmap pattern-extracting unit 14 returns the extracted bitmap pattern to the display control unit 2.

The display control unit 2 delivers the nine-pixel bitmap pattern, upon receipt thereof from the bitmap pattern-extracting unit 14, to the pattern-determining unit 15. The display control unit 2 then instructs the pattern-determining unit 15 to determine a three-times magnified pattern and horizontally contiguously adjacent sub-pixel patterns next thereto, which all conform to the extracted bitmap pattern.

At step 5, the pattern-determining unit 15 searches the reference pattern storage unit 16 for the three-times magnified pattern/horizontally contiguously adjacent sub-pixel pattern-determining rules in order to determine a reference pattern that conforms to the received bitmap pattern. At step 6, the pattern-determining unit 15 determines a three-times magnified pattern and horizontally contiguously adjacent sub-pixel patterns next thereto, which all agree with the determined reference pattern. The pattern-determining unit 15 passes the determination results over to the three-times magnified pattern-correcting unit 17.

At step 7, the three-times magnified pattern-correcting unit 17 corrects mismatches between overlapped sub-pixel patterns, upon receipt of the determined three-times magnified pattern and horizontally contiguously adjacent sub-pixel patterns next thereto, thereby determining a corrected three-times magnified pattern of the target pixel. At step 8, the three-times magnified pattern-correcting unit 17 places the determined three-times magnified pattern into the three-times magnified image data storage unit 11.

At step 9, the display control unit 2 repeals the processing of steps 4–8 until all of the target pixels are processed, while defining every pixel as a target pixel at step 10. When the three-times patter-correcting unit 17 places a series of the three-times magnified patterns into the three-times magnified image data storage unit 11, then corresponding pieces of information on an image as shown in FIG. 15 is brought into the three-times magnified image data storage unit 11.

The processing of steps 11–14 following the repeated processing as discussed above is similar to that of steps 13–16 of FIG. 13.

The following discusses, by way of illustration, a specific process with reference to the drawing, in which the pattern-determining unit 15 determines a three-times magnified pattern and horizontally contiguously adjacent sub-pixel patterns next thereto on the basis of pattern matching.

Figure 34:
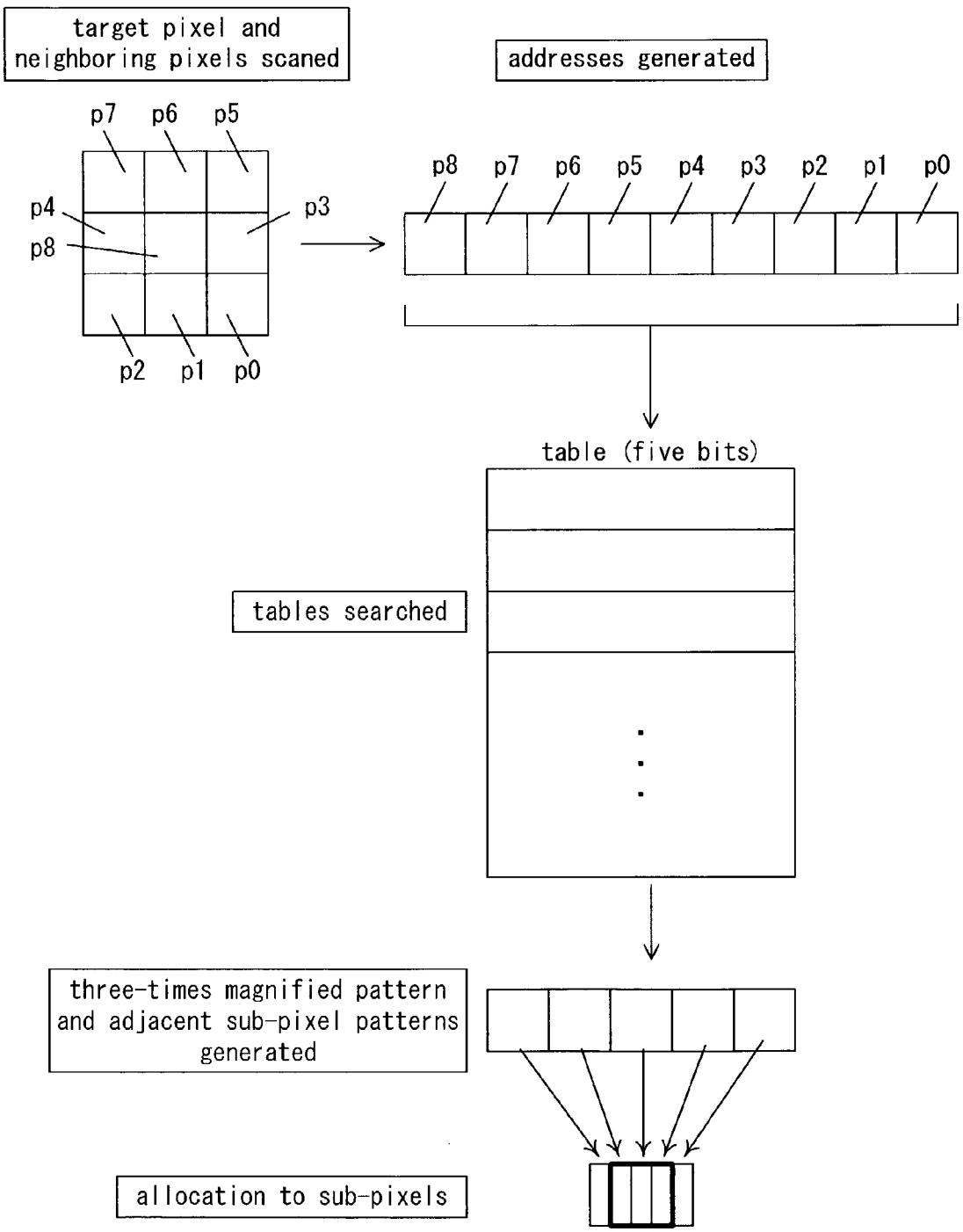
FIG. 34 is an illustration, showing, by way of illustration, the step of determining a three-times magnified pattern with horizontally contiguously adjacent sub-pixel patterns next thereto.

FIG. 34 illustrates the specific process.

As illustrated in FIG. 34, the pattern-determining unit 15 scans nine pixels of p0 to p8 including a central target pixel p8, thereby generating respective addresses thereof.

The pattern-determining unit 15 retrieves tables in the reference pattern storage unit 16, and then defines table data (five bits), which correspond to the generated addresses, as a three-times magnified pattern and horizontally contiguously adjacent sub-pixel patterns next thereto.

The determined three-times magnified pattern and horizontally contiguously adjacent sub-pixel patterns are corrected by the three-times magnified pattern-correcting unit 17, and are then filtered by the filtering unit 12. The corrected and filtered patterns are allocated to target pixel-forming three sub-pixels and horizontally contiguously adjacent sub-pixels next to the target pixel.

The table in the reference pattern storage unit 16 is now described. Since the numbers n, m are defined as n=m=1, the bitmap pattern-extracting unit 14 extracts five hundred and twelve (512) different bitmap patterns, resulting in 512-different addresses.

As a result, the reference pattern storage unit 16 includes 512-different tables that correspond to the 512-different addresses.

Each table contains a three-times magnified pattern and horizontally contiguously adjacent sub-pixel patterns next thereto (five-bit data) according to the three-times magnified pattern/horizontally contiguously adjacent sub-pixel pattern-determining rules.

As discussed above, pursuant to the present embodiment, the three-times magnified pattern and corresponding horizontally contiguously adjacent sub-pixel patterns next thereto are determined with reference to all target pixels. The determined patterns are corrected by the three-times magnified pattern-correcting unit 17, thereby providing non-discrepant three-times magnified patterns.

Since the shifting is practiced in a manner similar to that of the first embodiment, a pixel can be displaced horizontally by an amount of a sub-pixel without any change in pixel value.

As a result, similar to the first embodiment, when an image is displayed on a per sub-pixel basis, then a variation in output image density can be suppressed, which otherwise would noticeably occur as a result of a varied width of a line representative of an object (a character, a symbol, a figure, or a combination thereof). This feature provides a high-quality display on a per sub-pixel basis.

In steps 4–6 of FIG. 33, the pattern-determining unit 15 dynamically determines the three-times magnified pattern and the horizontally contiguously adjacent sub-pixel patterns next thereto with respect to all of the target pixels. This means that there is no need to statically retain the three-times magnified pattern and the horizontally contiguously adjacent sub-pixel patterns next thereto.

This feature provides reduced system loads, when compared with the case in which the three-times magnified pattern and the horizontally contiguously adjacent sub-pixel patterns next thereto are statically contained. Therefore, the display equipment according to the present embodiment can be incorporated into equipment such as a cellular phone and a mobile computer, which have many constraints on system resources.

A raster image and a three-times magnified pattern of the raster image with horizontally contiguously adjacent sub-pixel patterns next thereto need not be known. This means that a wide range of images such as a photographic portrait image downloaded from a server may be displayed on a per sub-pixel basis with a substantially improved resolution. As a result, the images are legibly displayed.

Similar to the first embodiment, the above beneficial effects are not necessarily obtained only under the assumption of x=y=1.

It is to be noted that, when the numbers x, y are defined as x=y=1, then particular beneficial effects as given below are provided. More specifically, in respective three-times magnified patterns of two neighboring target pixels as described above, there occur one mismatch at a rightward pattern of one of the three-times magnified patterns and another mismatch at a leftward pattern of the other. Therefore, at most two patterns can be corrected.

Meanwhile, assume that the numbers x, y are defined as x=y=2 such as x≧2. In this case, in respective three-times magnified patterns of two neighboring target pixels, there occur respective mismatches at central and rightward patterns of one of the three-times magnified patterns while there occur respective mismatches at central and leftward patterns of the other. This means that complicated correction is required.

Therefore, when the numbers x, y are defined as x=y=1, then the three-times magnified pattern-correcting unit 17 can eliminate the mismatches in a simpler manner than when the numbers x, y are defined as x≧2.

Although the above discusses a reference pattern having a rectangular profile (see FIG. 24), the present embodiment is not limited to such a rectangular reference pattern.

For example, a pattern having a rectangular profile and including an additional pixel at a position slanted with respect to a target pixel may be viewed as a reference pattern.

For example, as illustrated in FIG. 18(a), a reference pattern having a non-rectangular profile and consisting of a total of twenty-one pixels including a central target pixel may be employed.

With continued reference to FIG. 18, the above example provides beneficial effects similar to those obtained when a reference pattern having a non-rectangular profile and consisting of a total of twenty pixels excluding the central target pixel is employed.

A non-rectangular reference patter, a three-times magnified pattern of a target pixel, and contiguously adjacent sub-pixel patterns next to the target pixel may be expressed by bits in order to determine the three-times magnified pattern with the sub-pixel patterns next thereto on the basis of the results from retrieval using indexes.

When a non-rectangular reference pattern including a target pixel is employed, then fewer rules can be pre-established in view of symmetry and white-black inversion in a manner similar to the case in which a non-rectangular reference pattern excluding a target pixel is employed.

(Embodiment 4)

A fourth embodiment is now described only with reference to differences in structure from the third embodiment. FIG. 35 is a block diagram, illustrating display equipment according to the present embodiment.

Different from the third embodiment, the present embodiment determines a three-times magnified pattern and horizontally contiguously adjacent sub-pixel patterns next thereto on the basis of logic operation, not by storing three-times magnified pattern-determining rules. As illustrated in FIG. 35, a pattern logic calculation unit 18 is substituted for the reference pattern storage unit 16 of FIG. 23.

The following discusses an example in which a three-times magnified pattern and horizontally contiguously adjacent sub-pixel patterns next thereto are determined under the assumption of n=m=1 and x=y=1.

The manner in which the pattern logic operation unit 18 performs logic operation is now described with reference to FIG. 36. As illustrated in FIG. 36(a), the pattern logic operation unit 18 includes a function whereby the pattern logic operation unit 18 judges conditions as illustrated in FIGS. 36(b) to 36(g). The conditions are related to a total of three pixels-by-three pixels that consists of a central target pixel (0, 0) and neighboring pixels thereabout. As a result, the pattern logic operation unit 18 provides a five-digit bit value as a return value according to the judgment results. The five-digit bit value determines the three-times magnified pattern and the horizontally contiguously adjacent sub-pixel patterns next thereto.

Note that the symbol * as shown in FIGS. 36(b) to 36(g) means that the pixel is ignored, whether white or black. Blacks and whites are defined as 1 (one) and 0 (zero), respectively.

As illustrated in FIG. 36(b), when the target pixel and horizontally contiguously adjacent pixels next to the target pixel are all black, then the return value 11111 results.

As shown in FIG. 36(c), the return value 00000 results when the target pixel and the horizontally contiguously adjacent pixels next thereto are all white.

As illustrated in FIGS. 36(d) to 36(e) and so on, the pattern logic operation unit 18 includes other operable logics.

It would be understood from the above that the present embodiment allow the three-times magnified pattern and the horizontally contiguously adjacent sub-pixel patterns next thereto to be determined in a manner similar to the third embodiment. As a result, the present embodiment provides beneficial effects similar to those of the third embodiment because the shifting similar to that of the third embodiment is practiced.

The present embodiment depends upon how the logic operation is conducted, not how large a storage area is used. Thus, the display equipment according to the present embodiment can be incorporated with ease into equipment having a strictly limited storage area.

Figure 37:
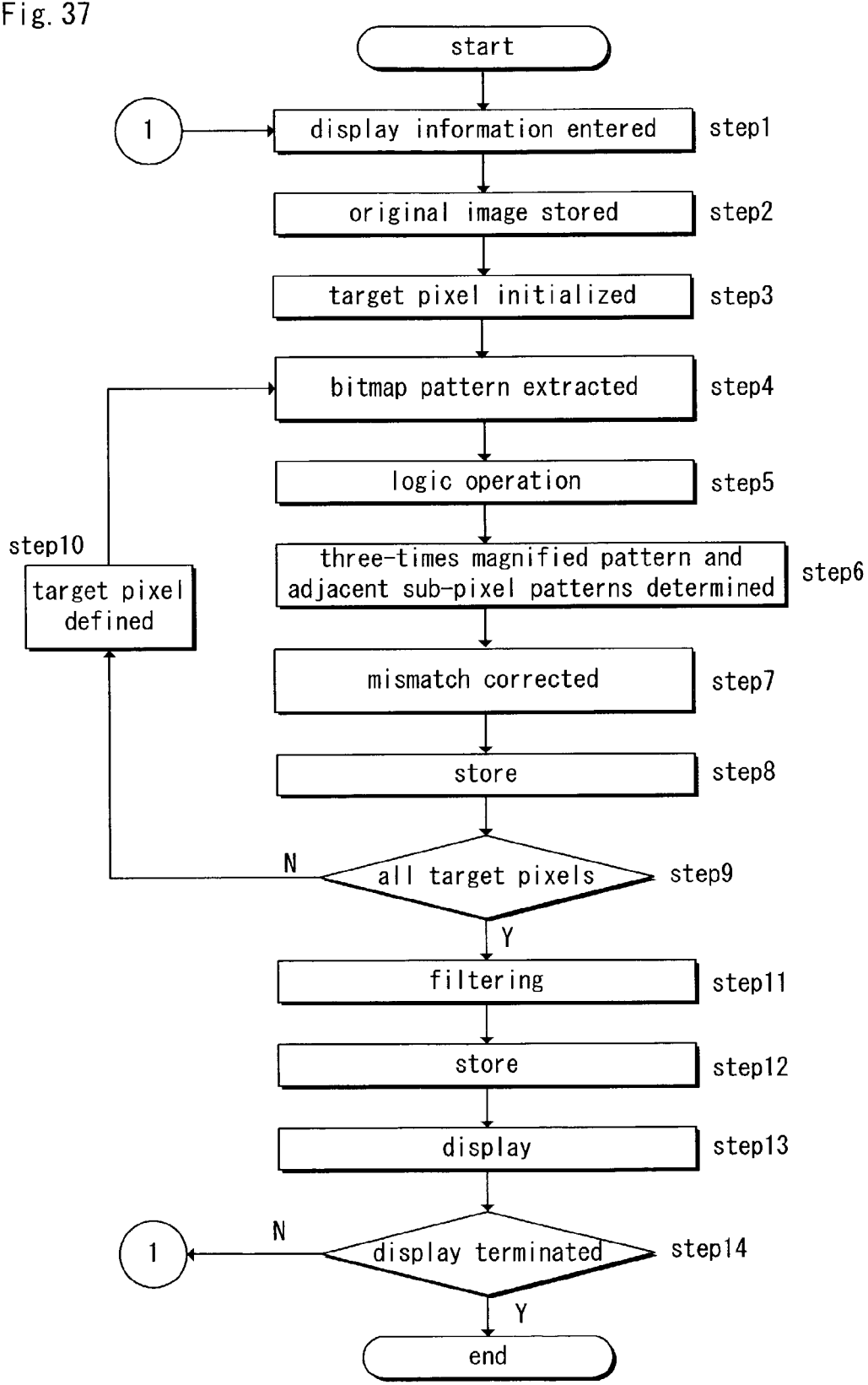
FIG. 37 is a flowchart, illustrating how the display equipment behaves.
Figure 38:
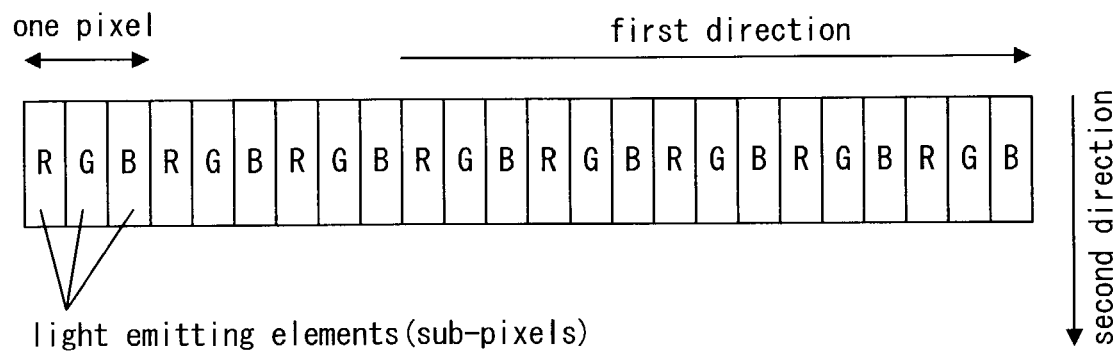
FIG. 38 is a simulated illustration, showing a line as seen in the prior art.
Figure 39:
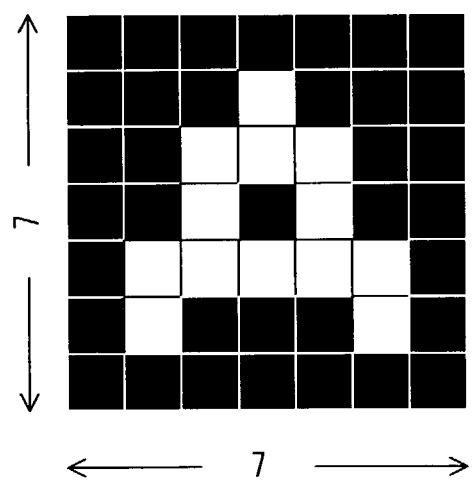
FIG. 39 is an illustration, showing an example of a prior art original image.
Figure 40:
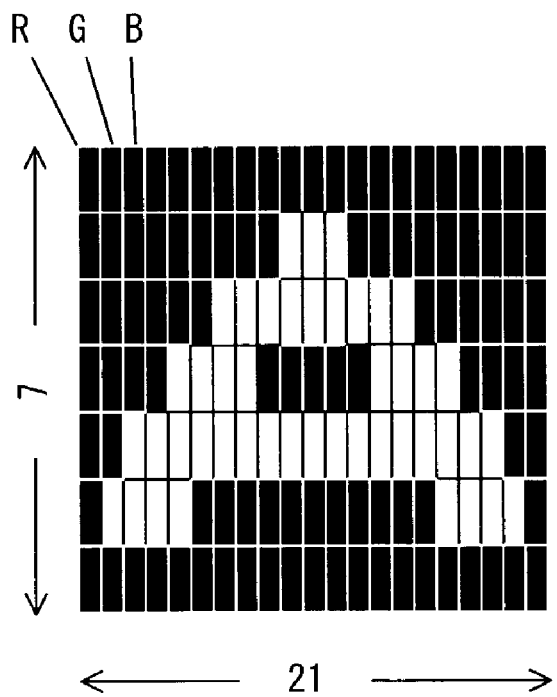
FIG. 40 is an illustration, showing an example of a prior art three-times magnified image.
Figure 41:
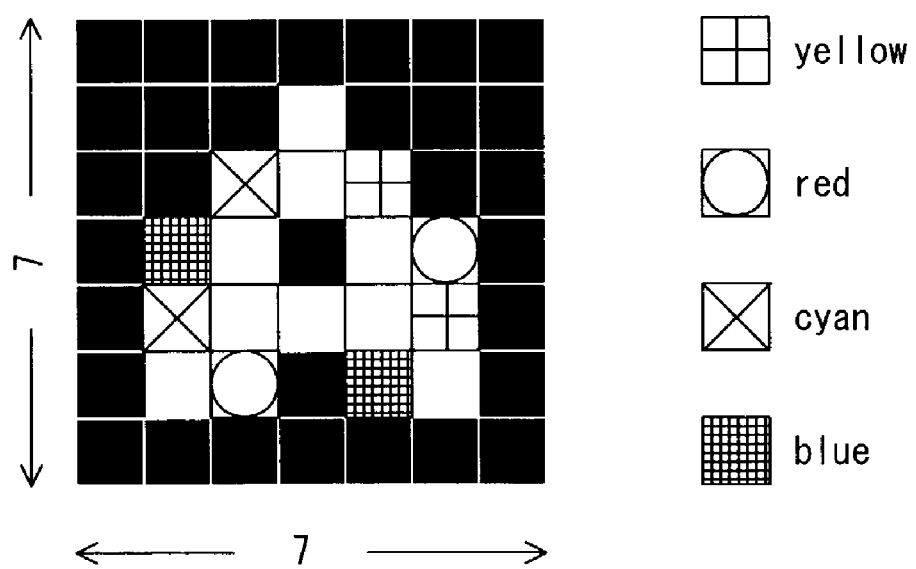
FIG. 41 is a descriptive illustration, showing a color-determining process as practiced in the prior art.

Next, a flow of processing using the display equipment of FIG. 35 is discussed with reference to FIG. 37, but mainly with respect to differences from the flow of processing as shown in FIG. 33. As illustrated in FIG. 37, step 5 (pattern logic operation) is substituted for different step 5 (searching the reference pattern storage unit 16) of FIG. 33.

At step 5, the display control unit 2 instructs the pattern-determining unit 15 to determine a three-times magnified pattern and horizontally contiguously adjacent sub-pixel patterns next thereto, and then the pattern-determining unit 15 permits the pattern logic operation unit 18 to practice the above logic operation.

At step 6, the pattern-determining unit 15 acquires the return value. This means that the three-times magnified pattern and the horizontally contiguously adjacent sub-pixel patterns next thereto are determined.

At step 7, the pattern-determining unit 15 brings the three-times magnified pattern and the horizontally contiguously adjacent sub-pixel patterns next thereto according to the return value into the three-times magnified image data storage unit 11.

The remaining steps are similar to those of FIG. 33.

A combination of the third and fourth embodiments can be, of course, incorporated into the present invention. For example, two-step process is acceptable, in which the reference pattern storage unit 16 and the pattern logic operation unit 18 provide respective courses of processing. In this instance, either the reference pattern storage unit 16 or the pattern logic operation unit 18 may provide an earlier action.

Although the above discusses a reference pattern having a rectangular profile (see FIG. 36), the present embodiment is not limited to such a rectangular reference pattern.

For example, a pattern having a rectangular profile and including an additional pixel at a position slanted with respect to a target pixel may also be taken as a reference pattern in a manner similar to the third embodiment.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Display equipment comprising:
   a display unit operable to display an image on a per sub-pixel basis; and
   a control unit operable to control said display unit,
   wherein said control unit refers to an eight pixel-based reference pattern including data of a target pixel and data of pixels adjacent to the target pixel, thereby determining a sub-pixel basis pattern including data of the sub-pixels constituting the target pixel and data of the sub-pixels constituting the pixels adjacent to the target pixel.

2. The display equipment as defined in claim 1, wherein the target pixel and the pixels adjacent to the target pixel are controlled on a per sub-pixel basis without any change in line width of an object.

3. The display equipment as defined in claim 1, wherein when a mismatch in the data of the sub-pixels constituting the target pixel and the data of the sub-pixels constituting the pixels adjacent to the target pixel occurs as a result of control over the sub-pixels constituting the target pixel and the sub-pixels constituting the pixels adjacent to the target pixel, then said control unit performs correction in order to eliminate the mismatch.

4. Display equipment comprising:
   a display device;
   the display device including three light-emitting elements aligned with each other in certain sequence to form a pixel, the three light-emitting elements illuminating three primary colors RGB;
   a plurality of the pixels aligned with each other in a first direction to form a line;
   a plurality of the lines aligned with each other in a second direction perpendicular to the first direction, thereby forming a display screen on the display device;
   a pattern-determining unit operable to determine a three-times magnified pattern of a target pixel by magnifying the target pixel three times in the first direction in accordance with a raster image to be displayed;
   the pattern-determining unit being further operable to determine, in accordance with the raster image to be displayed, a "x" (x is an integral number) number of sub-pixel patterns positioned next to the target pixel on one side of the target pixel and a "y" (y is a natural number) number of sub-pixel patterns positioned next to the target pixel on the other side of the target pixel; and a display control unit operable to allocate the three-times magnified pattern, the x-number of sub-pixel patterns, and the y-number of sub-pixel patterns to the light-emitting elements of the display device, thereby displaying an image on the display device;

wherein the pattern-determining unit determines the three-times magnified pattern, the x-number of sub-pixel patterns and the y-number of sub-pixel patterns only when the target pixel has a predetermined pixel value.

5. The display equipment as defined in claim 4, wherein the pattern-determining unit determines the three-times magnified pattern, the x-number of sub-pixel patterns, and the y-number of sub-pixel patterns in accordance with a reference pattern that has a rectangular profile and further that consists of a total of a $((2n+1)*(2m+1)-1))$(n, m are natural members) number of surrounding pixels about the target pixel.

6. Display equipment as defined in claim 5, wherein the numbers n, m are both equal to 1.

7. Display equipment as defined in claim 4, wherein the numbers x, y are both equal to 1.

8. The display equipment as defined in claim 4, wherein the pattern-determining unit determines the three-times magnified pattern, the x-number of sub-pixel patterns, and the y-number of sub-pixel patterns in accordance with a reference pattern that has a non-rectangular profile and further that consists of a plurality of surrounding pixels about the target pixel.

9. The display equipment as defined in claim 4, further comprising:

a three-times magnified pattern-correcting unit operable to correct the three-times magnified pattern that is determined by the pattern-determining unit, wherein when a mismatch occurs between the three-times magnified pattern of the target pixel and a sub-pixel pattern positioned next to another target pixel in the first direction, then the three-times magnified pattern-correcting unit corrects the three-times magnified pattern of the target pixel in order to eliminate the mismatch therebetween, and wherein the display control unit allocates the corrected three-times magnified pattern to the light emitting elements of the display device, thereby displaying an image on the display device.

10. The display equipment as defined in claim 9, wherein the pattern-determining unit determines the three-times magnified pattern, the x-number of sub-pixel patterns, and the y-number of sub-pixel patterns in accordance with a reference pattern that has a rectangular profile and further that consists of a total of a $(2n+1)*(2m+1)$ (n, m are natural numbers) number of pixels, the pixels consisting of a target pixel and neighboring pixels about the target pixel.

11. Display equipment as defined in claim 10, wherein the numbers n, m are both equal to 1.

12. The display equipment as defined in claim 9, wherein the pattern-determining unit determines the three-times magnified pattern, the x-number of sub-pixel patterns, and the y-number of sub-pixel patterns in accordance with a reference pattern that has a non-rectangular profile and further that consists of a target pixel and a plurality of neighboring pixels about the target pixel.

13. Display equipment as defined in claim 4, wherein the numbers x, y are both equal to 2.

14. Display equipment as defined in claim 4, wherein the raster image is one of a bitmap font, a bitmap image based on a vector font, and a non-font raster image.

15. The display equipment as defined in claim 4, wherein the pattern-determining unit determines the three-times magnified pattern, the x-number of sub-pixel patterns, and the y-number of sub-pixel patterns by referencing a reference pattern storage unit that stores a pattern-determining rule for use in determining the three-times magnified pattern, the x-number of sub-pixel patterns, and the y-number of sub-pixel patterns.

16. The display equipment as defined in claim 15, wherein the reference pattern storage unit contains information on reference pattern-related pattern matching.

17. The display equipment as defined in claim 15, wherein the reference pattern storage unit contains a bit string that expresses a reference pattern by bits, and information on the three-times magnified pattern, the x-number of sub-pixel patterns, and the y-number of sub-pixel patterns, all of the patterns being related to the bit string, and the bit string and the information are correlated with one another.

18. The display equipment as defined in claim 4, wherein the pattern-determining unit determines the three-times magnified pattern, the x-number of sub-pixel patterns, and the y-number of sub-pixel patterns by referencing calculation results from a pattern logic operation unit that practices reference pattern-based logic operation.

19. A display method comprising the steps of:

referring to an eight pix-based reference pattern including data of a target pixel and data of pixels adjacent to the target pixel, so as to determine a sub-pixel basis pattern including data of the sub-pixels constituting the target pixel and data of the sub-pixels constituting the pixels adjacent to the target pixel;

controlling a display unit according to the determined sub-pixel basis pattern; and displaying an image on a per sub-pixel basis on the display unit.

20. The display method as defined in claim 19, wherein the target pixel and the pixels adjacent to the target pixel are controlled on a per sub-pixel basis without any change in line width of an object.

21. The display method as defined in claim 19, wherein when a mismatch in the data of the sub-pixels constituting the target pixel and the data of the sub-pixels constituting the pixels adjacent to the target pixel occurs as a result of control over the sub-pixels constituting the target pixel and the sub-pixels constituting the pixels adjacent to the target pixel, then correction is performed in order to eliminate the mismatch.

22. A display method comprising the steps of:

aligning three light-emitting elements with each other in certain sequence to from a pixel, the three light-emitting elements illuminating three primary colors RGB;

aligning a plurality of the pixels with each other in a first direction to form a line;

aligning a plurality of the lines with each other in a second direction perpendicular to the first direction, thereby forming a display screen on a display device;

determining a three-times magnified pattern of a target pixel by magnifying the target pixel three times in the first direction in accordance with a raster image to be displayed;

determining, in accordance with the raster image to be displayed, a "x" (x is an integral number) number of sub-pixel patterns positioned next to the target pixel in the first direction on one side of the target pixel and a "Y" (y is a natural number) number of sub-pixel patterns positioned next to the target pixel in the first direction on the other side of the target pixel; and displaying an image on the display device by allocating the three-times magnified pattern, the x-number of sub-pixel patterns, and the y-number of sub-pixel patterns to the light-emitting elements of the display device;

wherein determining the three-times magnified pattern includes determining the three-times magnified pattern only when the target pixel has a predetermined pixel value;

wherein determining the x-number of sub-pixel patterns and the y-number of sub-pixel patterns includes determining the x-number of sub-pixel patterns and the y-number of sub-pixel patterns only when the target pixel has the predetermined pixel value.

23. The display method as defined in claim 22, wherein determining the three-times magnified pattern includes determining the three-times magnified pattern in accordance with a reference pattern that has a rectangular profile and further that consists of a total of a ((2n+1)*(2m+1)−1))(n, m are natural numbers) number of surrounding pixels about the target pixel, and wherein determining the x-number of sub-pixel patterns and the y-number of sub-pixel patterns includes determining the x-number of sub-pixel patterns and the y-number of sub-pixel patterns in accordance with the reference pattern.

24. A display method as defined in claim 23, wherein the numbers of n, m are both equal to 1.

25. The display method as defined in claim 22, wherein determining the three-times magnified pattern includes determining the three-times magnified pattern in accordance with a reference pattern that has a non-rectangular profile and further that consists of a plurality of surrounding pixels about the target pixel, and wherein determining the x-number of sub-pixel patterns and the y-number of sub-pixel patterns includes determining the x-number of sub-pixel patterns and the y-number of sub-pixel patterns in accordance with the reference pattern.

26. A display method as defined in claim 22, further comprising:

correcting the three-times magnified pattern of the target pixel when a mismatch occurs between the three-times magnified pattern of the target pixel and a sub-pixel pattern positioned next to another target pixel in the first direction, whereby the mismatch therebetween is eliminated, wherein displaying an image on the display device includes displaying an image on the display device by allocating the corrected three-times magnified pattern to the light-emitting elements of the display device.

27. A display method as defined in claim 26, wherein determining the three-times magnified pattern includes determining the three-times magnified pattern in accordance with a reference pattern that has a rectangular profile and further that consists of a total of a (2n+1)*(2m+1)(n, m are natural numbers) numbers of pixels, the pixels consisting of a target pixel and neighboring pixels about the target pixel, and wherein determining the x-number of sub-pixel patterns and the y-number of sub-pixel patterns includes determining the x-number of sub-pixel patterns and the y-number of sub-pixel patterns in accordance with the reference pattern.

28. A display method as defined in claim 27, wherein the numbers of n, m are both equal to 1.

29. A display method as defined in claim 26, wherein determining the three-times magnified pattern includes determining the three-times magnified pattern in accordance with a reference pattern that has a non-rectangular profile and further that consists of a target pixel and a plurality of neighboring pixels about the target pixel, and wherein determining the x-number of sub-pixel patterns and the y-number of sub-pixel patterns includes determining the x-number of sub-pixel patterns and the y-number of sub-pixel patterns in accordance with the reference pattern.

30. A display method as defined in claim 22, wherein the numbers of x, y are both equal to 1.

31. A display method as defined in claim 22, wherein the numbers of x, y are both equal to 2.

32. A display method as defined in claim 22, wherein the raster image is one of a bitmap font, a bitmap image based on a vector font, and a non-font raster image.

33. The display method as defined in claim 22, wherein the three-times magnified pattern, the x-number of sub-pixel patterns, and the y-number of sub-pixel patterns are determined by referencing a reference pattern storage unit that stores a pattern-determining rule for use in determining the three-times magnified pattern, the x-number of sub-pixel patterns, and the y-number of sub-pixel patterns.

34. The display method as defined in claim 33, wherein the reference pattern storage unit contains information on reference pattern-related pattern matching.

35. The display method as defined in claim 33, wherein the reference pattern storage unit contains a bit string that expresses a reference pattern by bits, and information on the three-times magnified pattern, the x-number of sub-pixel patterns, and the y-number of sub-pixel patterns, all of the patterns being related to the bit string, and the bit string and the information are correlated with one another.

36. The display method as defined in claim 22, wherein the three-times magnified pattern, the x-number of sub-pixel patterns, and the y-number of sub-pixel patterns are determined by referencing calculation results from a pattern logic operation unit that practices reference pattern-based logic operation.

37. A computer-readable recording medium for recording a display control program that displays an image on a per sub-pixel basis, the program comprising processes for:

determining a three-times magnified pattern of a target pixel by magnifying the target pixel three times in a first direction in accordance with a raster image to be displayed;

determining, in accordance with the raster image to be displayed, a "x" (x is an integral number) number of sub-pixel patterns positioned next to the target pixel in the first direction on one side of the target pixel and "y" (y is a natural number) number of sub-pixel patterns positioned next to the target pixel in the first direction on the other side of the target pixel; and displaying an image on a display device by allocating the three-times magnified pattern, the x-number of sub-pixel patterns, and the y-number of sub-pixel patterns to the light-emitting elements of the display device, wherein determining the three-times magnified pattern includes determining the three-times magnified pattern only when the target pixel has a predetermined pixel value, and wherein determining the x-number of sub-pixel patterns and the y-number of sub-pixel patterns includes determining the x-number of sub-pixel patterns and the y-number of sub-pixel patterns only when the target pixel has the predetermined pixel value.

38. A display equipment comprising:

a display unit operable to display an image on a per sub-pixel basis; and a control unit operable to control said display unit, said control unit further operable to refer to data of a target pixel and data of pixels adjacent to the target pixel, thereby determining both data of the sub-pixels constituting the target pixel and data of the sub-pixels constituting the pixels adjacent to the target pixel, wherein when a mismatch in the data of the sub-pixels constituting the target pixel and the data of the sub-pixels constituting the pixels adjacent to the target pixel occurs as a result of control over the sub-pixels constituting the target pixel and the sub-pixels constituting the pixels adjacent to the target pixel, then said control unit performs correction in order to eliminate the mismatch.

39. A display method comprising the steps of:

referring to data of a target pixel and data of pixels adjacent to the target pixel so as to determine both data of the sub-pixels constituting the target pixel and data of the sub-pixels constituting the pixels adjacent to the target pixel;

controlling a display unit according to the determined data of the sub-pixels constituting the target pixel and the determined data of the sub-pixels of the pixels adjacent to the target pixel;

displaying an image on a per sub-pixel basis on the display unit, and eliminating a mismatch in the data of the sub-pixels constituting the target pixel and the data of the sub-pixels constituting the pixels adjacent to the target pixel that occurs as a result of control over the sub-pixels constituting the target pixel and the sub-pixels constituting the pixels adjacent to the target pixel by performing a correction.

* * * * *

UNITED STATES PATENT AND TRADEMARK OFFICE
CERTIFICATE OF CORRECTION

PATENT NO. : 7,158,148 B2
APPLICATION NO. : 10/202392
DATED : January 2, 2007
INVENTOR(S) : Bunpei Toji et al.

It is certified that error appears in the above-identified patent and that said Letters Patent is hereby corrected as shown below:

On the Cover Page:

In the References Cited item [56]: Please insert --6,775,420 B1 08/2004 Daly--

Sheet 15 of 38 (Box 1) (Fig. 17); Line 1; Delete "scaned" and insert --scanned --, therefor.

Sheet 32 of 38 (Box 1) (Fig. 34); Line 2; Delete "scaned" and insert --scanned --, therefor.

Column 1; Line 50; Delete "R." and insert -- R, --, therefor.

Column 2; Line 40; Delete "the-times" and insert -- three-times --, therefor.

Column 3; Line 26 (Approx.); Delete "(is" and insert -- (j is --, therefor.

Column 3; Line 28 (Approx.); After "of a "k"" delete "k" and insert -- (k --, therefor.

Column 3; Line 52 (Approx.); Delete "eye" and insert -- "y" --, therefor.

Column 4; Line 41; Delete "((2n+1)*(2m+1)-1)}" and insert -- ((2n+1)*(2m+1)-1) --, therefor.

Column 5; Line 21; Delete "farther" and insert -- further --, therefor.

Column 5; Line 31 (Approx.); Delete "patter" and insert -- pattern, --, therefor.

Column 6; Line 56; After "fifth" delete "a".

Column 6; Line 58; Delete "patter," and insert -- pattern, --, therefor.

Column 8; Line 1; Delete "FIG. 9(C)" and insert -- FIG. 9(c) --, therefor.

Column 8; Line 13; Delete "FIG.10(C)" and insert -- FIG. 10(c) --, therefor.

Column 10; Line 10; Delete "flowchart" and insert -- flowchart, --, therefor.

Column 12; Line 25-26; Delete "((2n+1)*(2m+1)1)" and insert -- ((2n+1)*(2m+1)-1) --, therefor.

UNITED STATES PATENT AND TRADEMARK OFFICE
CERTIFICATE OF CORRECTION

PATENT NO. : 7,158,148 B2
APPLICATION NO. : 10/202392
DATED : January 2, 2007
INVENTOR(S) : Bunpei Toji et al.

It is certified that error appears in the above-identified patent and that said Letters Patent is hereby corrected as shown below:

Column 15; Line 62; Delete "result" and insert -- result, --, therefor.

Column 16; Line 10; Delete "patter-determining" and insert -- pattern-determining --, therefor.

Column 26; Line 6; Delete "short" and insert -- short, --, therefor.

Column 27; Line 67; After "of" delete "hi".

Column 29; Line 30; Delete "((2n+1)*(2m-1)-1))" and insert -- ((2n+1)*(2m-1)-1) --, therefor.

Column 29; Line 48; Delete ""X"" and insert -- ("x" --, therefor.

Column 31; Line 25 (Approx.); Delete "patters" and insert -- patterns --, therefor.

Column 31; Line 44 (Approx.); Delete "patter." and insert -- pattern. --, therefor.

Column 32; Line 31; Delete "patter-correcting" and insert -- pattern-correcting --, therefor.

Column 33; Line 23 (Approx.); Delete "patters" and insert -- patterns --, therefor.

Column 33; Line 63 (Approx.); Delete "patter-correcting" and insert -- pattern-correcting --, therefor.

Column 36; Line 54; Delete "repeals" and insert -- repeats --, therefor.

Column 36; Line 57; Delete "patter-correcting" and insert -- pattern-correcting --, therefor.

Column 38; Line 40 (Approx.); Delete "patter," and insert -- pattern, --, therefor.

Column 41; Line 19; In Claim 5, delete "((2n+1)*(2m+1)-1))" and insert -- ((2n+1)*(2m+1)-1) --, therefor.

Column 41; Line 20; In Claim 5, delete "members" and insert -- numbers --, therefor.

Column 42; Line 29; In Claim 19, delete "pix-based" and insert -- pixel-based --, therefor.

UNITED STATES PATENT AND TRADEMARK OFFICE
CERTIFICATE OF CORRECTION

PATENT NO. : 7,158,148 B2
APPLICATION NO. : 10/202392
DATED : January 2, 2007
INVENTOR(S) : Bunpei Toji et al.

It is certified that error appears in the above-identified patent and that said Letters Patent is hereby corrected as shown below:

Column 43; Line 1; In Claim 22, delete ""Y"" and insert -- "y" --, therefor.

Column 43; Line 22; In Claim 23, delete "$((2n+1)*(2m+1)-1))$" and insert -- $((2n+1)*(2m+1)-1)$ --, therefor.

Signed and Sealed this

Seventeenth Day of April, 2007

JON W. DUDAS
*Director of the United States Patent and Trademark Office*